United States Patent
Holton et al.

(10) Patent No.: US 8,294,883 B2
(45) Date of Patent: Oct. 23, 2012

(54) DOPPLER SENSOR FOR THE DERIVATION OF TORSIONAL SLIP, FRICTION AND RELATED PARAMETERS

(75) Inventors: Carvel Holton, Blacksburg, VA (US); Mehdi Ahmadian, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 12/749,301

(22) Filed: Mar. 29, 2010

(65) Prior Publication Data
US 2010/0182613 A1   Jul. 22, 2010

Related U.S. Application Data

(62) Division of application No. 11/765,215, filed on Jun. 19, 2007, now Pat. No. 7,705,972.

(60) Provisional application No. 60/814,890, filed on Jun. 20, 2006, provisional application No. 60/814,891, filed on Jun. 20, 2006, provisional application No. 60/846,082, filed on Sep. 21, 2006.

(51) Int. Cl.
G01P 3/36 (2006.01)

(52) U.S. Cl. ......................... 356/28.5; 356/28

(58) Field of Classification Search ........ 356/3.01–3.15, 356/4.01–4.1, 5.01, 6–22, 28–28.5, 139.01–139.1
See application file for complete search history.

(56) References Cited

U.S. PATENT DOCUMENTS

| | | | | |
|---|---|---|---|---|
| 3,711,200 A | * | 1/1973 | Maughmer | 356/28 |
| 4,685,806 A | * | 8/1987 | Arnberg | 356/601 |
| 6,119,353 A | * | 9/2000 | Grønskov | 33/1 Q |
| 6,621,561 B2 | * | 9/2003 | Holton | 356/28.5 |
| 2004/0039509 A1 | * | 2/2004 | Breed | 701/45 |
| 2005/0062955 A1 | * | 3/2005 | Deines | 356/28.5 |
| 2005/0102083 A1 | * | 5/2005 | Xu et al. | 701/70 |
| 2006/0232052 A1 | | 10/2006 | Breed | |

* cited by examiner

*Primary Examiner* — Luke Ratcliffe
(74) *Attorney, Agent, or Firm* — Blank Rome LLP

(57) ABSTRACT

An optical method and apparatus are described for the measurement of properties of a travel vehicle or a travel surface upon which the travel vehicle travels, which includes providing an incident light from a light source to the travel surface, collecting light reflected from the travel surface, determining a surface induced Doppler shift from the incident and collected light and determining at least one of a motion property of the travel vehicle and a surface property of the travel surface based on the determined surface induced Doppler shift.

20 Claims, 47 Drawing Sheets

ACQUISITION SOFTWARE

* Labview Based Experimental Codes
* VT Acquisition Software for High Speed and Spectral Data
  * Max. Data Rate = 50 Hz
* Yankee Environmental Systems, Inc. (YES Inc.) codes for long duration Monitoring, Curvature, and Surface data
  * Data Rate = 4 Hz

ACQUISITION SOFTWARE

ACQUISITION SOFTWARE

FIG. 18
LOCOMOTIVE ACCELERATION - DECELERATION CYCLE WITH STEADY STATE RUN
* Smooth Acceleration / Deceleration
* Weight = 261,000 lbs
* P = 47.25 MPa
* 2 cm contact patch assumed
* Frictional Coefficient = .2463
* Variance = 1.5%
* 0.2% Acceleration vs Deceleration
* Slip ~ 2.6% average
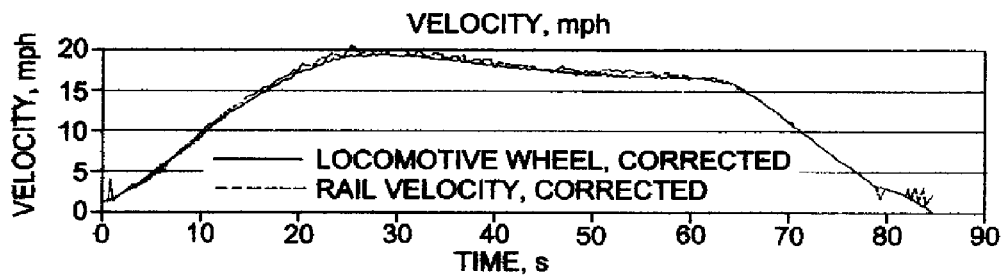
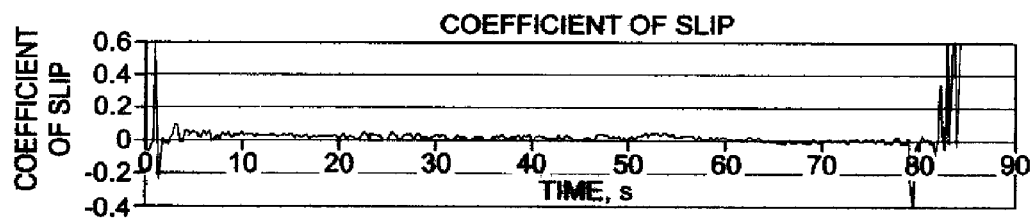
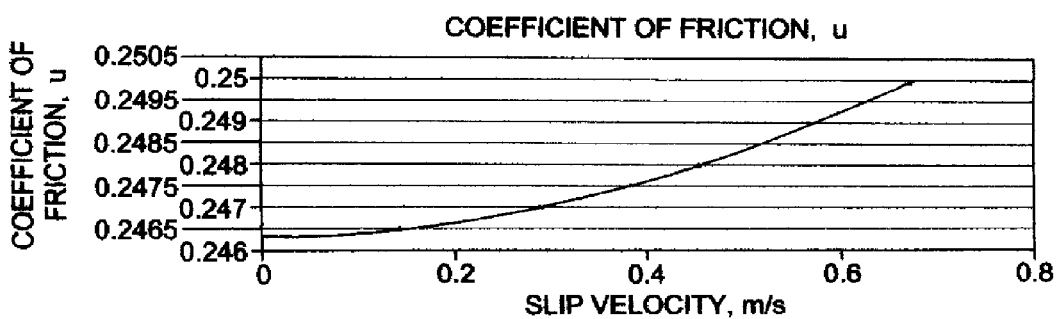

FIG. 18 (cont.)
LOCOMOTIVE ACCELERATION - DECELERATION CYCLE WITH STEADY STATE RUN
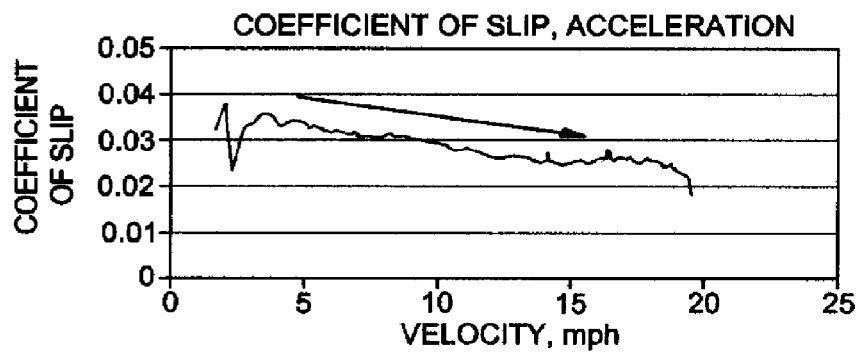
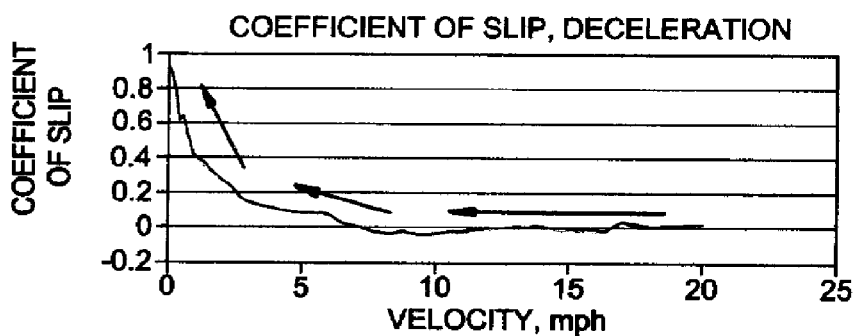

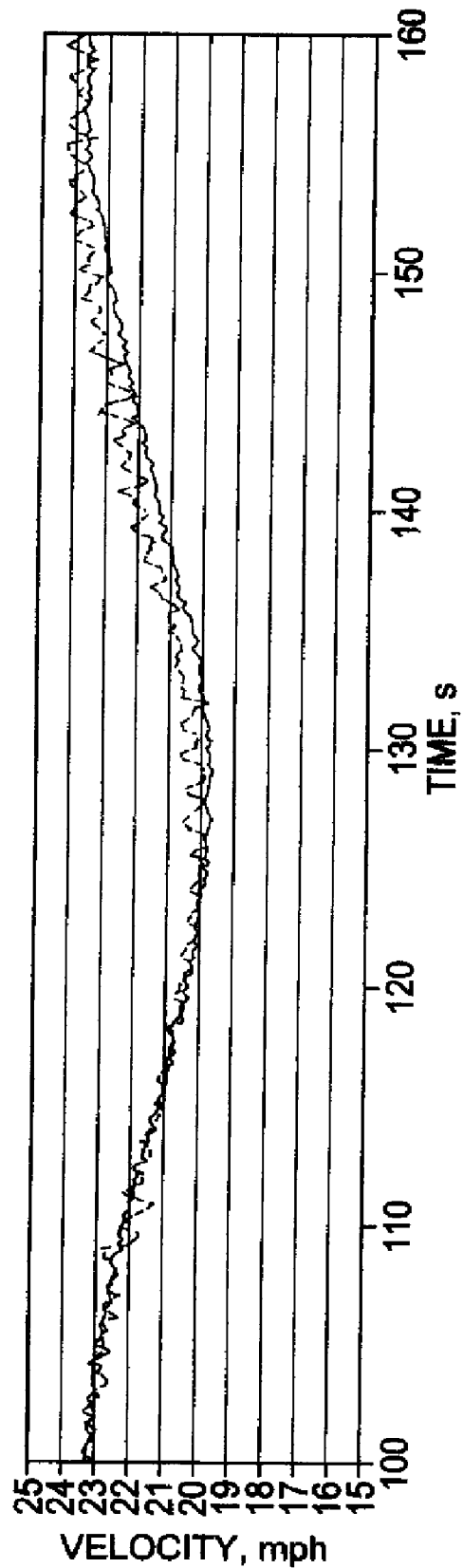

LOCOMOTIVE ACCELERATION
SLIP IN REVERSE MOTION

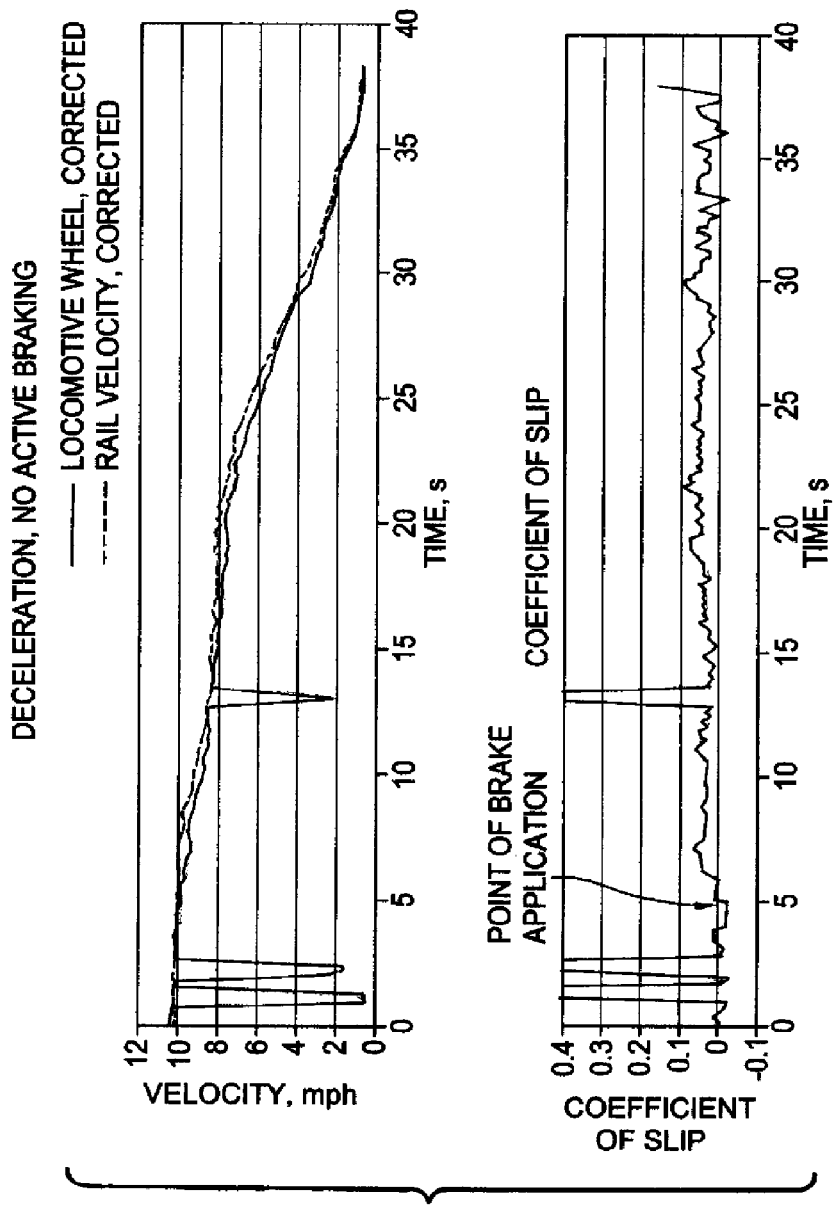

LOCOMOTIVE
DECELERATION SLIP, PASSIVE FRICTION BRAKING

FIG. 21 LOCOMOTIVE DECELERATION WITH AUTOMATIC BRAKE

FIG. 22 LOCOMOTIVE DECELERATION, REGENERATIVE BRAKING

FIG. 24
PASSIVE WHEEL - NS49 CAR (CABOOSE) ACCELERATION
* Accleration in Tangential Track
* Weight = 103,000 lbs
* P = 18.8 MPa
  * 2 cm contact patch assumed
* Frictional Coefficient = .362
* Variance = 0.08%
* Slip ~ 0.5%
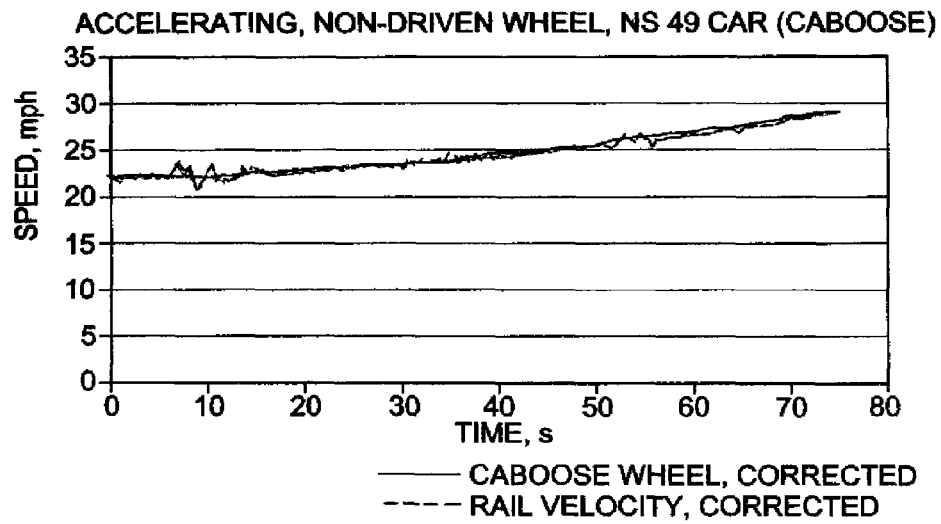
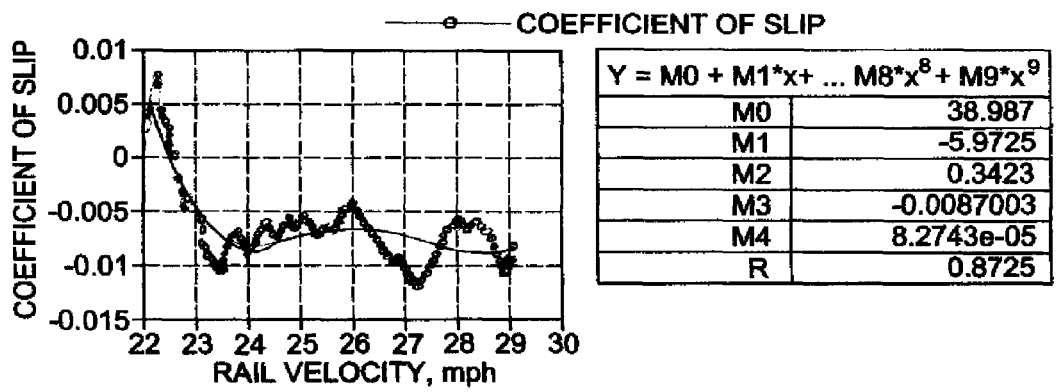

FIG. 25
PASSIVE WHEEL - NS49 CAR (CABOOSE) DECELERATION
* Decleration in Tangential Track
* Weight = 103,000 lbs
* P = 18.8 MPa
* 2 cm contact patch assumed
* Frictional Coefficient = .317
* -12% relative to acceleration
* Variance = 0.12%
* Slip ~ 0.8%
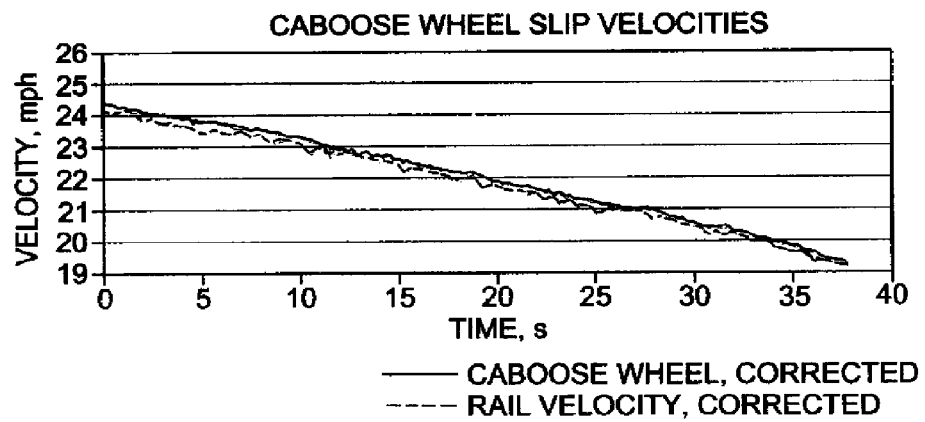
—— CABOOSE WHEEL, CORRECTED
---- RAIL VELOCITY, CORRECTED
—o— COEFFICIENT OF SLIP
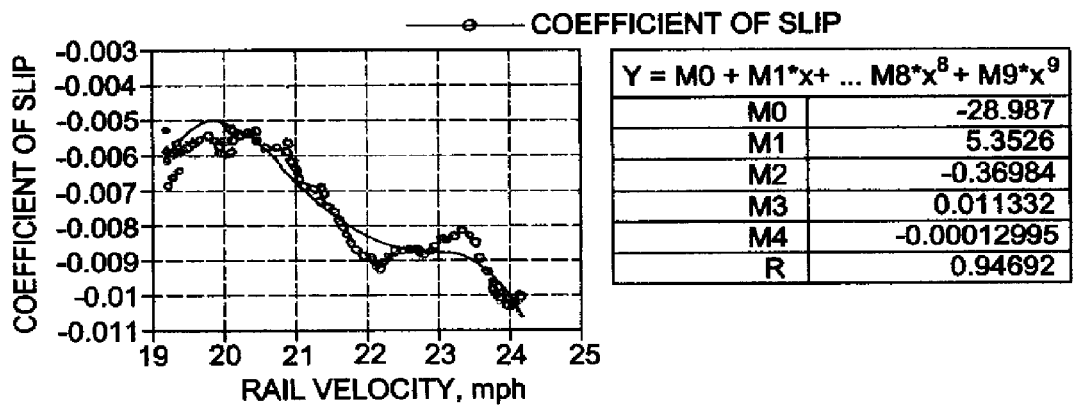
| $Y = M0 + M1*x + ... M8*x^8 + M9*x^9$ | |
|---|---|
| M0 | -28.987 |
| M1 | 5.3526 |
| M2 | -0.36984 |
| M3 | 0.011332 |
| M4 | -0.00012995 |
| R | 0.94692 |

FIG. 25 (cont.)
PASSIVE WHEEL - NS49 CAR (CABOOSE) DECELERATION
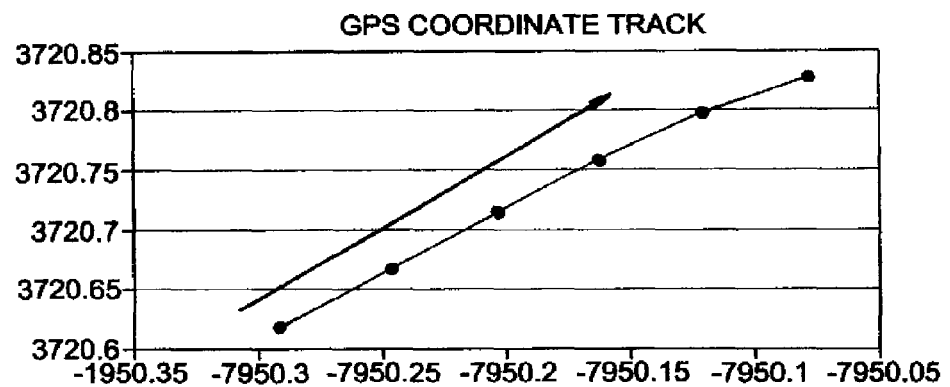
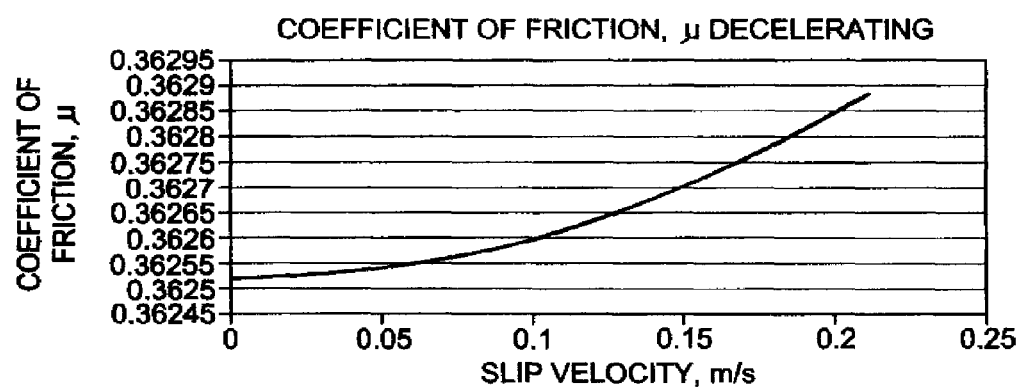

FIG. 26
SPECTRAL ANALYSIS, SLIP - FRICTION TESTS
* Spectral Signatures are functions of:
  * All velocity dynamics summed.
  * Vibration, Out-of-Plane Rotations, Intercepted Focal Beam Diameter. etc.
* Abnormal Signatures standout and may be used to infer conditions and state of the target surface.
NORMAL WHEEL SIGNATURES
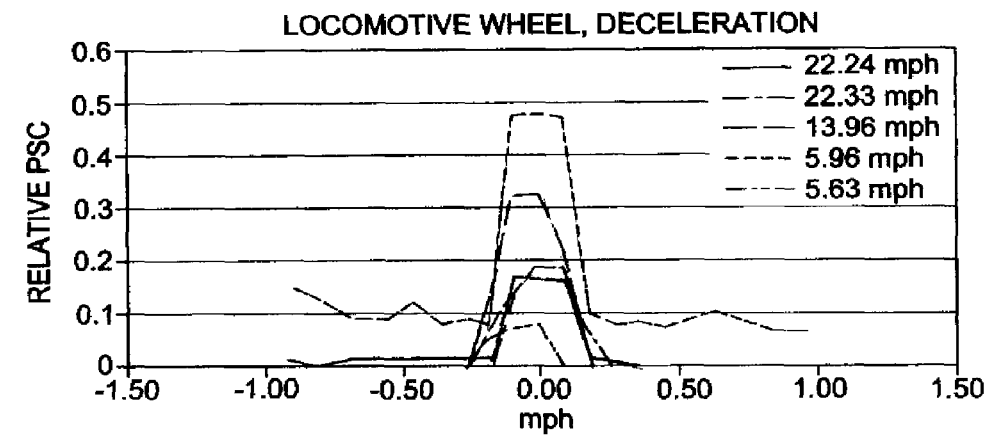
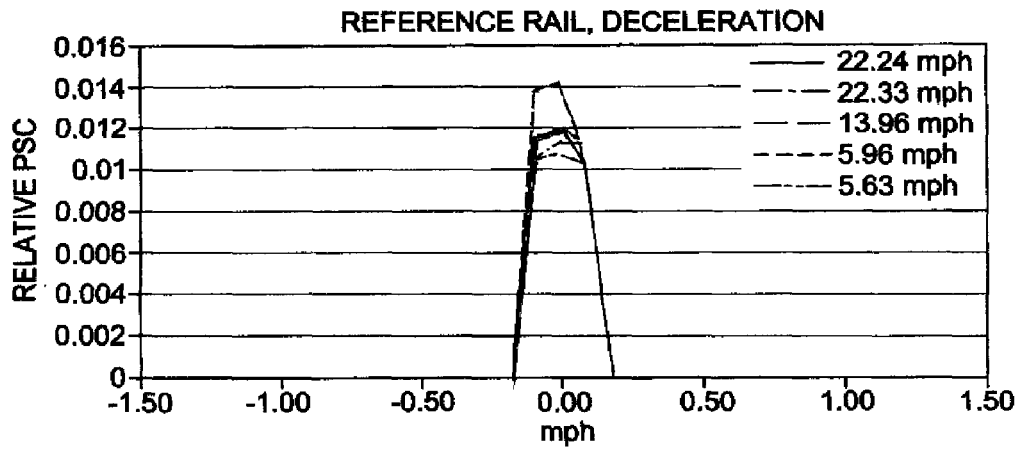

FIG. 26 (cont.)
SPECTRAL ANALYSIS, SLIP - FRICTION TESTS
SPECTRAL BROADENING DUE TO
WHEEL FLANGE ENGAGEMENT
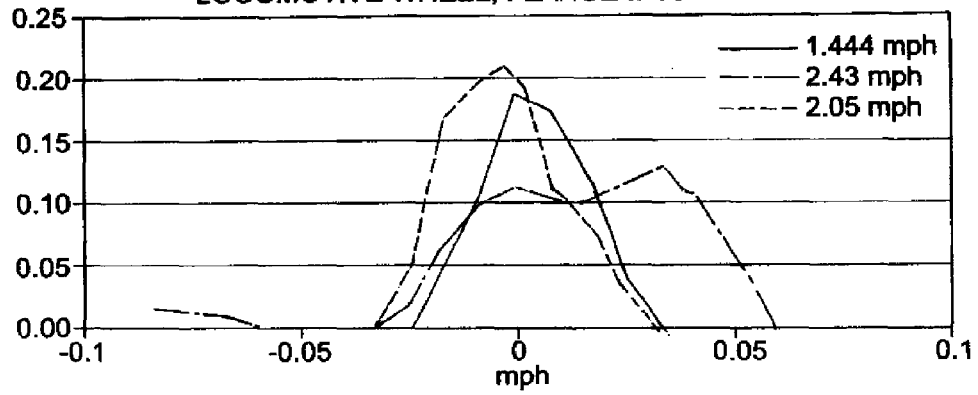
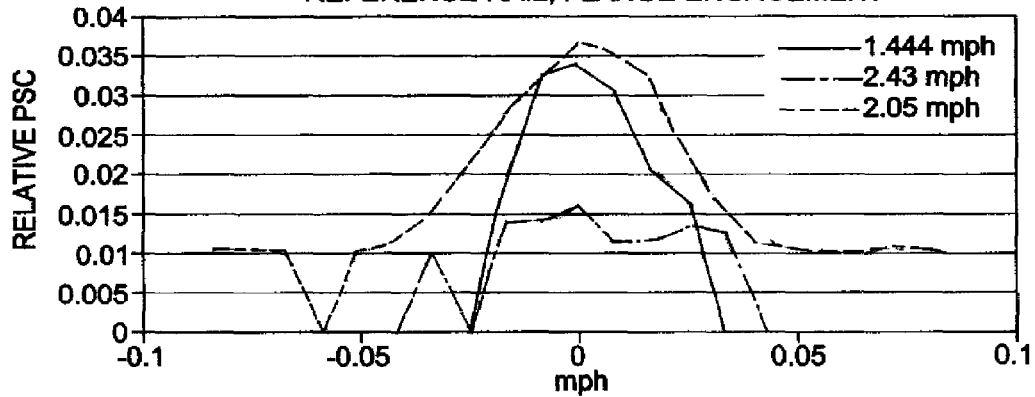

5-03-06 ROANOKE - NORFOLK SOUTHERN TRACKSIDE TESTS

* System Concept is expanded to include off-vehicle testing
* Two Trains Interrogated:
  * Eastbound with 1 inch optic @ 18 ft standoff
  * Westbound with 2 inch optic @ 36 ft standoff Acquistion Screen

RESULTS - TRACKSIDE WHEEL SIGNATURE VARIANCE

RESULTS - TRACKSIDE WHEEL SIGNATURE VARIANCE

FIG. 29
RESULT - TRACKSIDE DOPPLER SPECTRAL VARIATIONS
* Variance of Doppler Spectra caused by:
  * Wheel Rotation Parameters, and:
  * Out of Plane Surfaces
  * Vibration
  * Multiple Targets in Beams (Spatial or Temporal clutter)
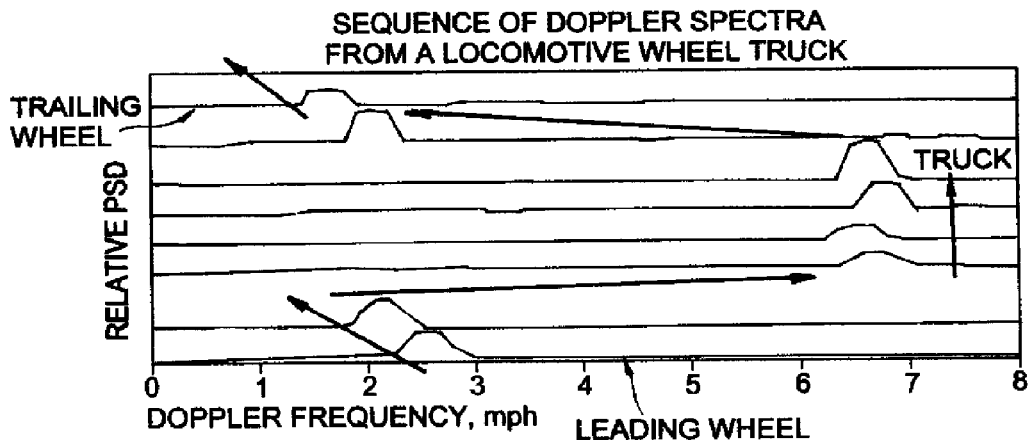
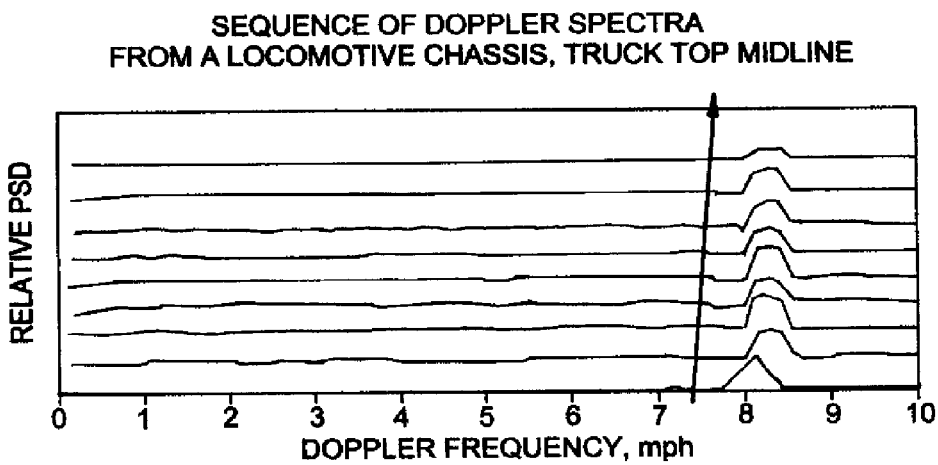

FIG. 29(cont.)
RESULT - TRACKSIDE DOPPLER SPECTRAL VARIATIONS
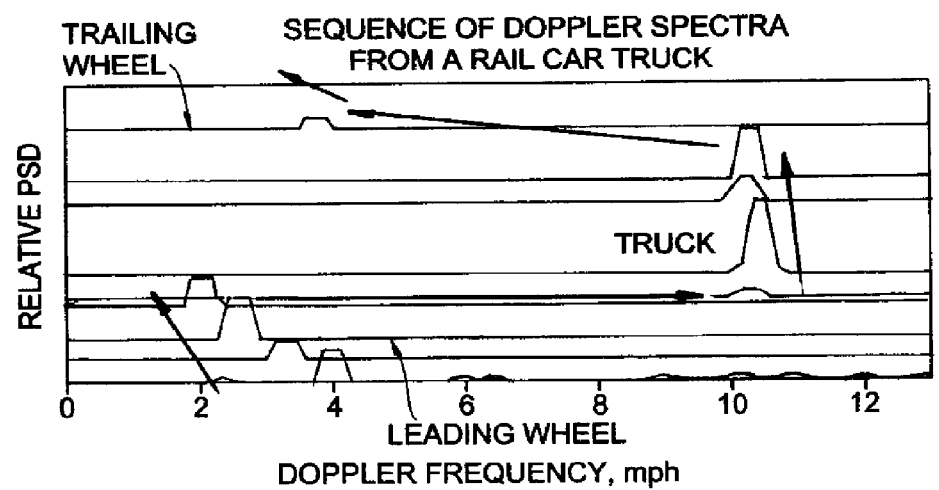
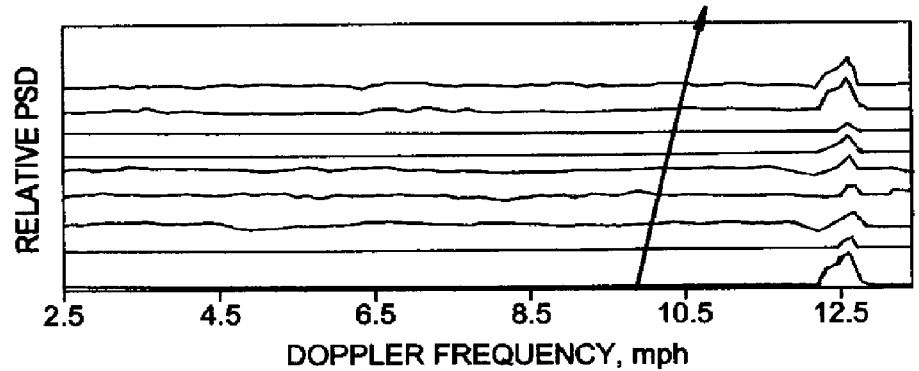

FIG. 30
ADDED TRACKSIDE MONITORING RESULTS AND CONSIDERATIONS
System Performance & Functionaliaty Increases with Design for Objective
* Vibration Sensing
  * Wheel
  * Targeted Infrastructure
* Motion Dynamics and Artifacts
  * Hunting
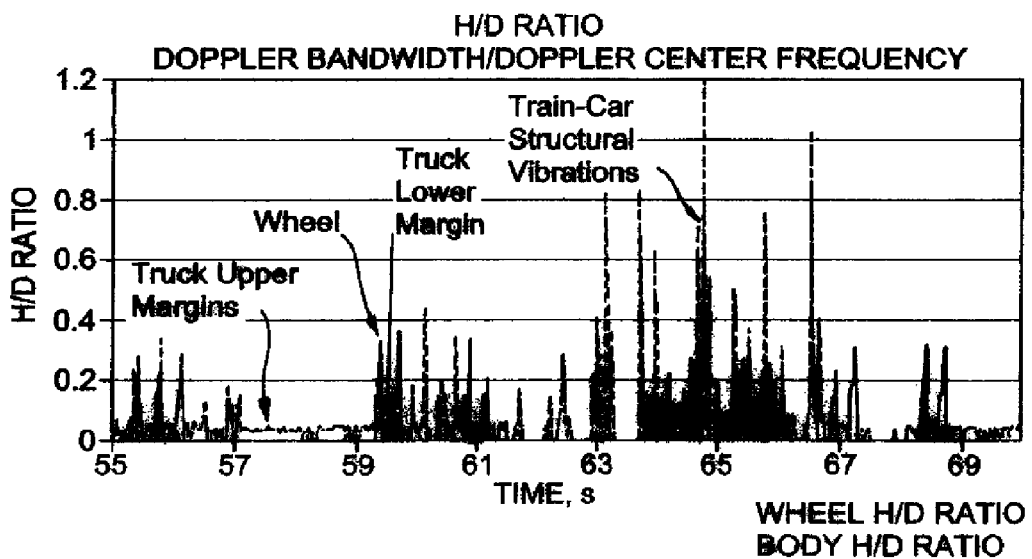
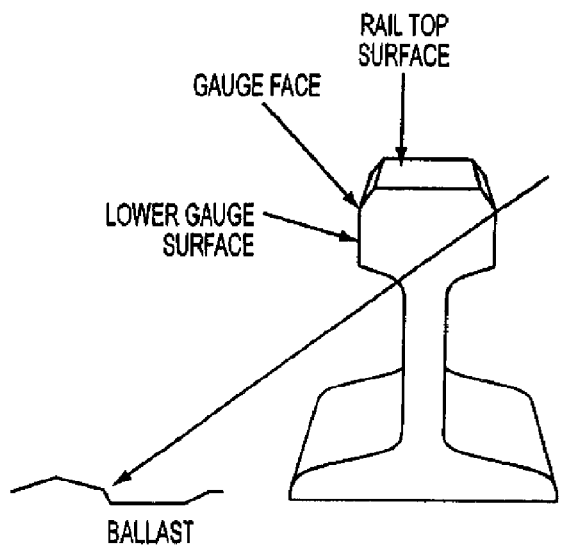
FIG. 33

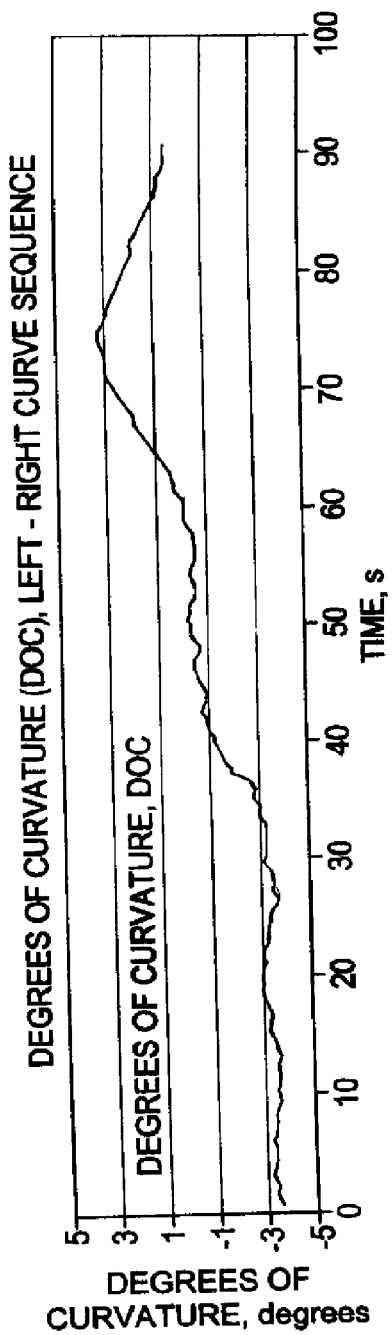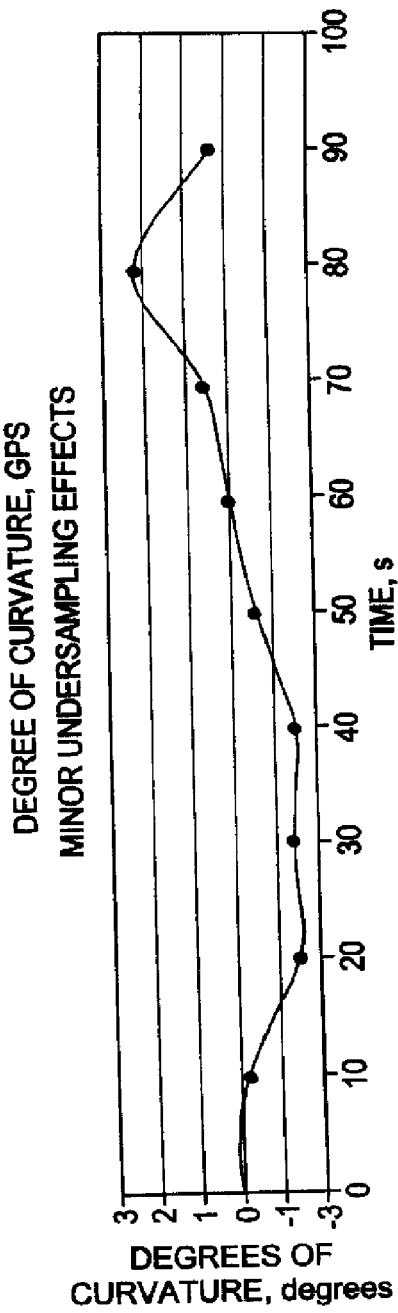

DEGREES OF CURVATURE IN STRONG RIGHT HAND CURVE, ROANOKE, 5/10/06

DEGREES OF CURVATURE, GPS
SHOWS EFFECTS OF UNDERSAMPLED DATA

HIGHWAY TO DIRT ROAD, SPINS AT END

DOPPLER SPECTRA

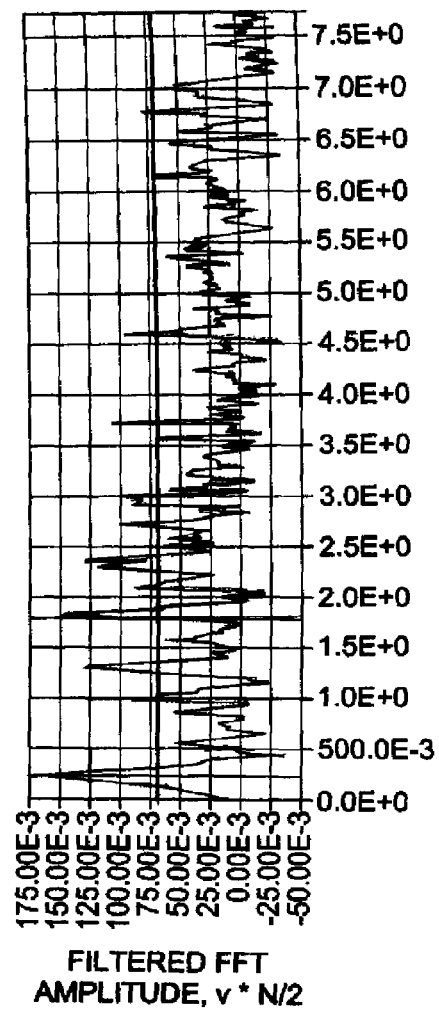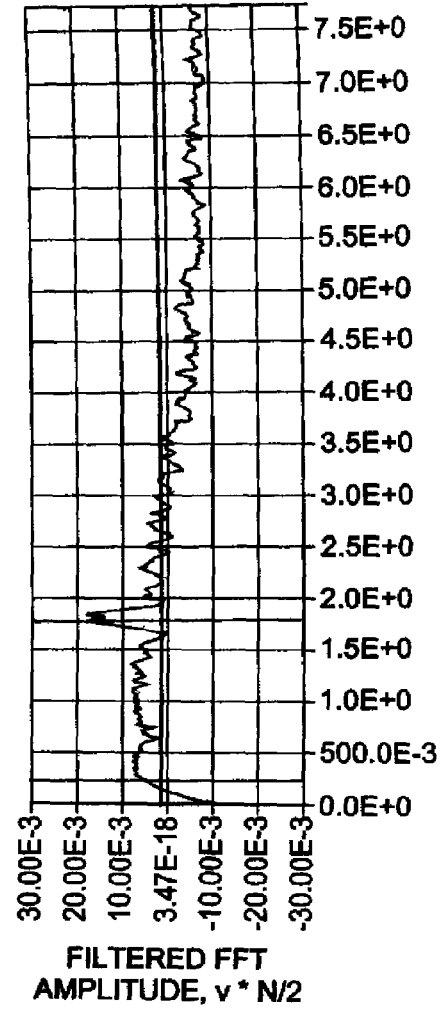
FIG. 43(a) NO AVERAGING
FIG. 43(b) 100 AVERAGES 10,000 AVERAGES

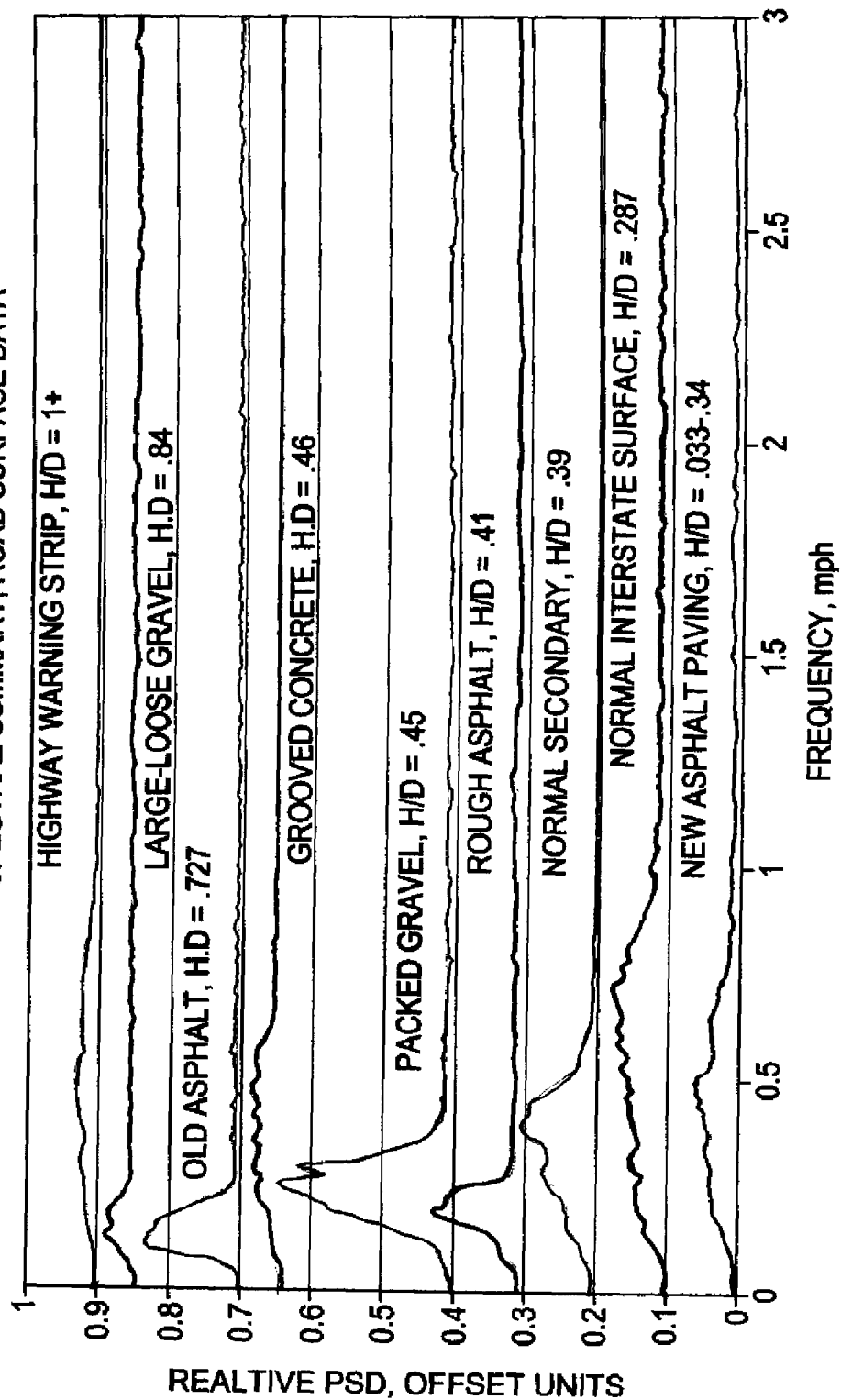

SURFACE SIGNATURES

GAUGE LOWER FACE SURFACE SIGNALS, H/D RATIOS

H/D SHOWING EFFECTS ON RAIL TOP SURFACE IN A CURVE

DOPPLER SENSOR FOR THE DERIVATION OF TORSIONAL SLIP, FRICTION AND RELATED PARAMETERS

CROSS-REFERENCE TO RELATED APPLICATIONS

The present application claims the benefit of U.S. patent application Ser. No. 11/765,215, filed Jun. 19, 2007, which in turn claims priority of U.S. Provisional Patent Application Nos. 60/814,890, filed Jun. 20, 2006; 60/814,891, filed Jun. 20, 2006; and 60/846,082, filed Sep. 21, 2006. The full disclosures of these applications are incorporated herein by reference.

FIELD OF THE INVENTION

The present invention relates generally to motion sensors for motive rotation, and in particular to the use of Doppler techniques in laser radar (Light Detection And Ranging, or LIDAR) sensors and, more particularly, to the use of a plurality of such sensors to compare vehicle velocity and wheel rotational velocity relative to the ground, as well as road bed curvature and road surface structure.

DESCRIPTION OF RELATED ART

Existing technologies for comparison of vehicle velocity and wheel rotational velocity relative to the ground are primarily associated with strain and force gauges that require physical contact with the dynamic elements to determine the requisite parameters. Any application relying on frictional adhesion, or lack thereof, between rotating or translating surfaces or combinations thereof have wear and performance issues. Automotive applications rely on electronic sensors of axle parameters such as load and spin rate to infer tire slippage or, conversely, grip, adhsesion and traction. There is a need for a system and method that provides direct measurement of vehicle velocity and wheel rotational velocity relative to the ground and does not require physical contact with the dynamic elements.

In addition, existing technologies for determination of characteristics of travel surfaces are primarily associated with Global Positioning Systems (GPS), inertial navigation systems, laser ranging systems that utilize time of flight or triangulation principles, mechanical gauging or camera based systems. None of these systems is capable of operating at full highway or rail operational speeds to a high degree of accuracy. Laser velocimeters have been used to calculate vehicle paths in three dimensional space, but in general have not been used to determine road bed curvature and width due to cost constraints.

As noted, existing technologies are primarily associated with systems that are deficient in temporal performance, cost or require mechanical contact. It would be beneficial to have a system that is non-contact, that is extremely robust and has substantial secondary benefits in terms of measuring velocity, vibration, displacement and other secondary parameters. The sensor technology used in any system should be low in cost, robust and should be deployable over large distances for remote interrogation of the inferred or directly measured parameters. Any such system should be able to determine surface parameters down to micron dimensions, or out to meters. That allows for rapid assessment of surface parameters that bear on path related parameters such as surface tire adhesion, slip, friction, etc.

As an example, in the rail industry, the beams that measure curvature can also be used to measure rail integrity and/or integrity of the rail ballast bed. Rails should be constantly screened for out of tolerance curvature and generally from operating equipment at rail speeds. Loose track can exhibit dynamic changes in curvature, providing a warning of oncoming derailment. The same concept applies to highway maintenance and highway vehicles on the verge of roll-over accidents. However, lack of cost effective equipment capable of making such measurements is a limitation to condition based maintenance. Numerous other industrial related advantages may be seen in detecting material displacements in scenarios such as continuous process mills.

Additionally, steel wheels on rails rapidly develop damage in the rail surfaces (top and gauge face). Because of this, rails should be constantly screened for surface defects and generally from operating equipment at rail speeds. Numerous other industrial related advantages may be seen in detecting bearing raceway galling and incipient failures, as well as production assessment of continuous process mills. The same concept applies to highway maintenance, including bridges and other travel surfaces. It would be beneficial to have equipment capable of making such measurements so that proper maintenance can be made.

Existing technologies are primarily associated with laser ranging systems that utilize time of flight or triangulation principles, speckle interferometry, mechanical gauging or camera based systems. None of these systems is capable of operating at full highway or rail operational speeds.

Because of the limitations of the traditional techniques, there is a need for characterization techniques and technology that can assess travel surfaces. There is also a need for such techniques that provide the benefits and avoid the disadvantages discussed above.

SUMMARY OF THE INVENTION

One aspect of the invention provides for the simultaneous measurement of 1) the rotational velocity of a surface rotating about an axis, and 2) the forward velocity of the axis using LIDAR techniques. From these measurements a sensor for the measurement of resistance, friction, slip, adhesion, grip, traction, or adhesion or related, derived parameters (degree of lock, wheel drag, etc.) may be derived. Derived parameters include but are not limited to the primary parameters of acceleration, distance, vibration, etc. and the secondary parameters including those noted in the preceding examples.

The invention also provides for the determination of characteristics of a travel surface while traveling on the travel surface. Using optical sensors on the sides of a vehicle traveling on the travel surface, light reflected from the travel surface is collected by the optical sensors. By determining induced Doppler shifts, including Doppler signal bandwidths, from the light collected by the optical sensors, characteristics of the travel surface can be determined.

The invention also provides for the determination of characteristics of a travel surface while traveling on the travel surface by providing an incident light from a light source to the travel surface, collecting light reflected from the travel surface, determining a surface induced Doppler shift from the incident and collected light and determining the surface feature aspect ratio based on the determined surface induced Doppler shift and secondary characteristics including bandwidth and/or intensity.

Another aspect of the present invention is a method for measuring the properties of a travel vehicle or a travel surface, upon which the travel vehicle travels includes providing an incident light from a light source to the travel surface, collecting light reflected from the travel surface, determining a surface induced Doppler shift from the incident and collected light and determining at least one of a motion property of the travel vehicle and a surface property of the travel surface based on the determined surface induced Doppler shift. The step of determining at least one of a motion property of the travel vehicle and a surface property of the travel surface may include determining a torsional slip of a rotating surface of a contact between the travel vehicle and the travel surface, determining the surface feature aspect ratio of the travel surface, and determining a degree of curvature of the travel surface. Torsional slip can be positive (powered slip) or negative (drag, skid, etc.). An example of the former is slip that occurs when too much power is applied to the drive axles and examples of the latter are partially applied braking forces, which may include normal frictional forces or abnormal engagement of the torsional elements such as worn bearings, etc.

In a further aspect of the invention, a method for measuring torsional slip includes measuring a tangential velocity of a surface rotating about an axis via a Doppler shifted return of a first laser beam, measuring a translational velocity of the axis via a Doppler shifted return of a second laser beam and deriving a torsional slip of the rotating surface from the difference between the tangential velocity and the translational velocity. The rotating surface may be a drive surface of a wheel mounted on an axle of a vehicle carriage, the axle being the axis, where the wheel may be a steel wheel of a locomotive. The first and second laser beams may be generated by respective optical units mounted on the vehicle carriage, the first laser beam being directed to a rotating side surface of the wheel and the second laser beam being directed to a surface being driven by said wheel. The Doppler shifted return of the first laser beam may be used to calculate the angular velocity of the wheel, and the tangential velocity is calculated from the angular velocity and a radius of the wheel. Further from this information, wheel diameter may be calculated in motion.

In another aspect of the invention, an apparatus for measuring torsional slip includes a mechanism for using a Doppler shifted return of a first laser beam to measure tangential velocity of a surface rotating about an axis, a mechanism for using a Doppler shifted return of a second laser beam to measure translational velocity of the axis and a mechanism for deriving the torsional slip of the rotating surface from the difference between the tangential velocity and the translational velocity. The apparatus may also include a mechanism for using a Doppler shifted return of a third laser beam to measure tangential velocity of a second wheel mounted on the axis, wherein the first and third laser beams are generated by respective optical units mounted on the vehicle carriage, the first laser beam being directed to a rotating side surface of the wheel and the second laser beam being directed to a rotating side surface of the second wheel and a mechanism for deriving the relative torsional slip of the wheel and the second wheel from the respective tangential velocities of the wheel and the second wheel.

In another aspect of the present invention, a method for determining the characteristics of a travel surface while traveling on the travel surface includes providing an incident light from a light source to the travel surface, collecting light reflected from the travel surface, determining a surface induced Doppler shift from the incident and collected light and determining surface feature aspect ratio based on the determined surface induced Doppler shift. In addition, in another aspect of the present invention, a method for determining characteristics of a travel surface while traveling on the travel surface including providing a first optical sensor on one side of a vehicle traveling on the travel surface, providing a second optical sensor on an opposite side of the vehicle traveling on the travel surface, where the one side and the opposite side are on opposite sides of the vehicle and perpendicular to a direction of travel, collecting light reflected from the travel surface by the first and second optical sensors, determining induced Doppler shifts from the light collected by the first and second optical sensors and determining at least one characteristic of the travel surface based on the determined induced Doppler shifts.

Such sensors as described herein have considerable application in motive applications such as aircraft tire wear, automotive/racing tire applications and railway operations. Secondary benefits of such an application include the simultaneous measurement of forward platform velocity/acceleration/distance parameters and the simultaneous measurement of vibration in the structures. Numerous arrangements of this concept are possible such that combinations of tangential and translational velocities and their respective bandwidth and/or temporal behaviors enable the measurement of resistance, slip, friction, vibration, surface figure, etc. in diverse operational embodiments. That includes conditions in which the rotational axis does not translate but torsional slip or velocity differences are encountered between rotational elements and/or stationary elements. Examples are a belt coupled rotational shafts, magnetic/friction clutch elements, drilling bits and moving drilled waste (or stationary surface), etc. The latter concept would as an example apply to oil/water drill rigs for measurement of drill bit wear and drilling performance via extraction of velocity, vibration, acceleration and derived parameters. They are all beholden to the same basic concepts as outlined herein and as may be utilized or rearranged by those understanding the art. These concepts may be augmented with those of U.S. Pat. No. 6,621,561, "Doppler Rotational Velocity Sensor", for added embodiments and increased functionality.

The present invention is a method or technique for measuring the degree of "slip" of a torsional element (e.g., a wheel on a surface) via two-beam Doppler velocimetry or combinations of velocity sensors. The resulting Doppler measurements may be used to determine slip (or lock, drag, etc.) as well as forward velocity and induced vibrational spectra.

In the Virginia Tech (VT) LIDAR Laboratory, we have demonstrated simple velocimeter LIDARs based on low cost optical fiber sources and networks for the non-contact measurement of velocity on arbitrary surfaces. Similar functions may be effected by use of conventional free-space optical systems as well. We have demonstrated the ability to measure differential velocities such as represented by the disclosed sensor scenario and derive or infer primary or secondary information from the basic velocity data. In the case of the present invention, velocity difference measurements of from fractions of an inch to over twenty meters away from objects have been demonstrated. Velocities from 0.005 m/s to over 1000 m/s have been measured with these devices.

As noted, existing technologies are primarily associated with strain, force and rate sensors that require physical contact with the dynamic elements to determine the requisite parameters. The method described herein is a non-contact modality that is extremely robust and has substantial secondary benefits in terms of measuring vibration and other secondary parameters. The sensor technology used is low in cost, robust and may be deployed over large distances for remote interrogation of the inferred or directly measured parameters. Many measurement scenarios previously impossible are enabled with the present invention. The concepts disclosed herein find analogous applications in medical and sports applications as well as the noted industrial, commercial, environmental and military applications.

As an example, in the rail industry, steel wheels on rails have a steady state slip ratio of approximately 1-7%. Measuring slip in dynamic track operations with feedback control to the engine for torque control can save large amounts of fuel and attendant costs for long or short haul operations. Measuring high slip ratios (>30%) implies safety related malfunctions such as wheel lock, bearing/brake drag, wheel flange engagement, etc. Measurement yielding zero or near zero slip ratios are indications of effective lubrication or a lack of application of braking forces when they are required. The measurement of grip in NASCAR racing cars can provide real-time control information to the drivers for winning advantages and simultaneously, if integrated, provide superior tire wear information for pit stops. Numerous other industrial related advantages may be seen in detecting bearing race way galling and incipient failures.

Again, as an example of a particular application, requirements exist across the rail industry for the simple measurement of rail friction, either by direct measurement methods (e.g., mechanical gauges) or by inferred methods. The velocity difference between the tangential velocity of a driven, rotating rail wheel and the velocity of the wheel's centroid (e.g., axle or box platform) over the rail is directly related to the wheel slip factor, and therefore the frictional grip between the wheel and the rail. Sensors that can measure that velocity difference in real-time operations can therefore be used to directly measure and monitor rail friction.

BRIEF DESCRIPTION OF THE DRAWINGS

Preferred embodiments of the present invention will be set forth in detail with reference to the drawings, in which:

FIG. 18 is a slide showing data for a locomotive acceleration-deceleration cycle with steady state run;

FIG. 25 is a slide showing data for passive wheel deceleration;

FIG. 26 is a slide showing spectral signatures data;

FIG. 29 is a slide showing results for trackside Doppler spectral variations;

FIG. 30 is a slide showing added trackside monitoring results and considerations;

FIG. 33 provides an illustration of the surfaces of a rail;

FIG. 34 provides experimental results, with FIG. 34(a) illustrating a graph of degree of curvature over time and FIG. 34(b) providing a graph of the degree of curvature;

FIG. 45 illustrates multiple spectral signals for multiple types of travel surfaces;

DETAILED DESCRIPTION OF THE INVENTION

The present invention is directed to multiple embodiments that are used in determining properties of road surfaces and the performance of vehicles on those road surfaces. A first section is directed to methods and systems for the determination of resistance, friction, torsional slip and related properties through optical Doppler techniques. A second section is directed to methods and systems for determining curvature and width of the road surface through optical Doppler techniques. A third section is directed to methods and systems for determining road surface structure and integrity through optical Doppler techniques. A fourth section is directed to methods and systems suited for medical and sports applications using novel Doppler techniques.

Measurement of Resistance, Friction, Slip Adhesion or Related, Derived Parameters The underlying technology for the present invention is a methodology and concepts for pairing simple, coherent optical fiber networks with averaging Fourier Transform analysis of optical detector signals to implement cost effective, eye-safe, non-contacting motion (velocity) sensors unique to applications in which the desired information is derived or inferred from the analysis of a Doppler frequency spectrum via an algorithm unique to the particular application. The present invention is a new sensor embodiment derived from simple coherent LIDAR forms, i.e. a torsional slip sensor implemented with a derivative methodology using Doppler/time varying LIDAR principles.

If the simultaneous measurement of translational and rotational velocity via Doppler techniques is applied to the velocity difference between the tangential velocity of a surface rotating about an axis and the forward velocity of the axis, the resistance, friction, slip or adhesion (hereafter "torsional slip") of the rotating surface may be derived. Such sensors have considerable application in motive applications such as aircraft tire wear, automotive and racing tire applications and railway operations. Secondary benefits of such an application include the simultaneous measurement of forward platform velocity/acceleration/distance parameters and the simultaneous measurement of vibration in the structures.

Numerous arrangements of this concept are possible such that combinations of tangential and translational velocities enable the measurement of torsional slip in diverse operational embodiments. They are all beholden to the same basic concepts as outlined herein and as may be utilized or rearranged by those understanding the art. These concepts may be augmented with those of U.S. Pat. No. 6,621,561, "Doppler Rotational Velocity Sensor," for added embodiments and increased functionality.

Figure 1:
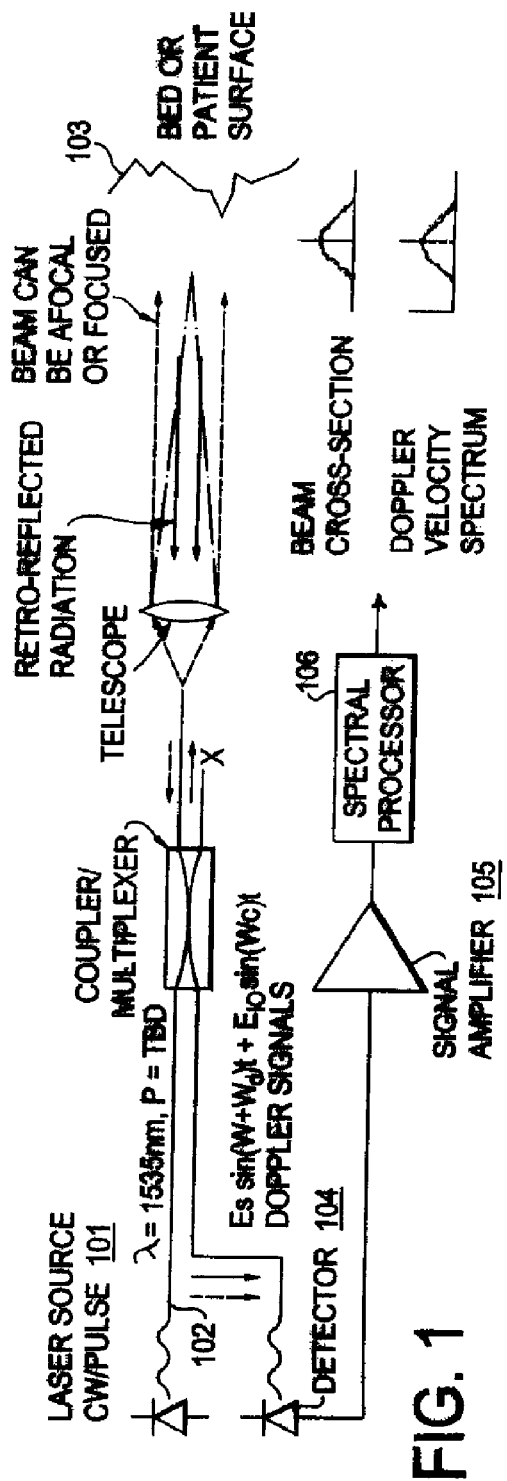
FIG. 1 is a diagram of a single beam, optical fiber sensor schematic used for non-contact monitoring.

To review then, the basic concept of an optical fiber doppler sensor is shown in FIG. 1. As noted, free-space LIDARs may be used with the equivalent functions being enabled by discrete optical elements separated by air paths. In the figure, light from a fiber coupled laser source or optical fiber laser 101 is routed through a directional optical fiber element 102 to a remote measurement surface 103. Light scattered from the surface and returned to the fiber is guided to detector elements 104 by the fiber network in such a manner as to interfere with a portion of the source light. The low frequency interference is generally not analyzed, and the Doppler shift on the scattered light is analyzed 106 in detailed frequency and phase spectra.

Numerous rearrangements of the basic optical schematic of FIG. 1 have been tested in all conventional LIDAR modalities as adapted to the current invention. Critical to any intended modality or function, however, is a spectral processing architecture that is adaptable to the specific sensor function. For the disclosed reduction to practice examples, a program used for multi-mode LIDAR has been adapted to track sensed activity in multiple modes. The program allows for adaptive, post-spectral processing of the Doppler signatures in terms of peak detection (center Doppler frequency), Doppler bandwidth, sample rate, filter functions, thresholding, background subtraction, temporal tracking, etc. These functions must be adapted to the specific noise characteristics, parasitic parameters and function of the implemented network.

Historically, the use of Doppler velocimetry in sensing applications has been associated specifically with the measurement of the direct velocity component of motion extracted from the Doppler shift imposed on the coherent radiation source (laser, RF, acoustic, etc.) used for the sensing task. In this "sense" or definition, velocity, its integral (e.g. distance, range, displacement, etc.) or its differential (e.g. acceleration) has been the specific target of the measurement technique. Velocity, distance or acceleration are therefore inherent, primary parameters of the measurement, related by simple differentials or integrals. It is not obvious that the secondary characteristics (i.e. parameters) of the primary Doppler parameters may be used in determining a sensate's nature or specifics as derived from combinations of primary and secondary Doppler characteristics. In this manner, parameters may be "derived" from the primary Doppler via unconventional techniques. As an example of "Derived Parameter Sensing", the bandwidth of the Doppler signal often contains significant information on the stability of the sensed object that may be extracted via temporal or other analyses to extract parameters of substantial or consequential interest. In such a manner, the torsional spin components on a golf ball may be determined. Other examples claimed herein include the derivation of slip, friction or wheel lock from differential Doppler between two or more lidar beams, the derivation of surface roughness (e.g. surface figure), the extraction of biological rhythms (e.g. breathing, pulse rate) and the measurement of sports/biophysical related performance/status such as intrinsic tremor, "sway" in gait function, etc. Derived Doppler methods are therefore claimed herein.

Figure 2:
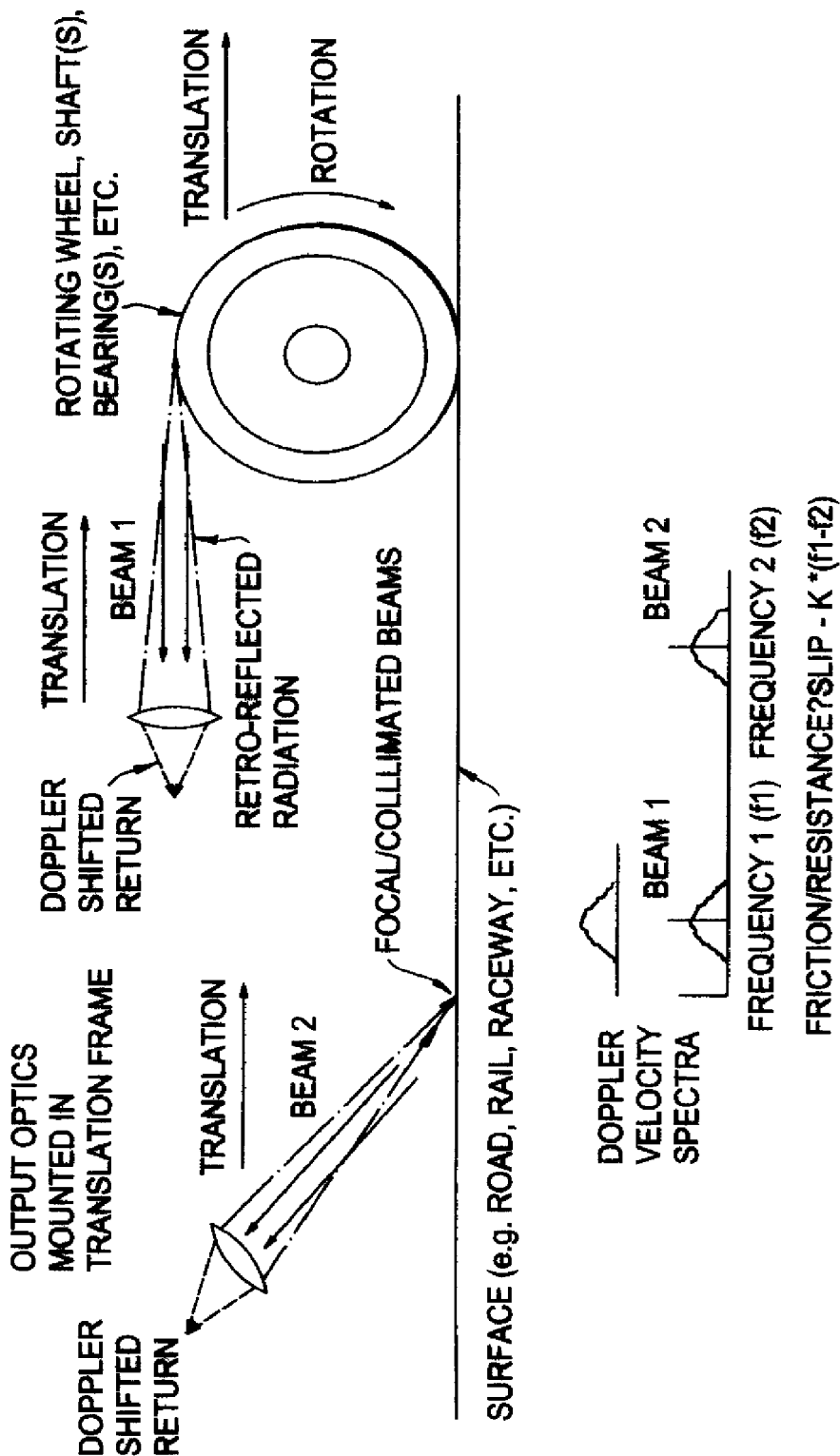
FIG. 2 is a diagram showing operation of the primary structures of the invention in one embodiment.
Figure 3:
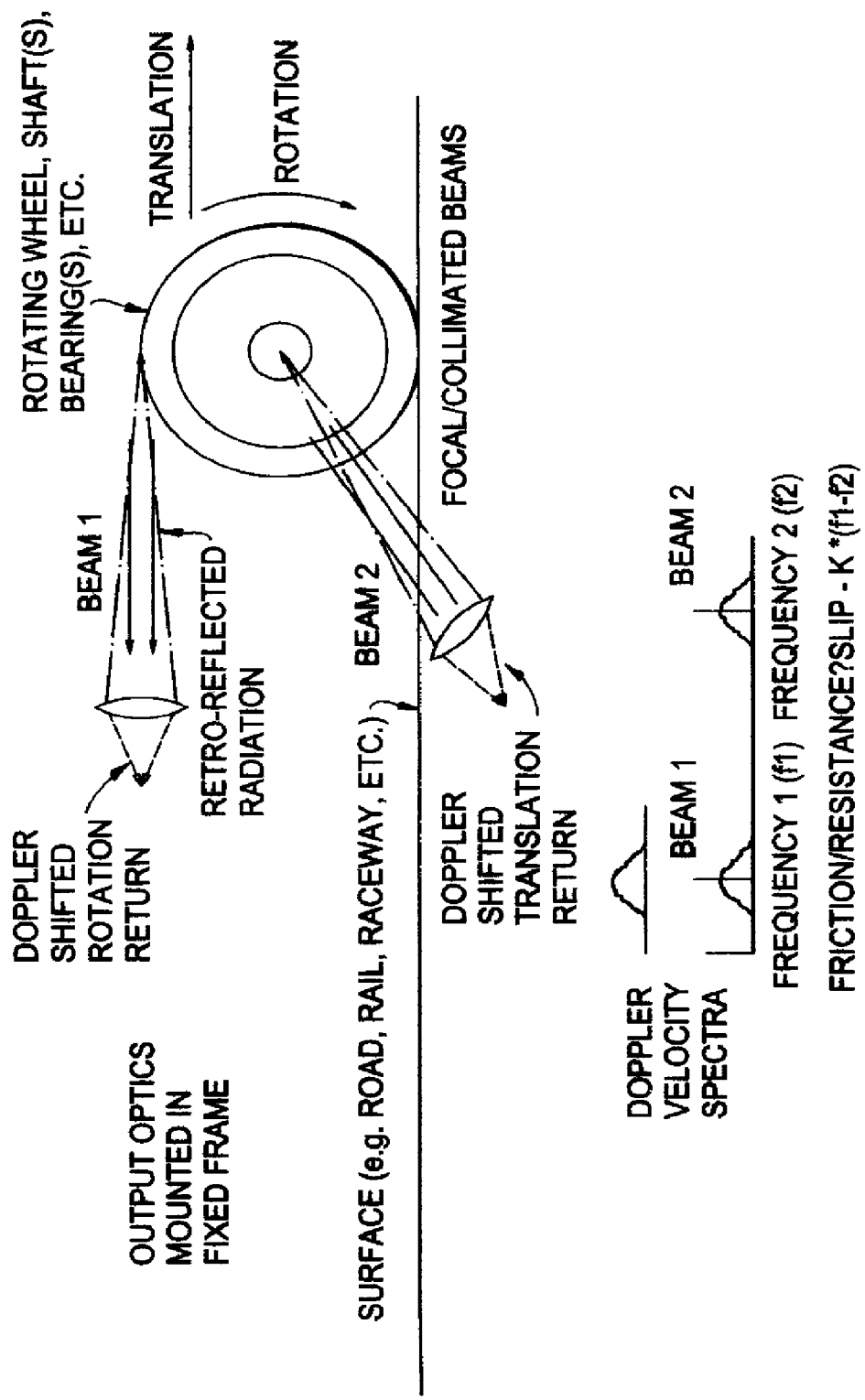
FIG. 3 is a diagram showing operation of the primary structures of the invention in a further embodiment.

FIG. 2 shows a primary embodiment of the invention as a torsional slip sensor for wheeled platforms on driven surfaces. Here the optics translate with the reference frame of the forward moving axis, as in railway locomotives or automotive racing applications. Alternately, as shown in FIG. 3, the optics may be fixed to the reference frame of a stationary surface and detect Doppler from the forward moving axis as it is passing, as in trackside railway locomotives or roadside automotive racing applications.

The development of non-contact Doppler instrumentation and techniques for vehicle dynamics has proceeded with the completion and testing of a two channel portable system. Two channel tests were conducted on a vehicle of convenience in such configurations as to demonstrate direct application in a variety of vehicle dynamic applications. Results from these tests are presented herein as a synopsis of results. The specific goal was the demonstration of the measurement of the coefficient of slip, friction or the degree of lock/drag for railway application as applied aboard rolling stock (engines drive, idling wheel bearing friction) or trackside diagnostics of such parameters. However, the invention may be applied with equal validity on an automotive platform, which will now be demonstrated.

For brevity, the results are presented as graphics in accordance with the test sequence. Data are taken at VT tower access road facility on 15 inch Michelin LTX-A/T tires mounted on 4×2 Jeep Cherokee Sport. Road conditions are dry, 65 degrees F., hard packed crushed rock surface with loose aggregate or standard secondary road macadam.

Figure 4:
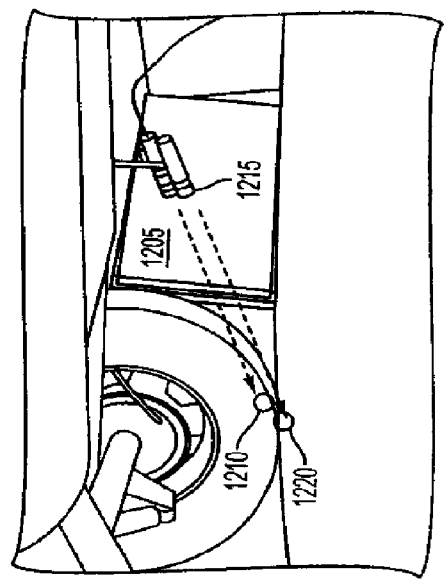
FIG. 4 is a photograph of the two channel optics module mounted under the test vehicle.

The first test configuration tested terramechanic traction, i.e. "spinning out" on gravel. In this test, longitudinal drive tire slip is deliberately induced via breakaway acceleration. Two channel measurements of vehicle ground velocity and wheel tangential velocity are then used to directly compute slip coefficient according to the SAE standard formulation of:

$$C_s = (V_w - V)/V_w \quad (1)$$

where $C_s$ is slip coefficient, $V_w$ is the tangential velocity of the driven wheel and V is the velocity of the vehicle. FIG. 4 shows the two channel optics mounted under the test vehicle. The upper optical channel 1205 is aimed at the sidewall 1210 of the tire, as shown by the dashed line to the circle 1210, and illustrates the point of measurement for the tangential tire velocity. Ground velocity is taken by the lower optical channel 1215 parallel to the optical axis for the tangential measurement but displaced 1.75 inches horizontally so as to intercept the ground surface 1220 instead of the tire sidewall 1210, as shown by the dotted line to the circle 1220.

Figure 5:
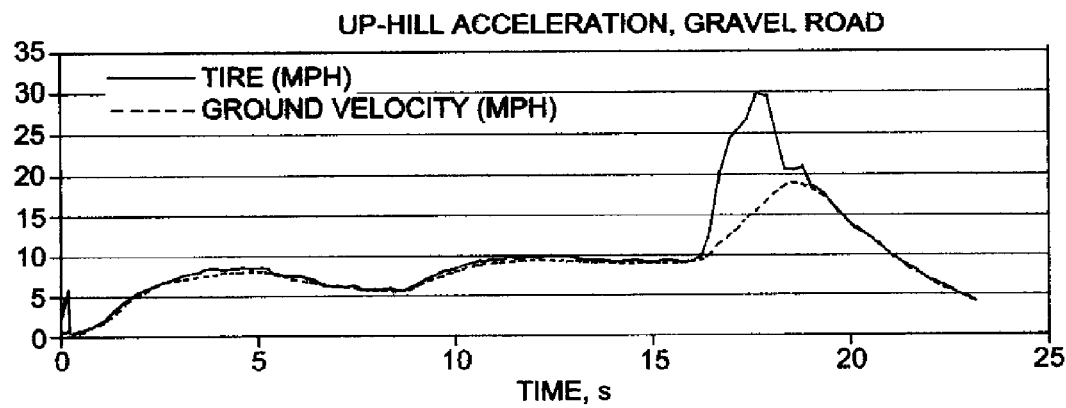
FIG. 5 is a time graph of independent tangential tire velocity and vehicle ground speed during up-hill acceleration on a gravel road.
Figure 6:
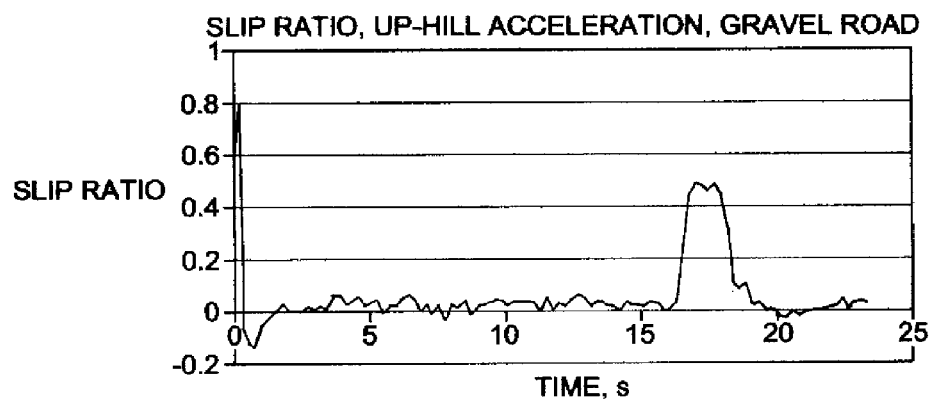
FIG. 6 is a time graph showing the slip ratio for the data shown in FIG. 5.
Figure 7:
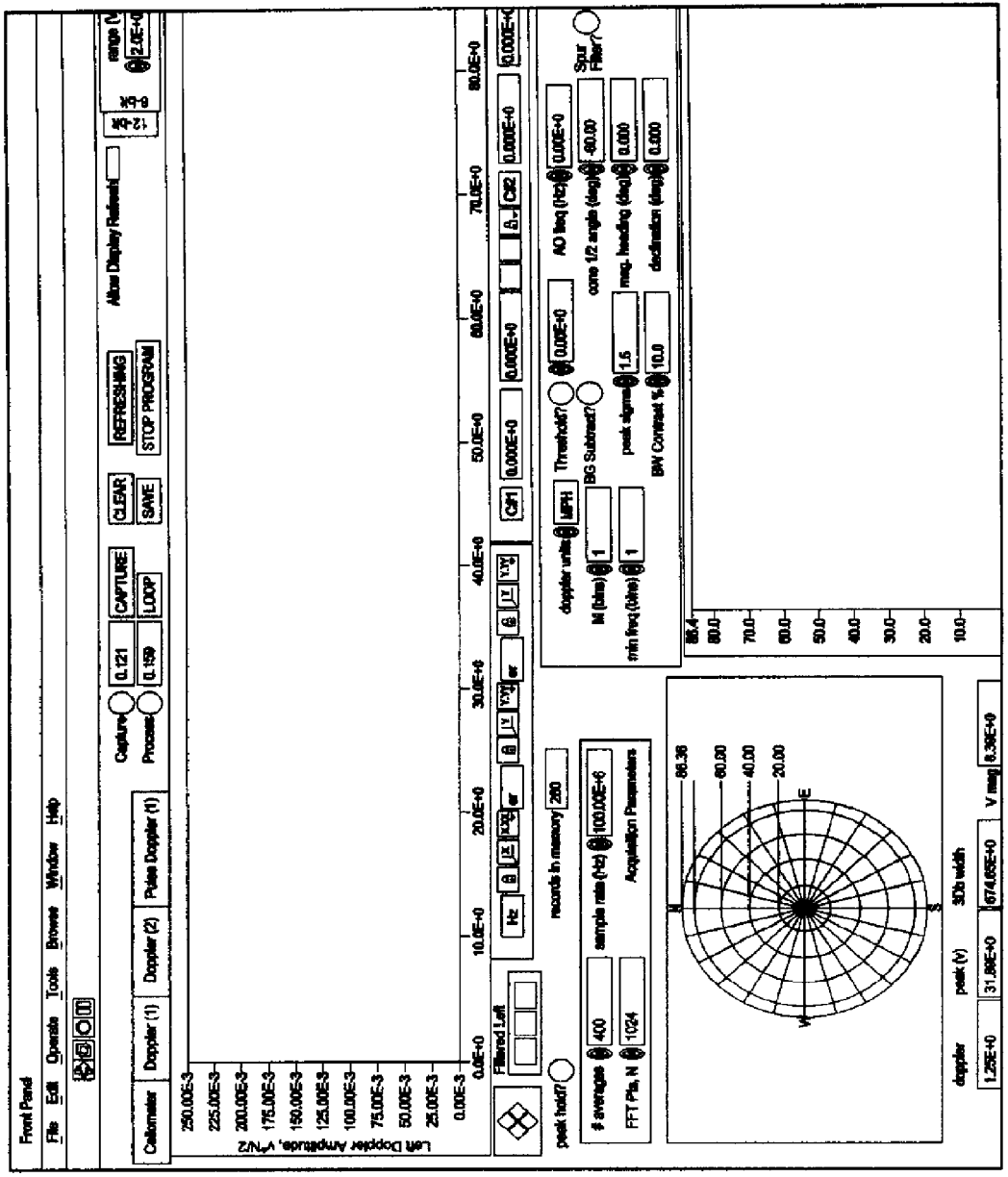
FIG. 7 is a computer screen shot for acquisition of the data of FIG. 5.

FIG. 5 shows independent tangential velocity of tire and vehicle ground speed. FIG. 6 shows the slip ratio for the data of FIG. 5. FIG. 7 shows the computer acquisition screen for the data of FIG. 5.

Figure 8:
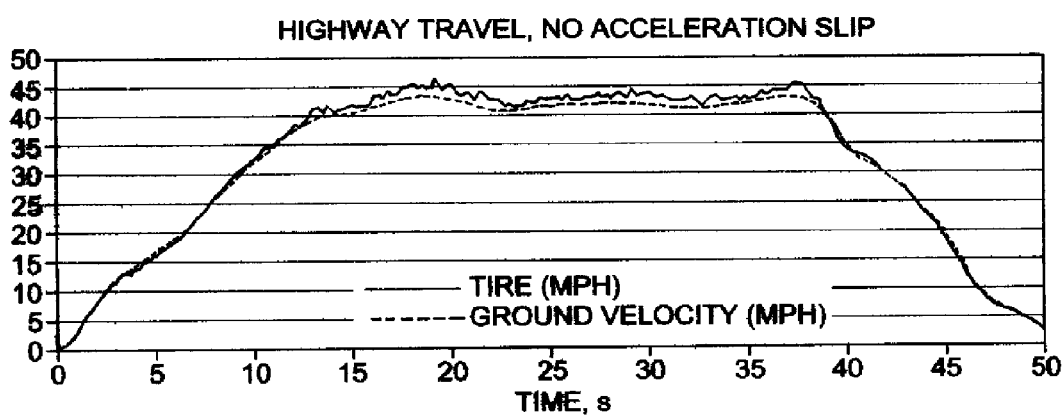
FIG. 8 is a time graph showing differential velocity between tire and ground at highway speeds without acceleration.
Figure 9:
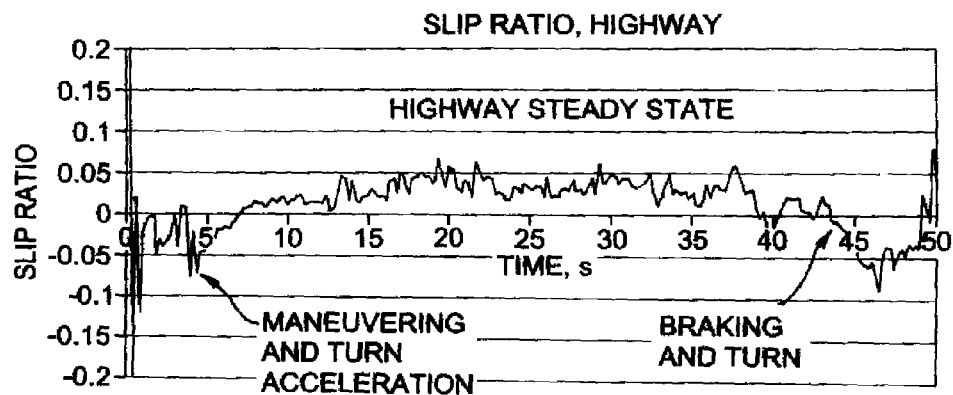
FIG. 9 is a time graph showing a coefficient of slip for the velocity data of FIG. 8.
Figure 10:
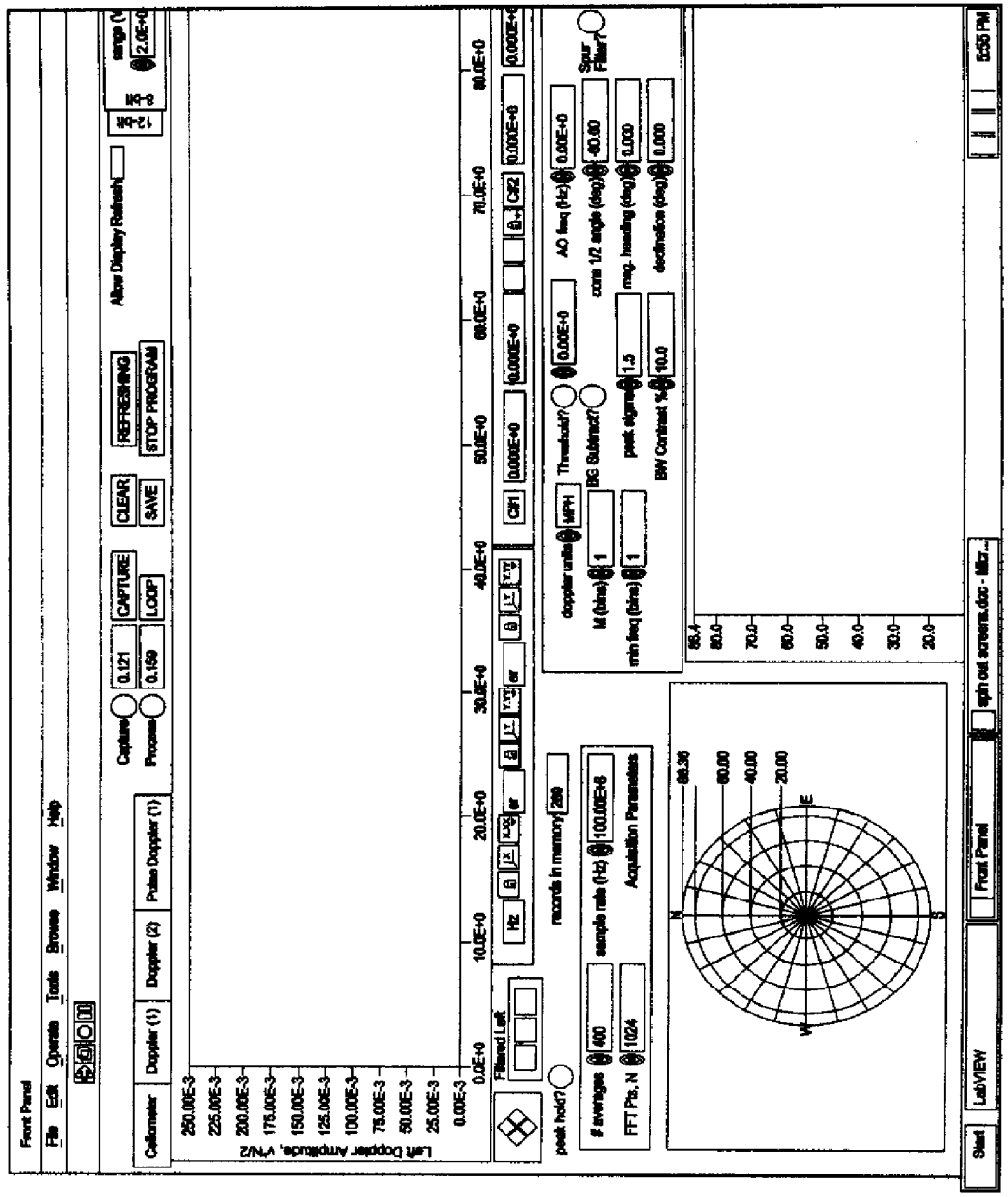
FIG. 10 is a computer screen shot for acquisition of the data of FIG. 8.

Data is taken using the two channel slip instrumentation along the macadam of Price's Fork road. Road conditions are dry, 65 degrees F. Accelerations are controlled to avoid deliberate or induced tire slip. Coefficient of slip is measured by the disclosed technique between 5% and 30+% where noticeable. FIG. 8 shows the differential velocity between tire and ground at steady-state highway speed. FIG. 9 shows the coefficient of slip for the velocity data of FIG. 8. FIG. 10 shows a computer acquisition screen for the data of FIG. 9.

Figure 11:
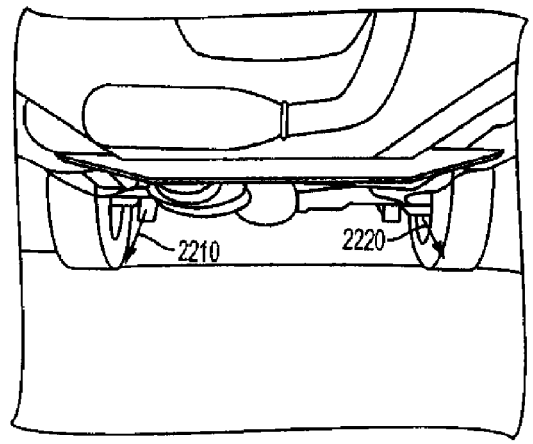
FIG. 11 is a photograph of the underside of the test vehicle showing the optical test configuration for testing drive tire differential velocities.
Figure 12:
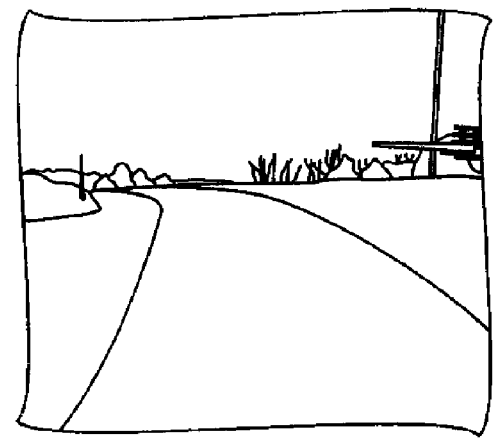
FIG. 12 is a photograph of an incline on a gravel road used for a reverse acceleration test.

Rearranging the test optics so that one channel is focused on the left rear tire sidewall 2210 (original channel left in place) and so that the second channel is focused symmetrically on the right rear tire sidewall 2220, as shown in FIG. 11, allows measurement of velocity differences and the slip differential velocity between the drive wheels. Multiple tests on gravel and highways were conducted.

Figure 13:
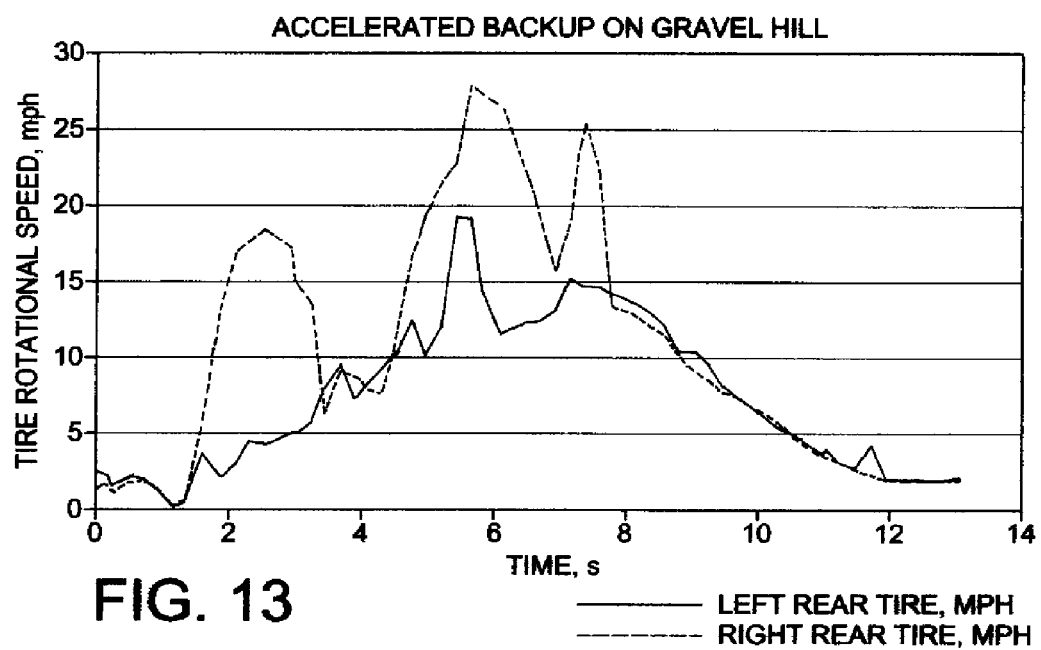
FIG. 13 is a time graph of left and right drive tire tangential velocities on the gravel road during a reverse accelerated test.
Figure 14:
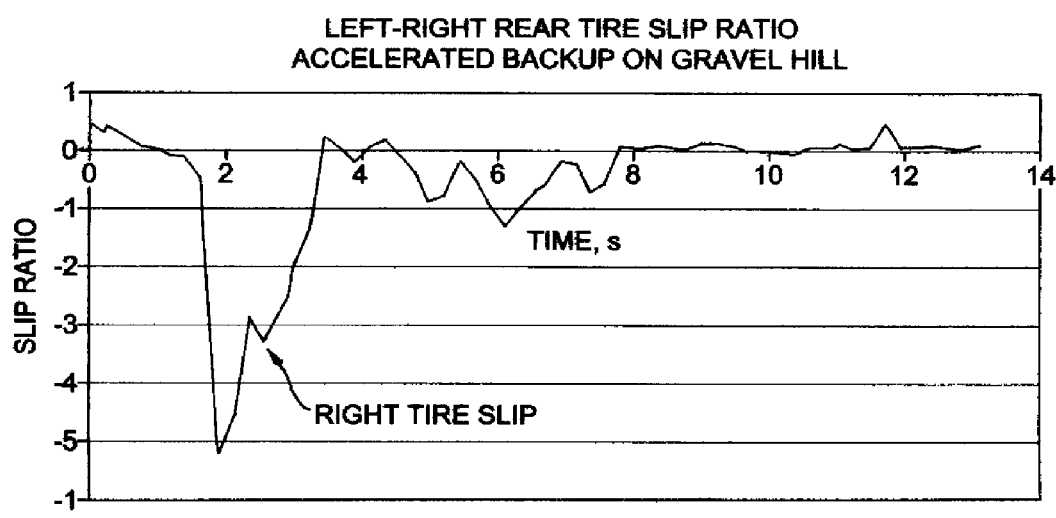
FIG. 14 is a time graph showing drive tire differential slip ratio for the reverse acceleration test on the gravel road.

Tests presented in the current section used a backing acceleration up a gravel road incline, with a 90 degree curve as the demonstration element. FIG. 13 shows the left and right drive tire tangential velocities on the gravel road during a reverse acceleration test. FIG. 14 shows the tire differential slip ratio for the reverse acceleration test on the gravel road. This concept allows trackside measurements of rail curvature as well as wheel to wheel frictional variance.

Figure 15:
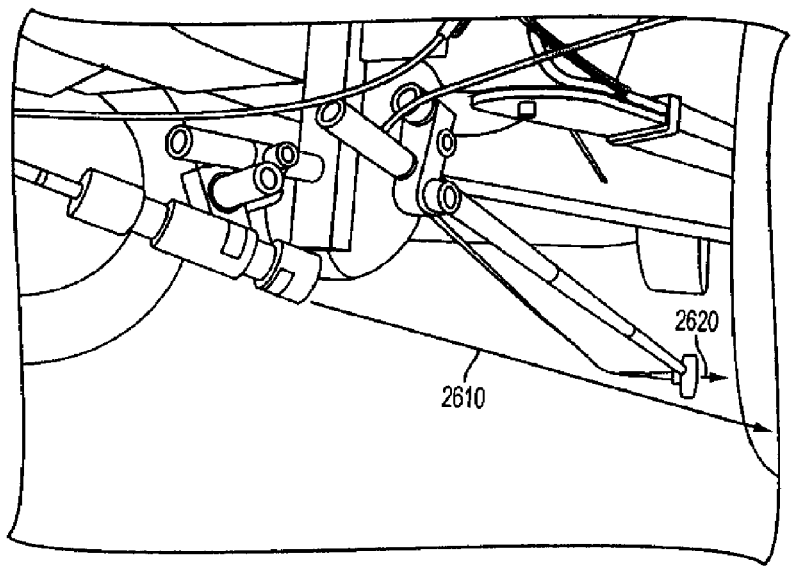
FIG. 15 is a photograph of the underside of the test vehicle showing the lateral Doppler optic on a stiff extension from a tangential optic holding fixture.
Figure 16:
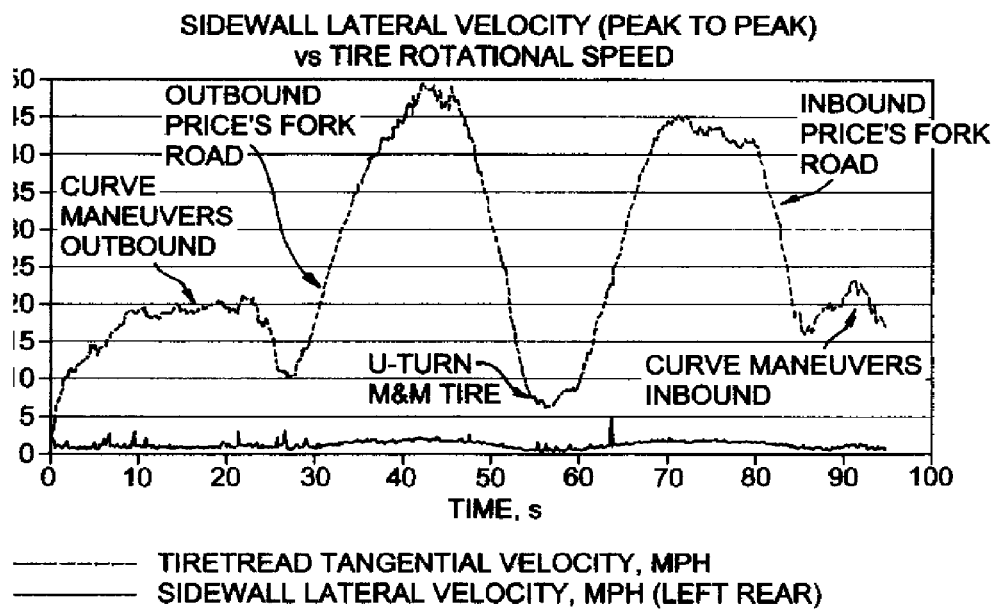
FIG. 16 is a time graph of tire sidewall lateral velocity as related to tire tangential velocity (longitudinal velocity) during a test drive.

Next we tested tire sidewall velocity/vibration as compared to tangential velocity. In this series of tests, as shown in FIG. 15, the tangential velocity channel 2610 is left as previously configured. A separate, smaller optic 2620 is then used to detect tire velocity normal to the longitudinal or tangential axis, i.e. lateral sidewall velocity. In this configuration, a smaller (0.4 in diameter) lateral sense optic is mounted closer to the tire (3 inches) than the 21 inch focal distance used for the tangential channel. The later channel mount is a 0.5 in diameter stainless rod of approximately 18 in long. Consequently some cantilever modal vibration is expected in the mounting fixture. Quick tests imply that this velocity source magnitude is small relative to the velocity magnitude measured for the tire sidewall itself. The results of the test are shown in FIG. 16, where the upper line graphs the speed of the tire tread tangential velocity and the lower line graphs the sidewall lateral velocity.

Tests were also successfully conducted to validate the ability to simultaneously measure vehicle chassis motions, including lateral side-slip/grip/traction (spin-out), sway, vertical motion, vibration as a function of slip/grip, and road surface condition from Doppler bandwidth.

Test performance indicates robust non-contact performance of the disclosed concept for a wide variety of vehicle dynamics. Non-contact standoff distances may be accommodated with simple optical systems out to ranges approaching 100 feet from the dynamic target depending on the optics employed. With appropriate optical power and configuration, that range is not essentially limited.

More importantly, the disclosed data verifies the invention with regard to all torsional dynamics and proves an expanded range of embodiments in related dynamics. The goal of the tests was to validate application of the invention for automotive and railroad applications as appropriate to wheel/drive dynamics. The test results validated that a wider range of embodiments is supported by the invention.

For railroad applications, the invention may be expanded to include on board or trackside diagnostics for rail, wheel and rail bed surface condition as derived from the bandwidth of the Doppler. Rail, wheel, and car vibration may also be included, as derived from the bandwidth and spectral content of the Doppler. Rail geometric factors, such as bending, warping, and curvature from measurement of the Doppler from beam configurations that observe the effective velocity of the rail from an adjacent wheel or side of a rolling stock item can also be measured with the invention. For example, two beams looking from the left to the right and from the right to the left, focused on the rail while the train is moving, can be used to measure velocity and range via LIDAR principles that are directly reflective of local and regional track geometry, car velocity, acceleration, and motion dynamics.

The invention can also be expanded to include wheel slip, drag or lock applications. These include wheel vibration, bearing condition, degree of brake engagement (including the lack of brake engagement), chassis-track motion dynamics, chassis ground motion, and additional motion axes for single, differential or multiple wheel or axle vehicles. Rolling or trackside dynamics measurements in vertical, horizontal, acceleration and integrated displacement can also be included. Further, weather and equipment condition assessments can be made, such as track look-ahead visibility for safety and track surface defects.

All of the foregoing modes are likewise covered by the invention for automotive, trucking or aircraft applications. These include automotive side-slip, rolling or related wheel and chassis or drive dynamics, such as sideslip of a race-car chassis in turns or coefficient of grip. Wheel balance, sidewall surface figure and flex, internal pressure wave detection and imaging can also be measured with the invention. Terramechanics data appropriate to grip on various surfaces can also be detected, enabling coverage for soil, paving and hydroplaning surfaces with simultaneous measurement of the condition of the driving surface. Road surface condition and characterization can be obtained from the Doppler bandwidth using the invention. Thus, the invention provides a major sensor diagnostic to the transportation industry in general.

Verification of the technique implemented by the invention also validates the application of similar measurements to dynamic environments across disciplines, in view of the similarity in the operating dynamics and physics. For example, medical applications of the invention could include gait dynamics used for the measurement of physiological joint resistance. Skin surface imperfections and condition can be measured via scanned lidar beams interpreted for bandwidth and center frequency as disclosed for highway surface figure. Temporal analysis of Doppler waveforms from body walls was demonstrated to yield the derived parameters of pulmonary and cardiac rate. Sports applications would include the rotation dynamics of gymnasts or equipment parameters such as the tractional grip of shoes, skis, etc. Spin on sports apparatus, such as golf balls may be analyzed for either the athlete's performance or the performance of the equipment itself. With respect of optical fiber implementations, we have further verified that the invention may be applied through multi-mode optical fibers and extreme high temperature optical fibers such as sapphire. These validations expand the range of applicability of the disclosed techniques to include extreme high temperature environments, that is, over 2000 degrees centigrade. That allows measurements in extremely harsh environments such as oil well drilling shafts to assess bit drill and cutting performance.

The following discloses definitive test and application of the invention on railroad wheels for the measurement of slip and friction, supplementing the foregoing discussion which substantiates the concept for automotive applications relating to tires.

Figure 17A:
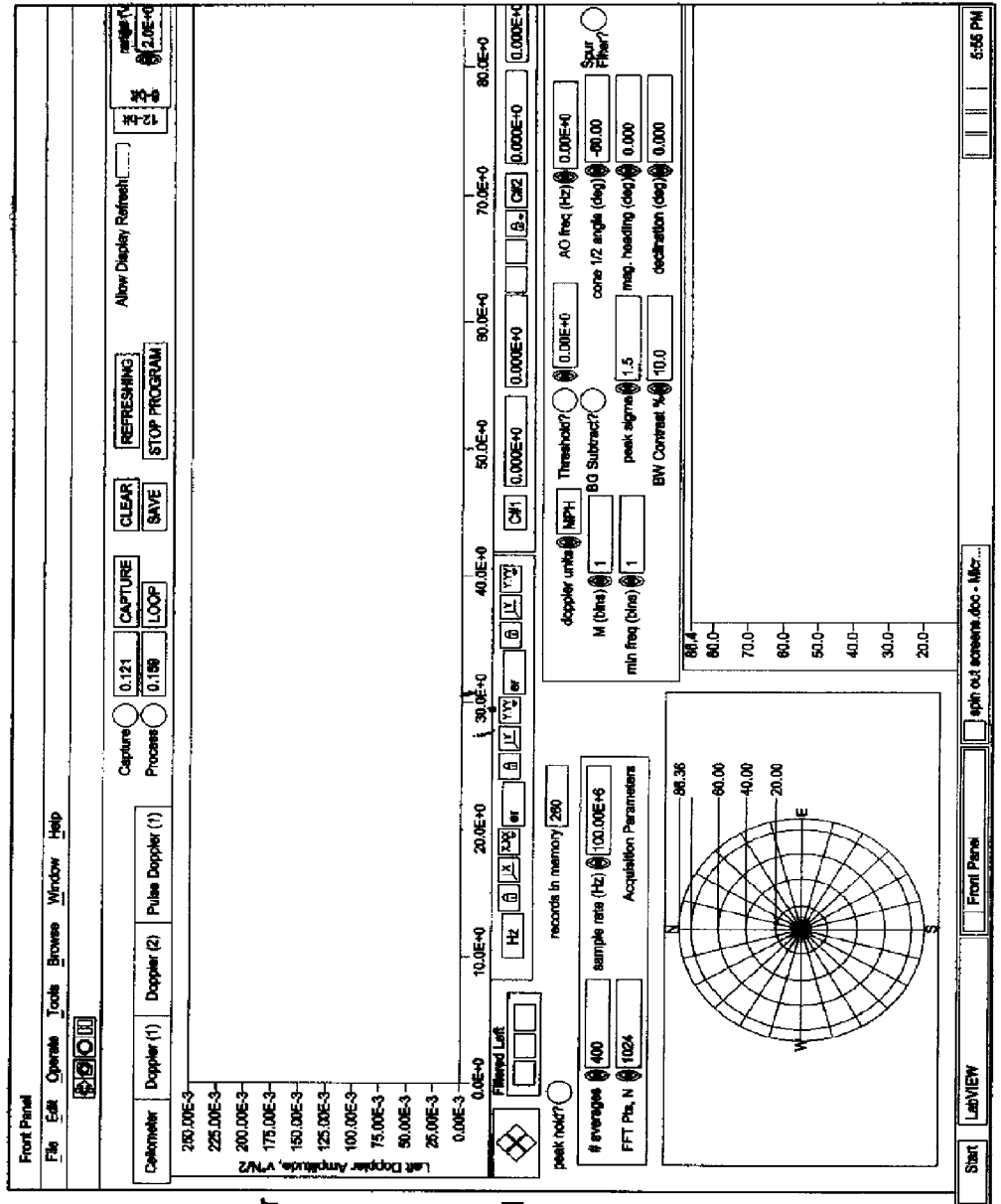
FIG. 17 is a slide describing the data acquisition software, including screen shots for the slip panel, vector panel and curvature panel.
Figure 17B:
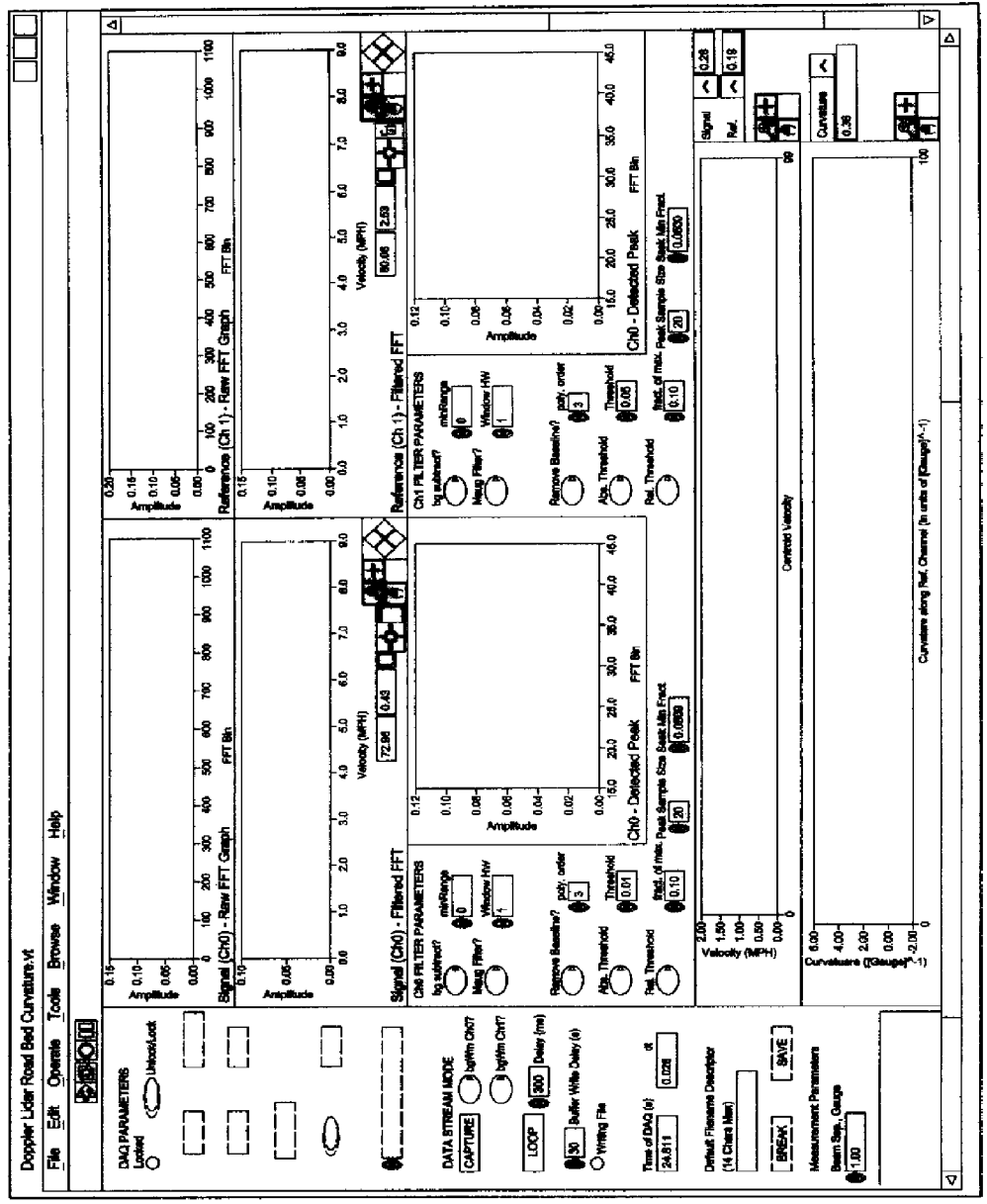
Figure 17C:
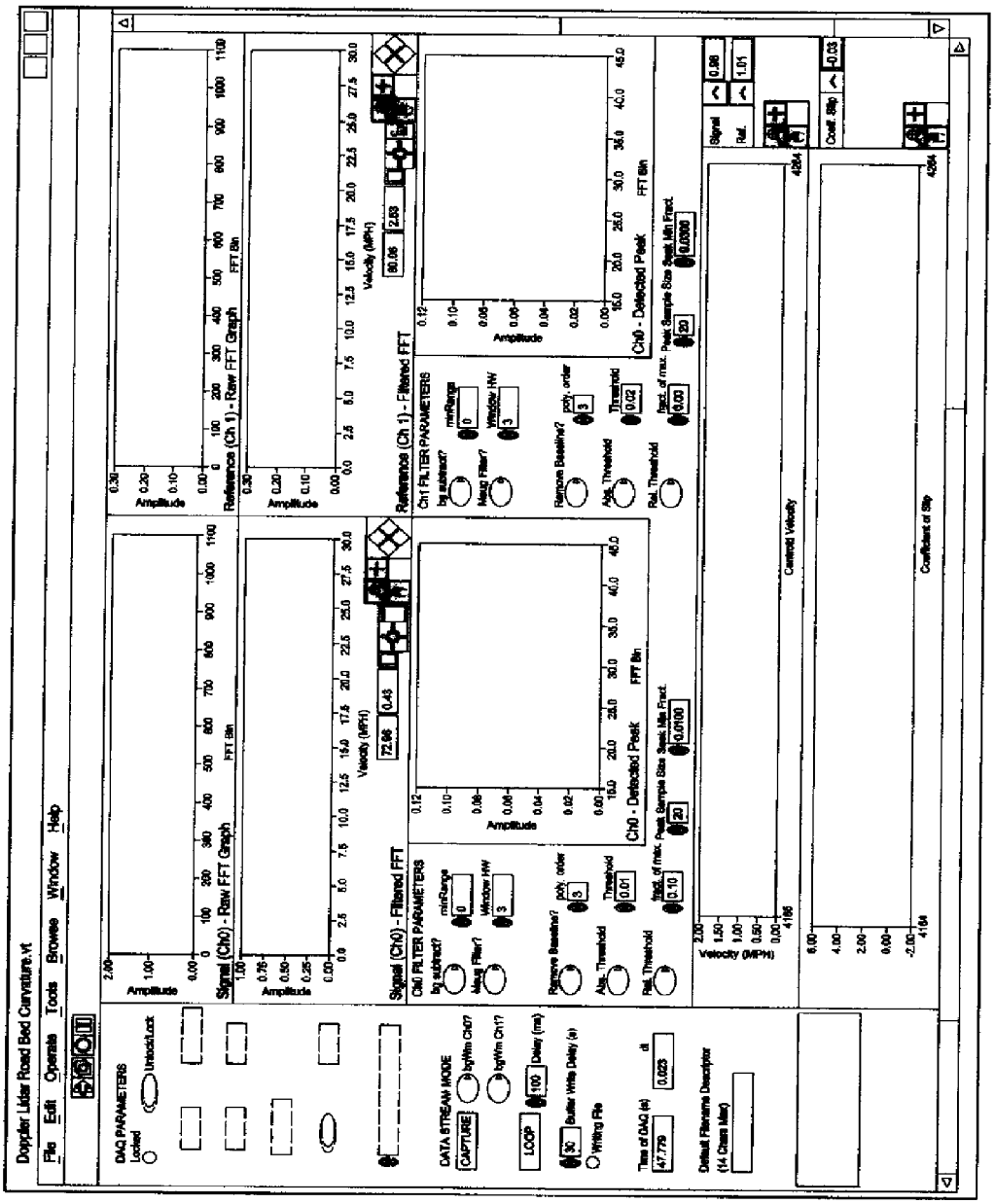

FIG. 17 describes the data acquisition software, including screen shots for the slip panel, vector panel and curvature panel. The software uses Labview based experimental codes, Virginia Tech acquisition software for high speed and spectral data (maximum data rate of 50 Hz), and Yankee Environmental Systems Inc. (YES Inc.) codes for long duration monitoring, curvature, and surface data (with a data rate of 4 Hz).

FIG. 18 shows data for locomotive acceleration-deceleration cycle with steady state run where there was smooth acceleration and deceleration, with a locomotive weight of 261,000 lbs, P=47.25 MPa, a 2 cm contact patch is assumed, a frictional coefficient of 0.2463, a variance of 1.5% (with 0.2% attributed to acceleration vs deceleration), and an average slip in the range of 2.6%.

Figure 19:
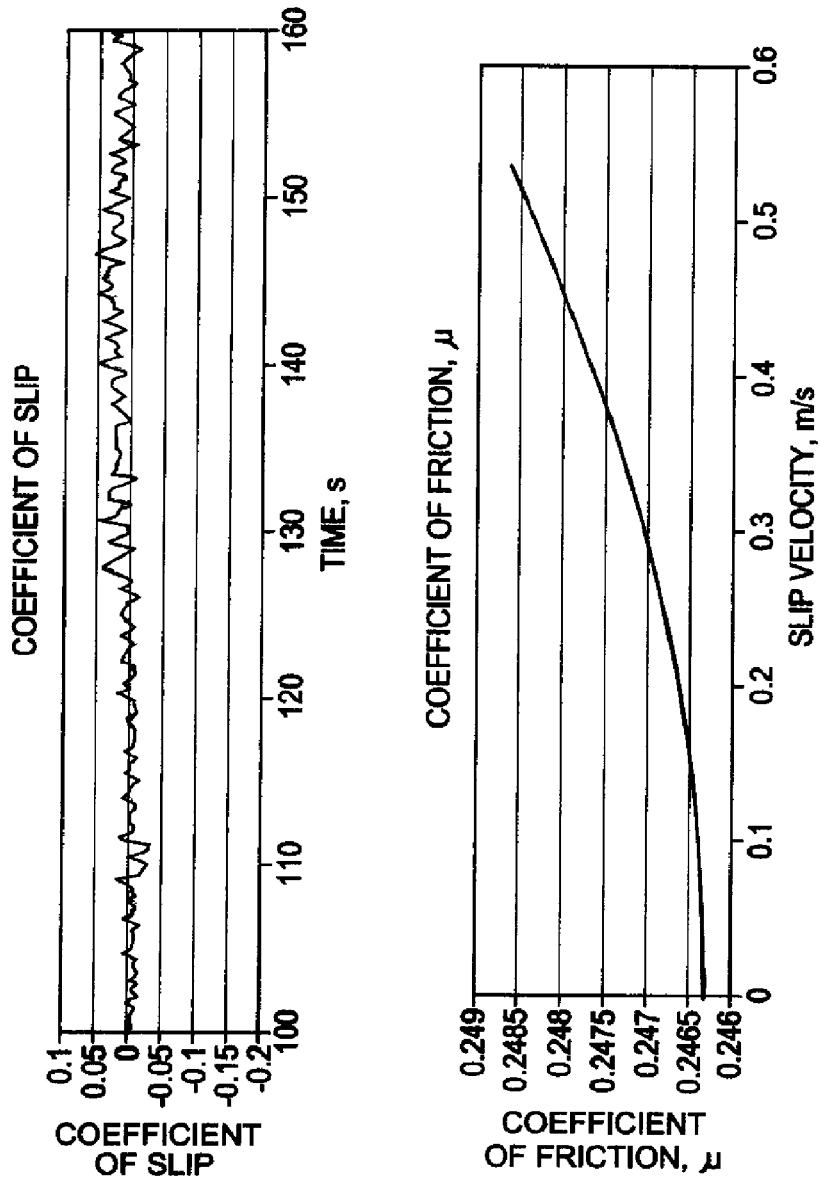
FIG. 19 is a slide showing data for a locomotive acceleration slip in reverse motion.

FIG. 19 shows data for locomotive acceleration slip in reverse motion, with the same values as in FIG. 18 except a variance of 1.0% and an average slip in the range of 1.3%.

Figure 20:
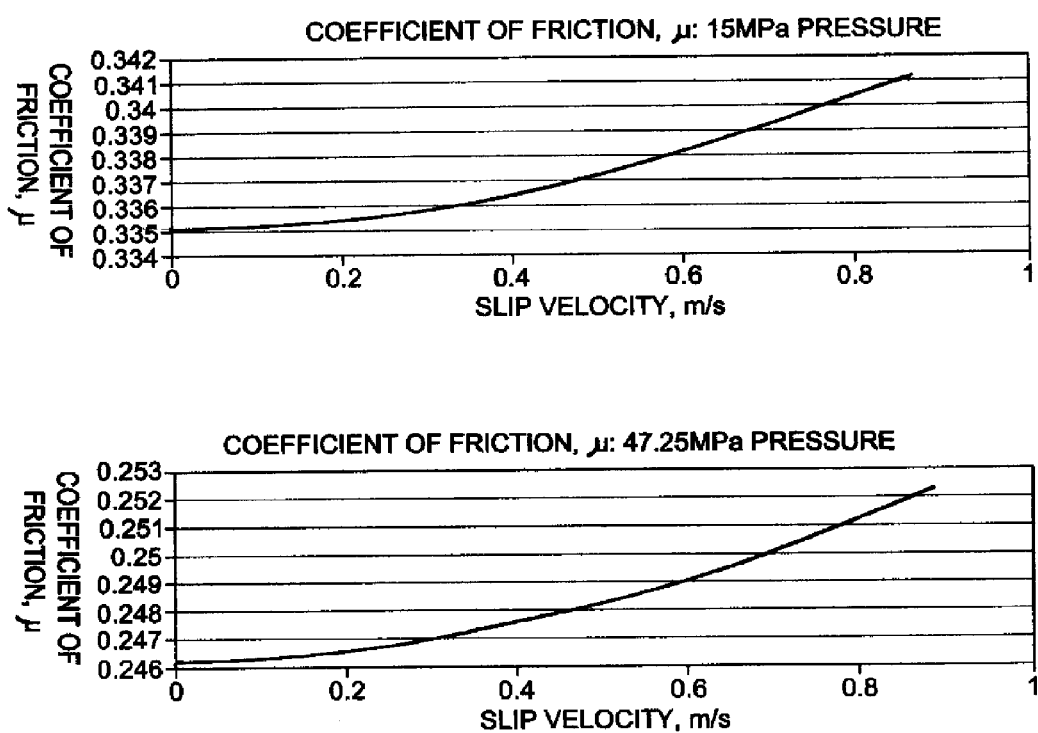
FIG. 20 is a slide showing data for a locomotive deceleration slip with passive friction braking.

FIG. 20 shows data for locomotive deceleration slip with passive friction braking, that is, deceleration with no active, hard braking applied. The differences from FIG. 19 were a frictional of 0.246, a variance of 2.5%, and an average slip in the range of 7.1%.

Figure 21:
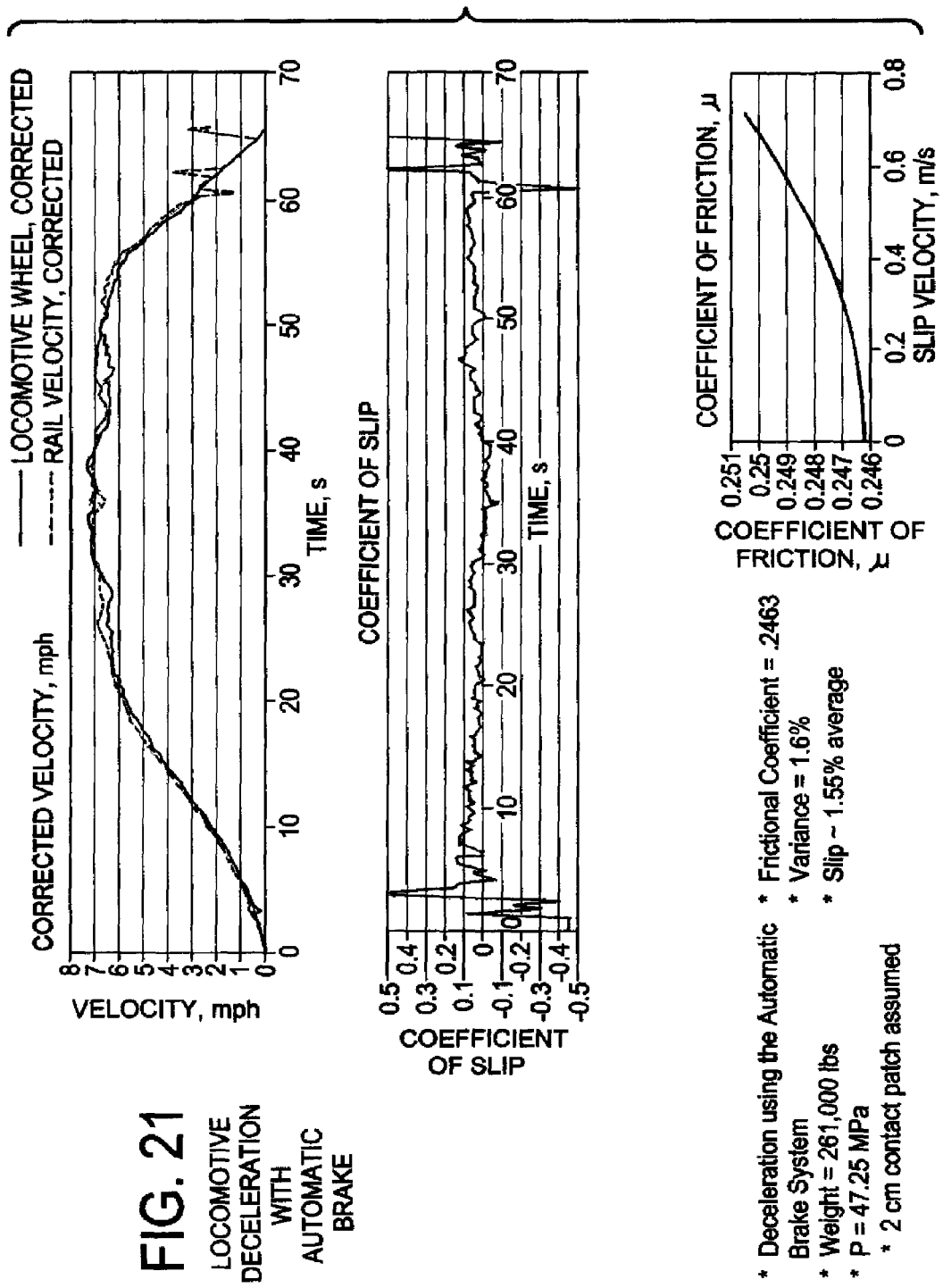
FIG. 21 is a slide showing data for a locomotive deceleration with automatic brake.

FIG. 21 shows data for locomotive deceleration with an automatic brake, with the same values as in FIG. 19 except a variance of 1.6% and an average slip in the range of 1.55%.

Figure 22:
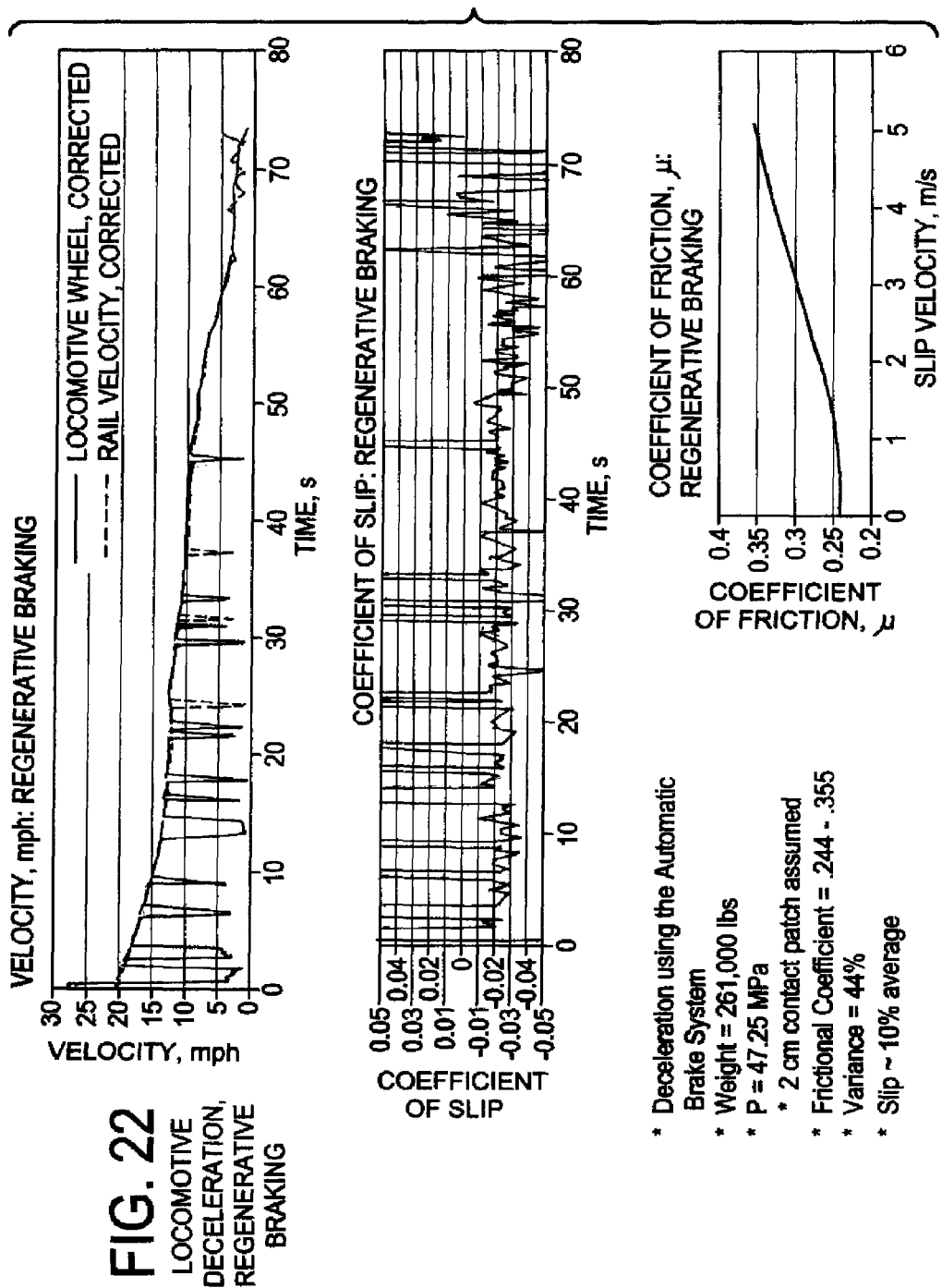
FIG. 22 is a slide showing data for a locomotive deceleration with regenerative braking.

FIG. 22 shows data for locomotive deceleration with regenerative braking, with the same values as in FIG. 18 except a frictional coefficient in the range 0.244 to 0.355, a variance of 44% and an average slip in the range of 10%.

Figure 23:
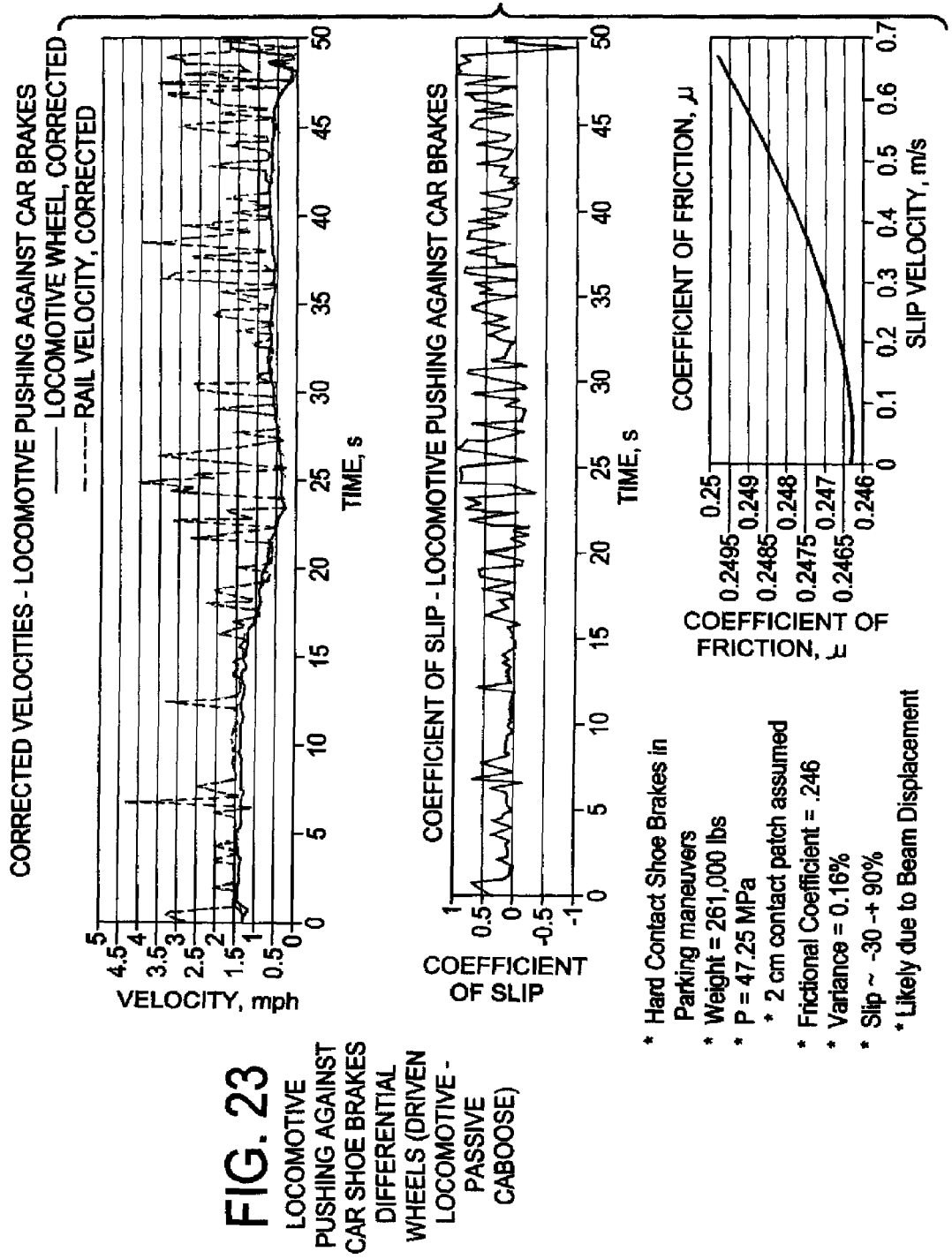
FIG. 23 is a slide showing data for a locomotive pushing against car shoes brakes.

FIG. 23 shows data for a locomotive pushing against hard car shoes brakes in parking maneuvers, with the same values as in FIG. 18 except a frictional coefficient of 0.246, a variance of 0.16% and an average slip in the range of −30% to +90%, the slip range likely due to beam displacement.

Figure 24:
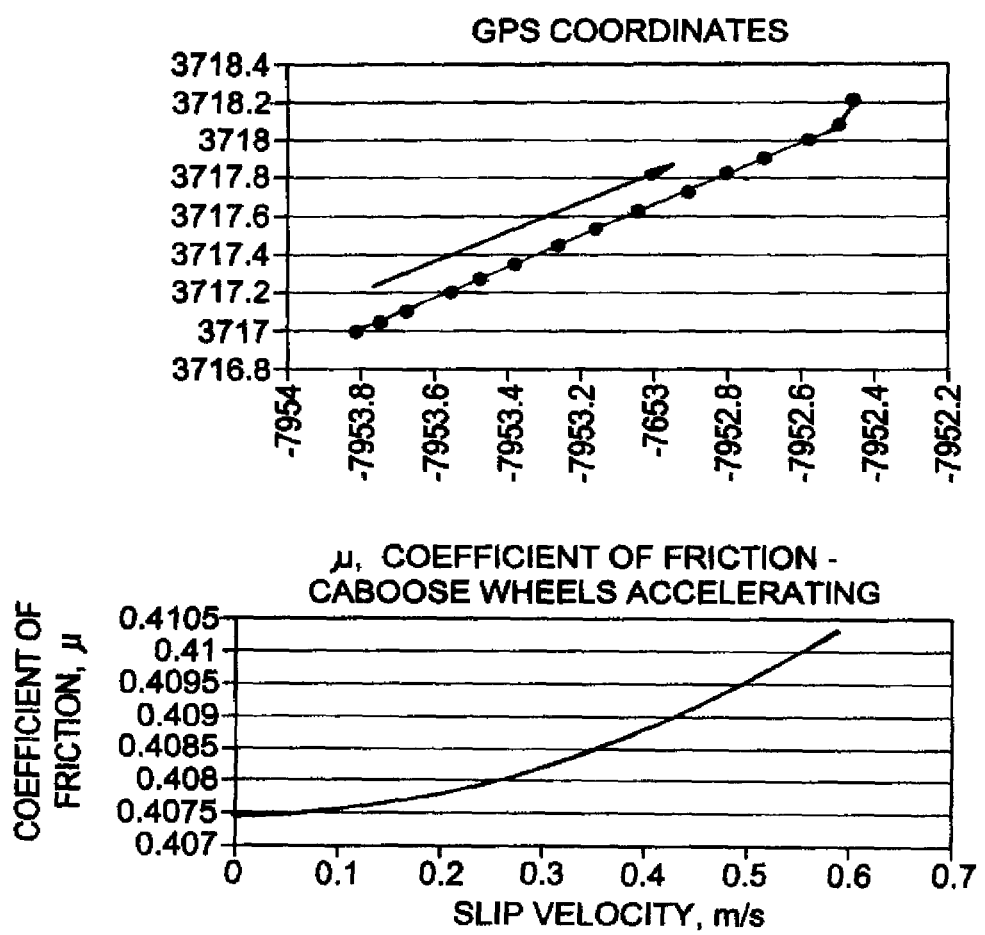
FIG. 24 is a slide showing data for passive wheel acceleration.

FIG. 24 shows data for passive wheel acceleration in a tangential track, with a caboose weight of 103,000 lbs, P=18.8 MPa, an assumed contact patch of 2 cm, a frictional coefficient of 0.362, a variance of 0.08%, and an average slip in the range of 0.5%.

FIG. 25 shows data for passive wheel deceleration in a tangential track, with the same values as in FIG. 24 except a frictional coefficient of 0.317, a variance of 0.12%, and an average slip in the range of 0.8%.

FIG. 26 shows spectral signatures data, and summarizes the results, namely, that spectral signatures are functions of a sum of all velocity dynamics, as well as vibration, out-of-plane rotations, intercepted focal beam diameter, etc. Further abnormal signatures standout and may be used to infer conditions and the state of the target surface.

Figure 27:
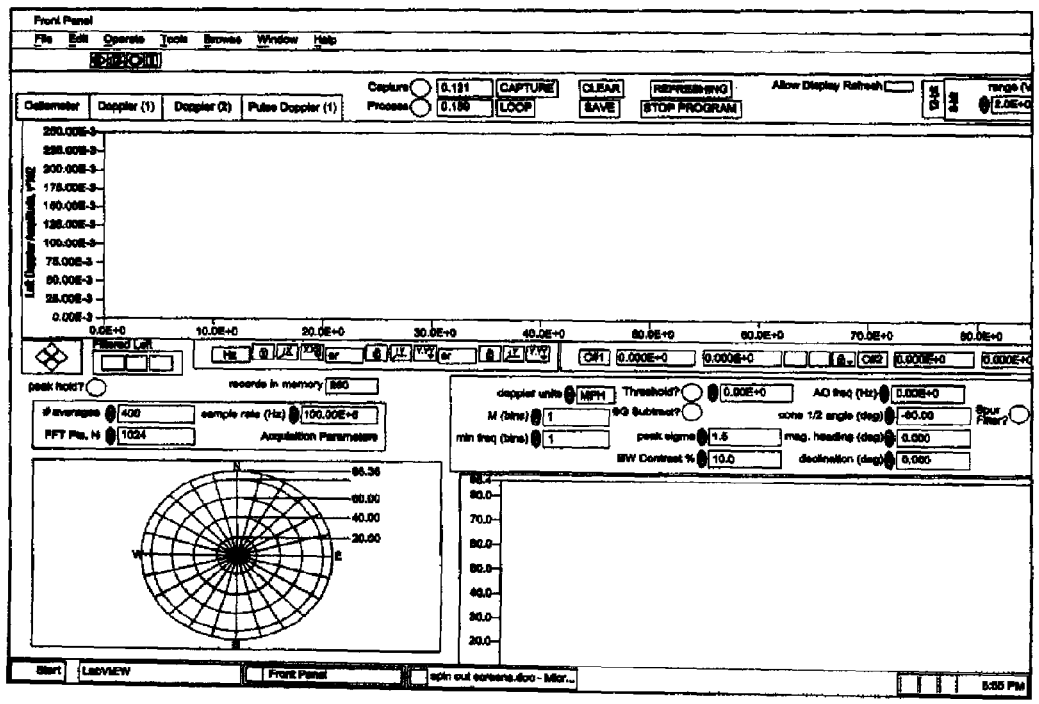
FIG. 27 is a slide showing data for trackside tests.
Figure 27:
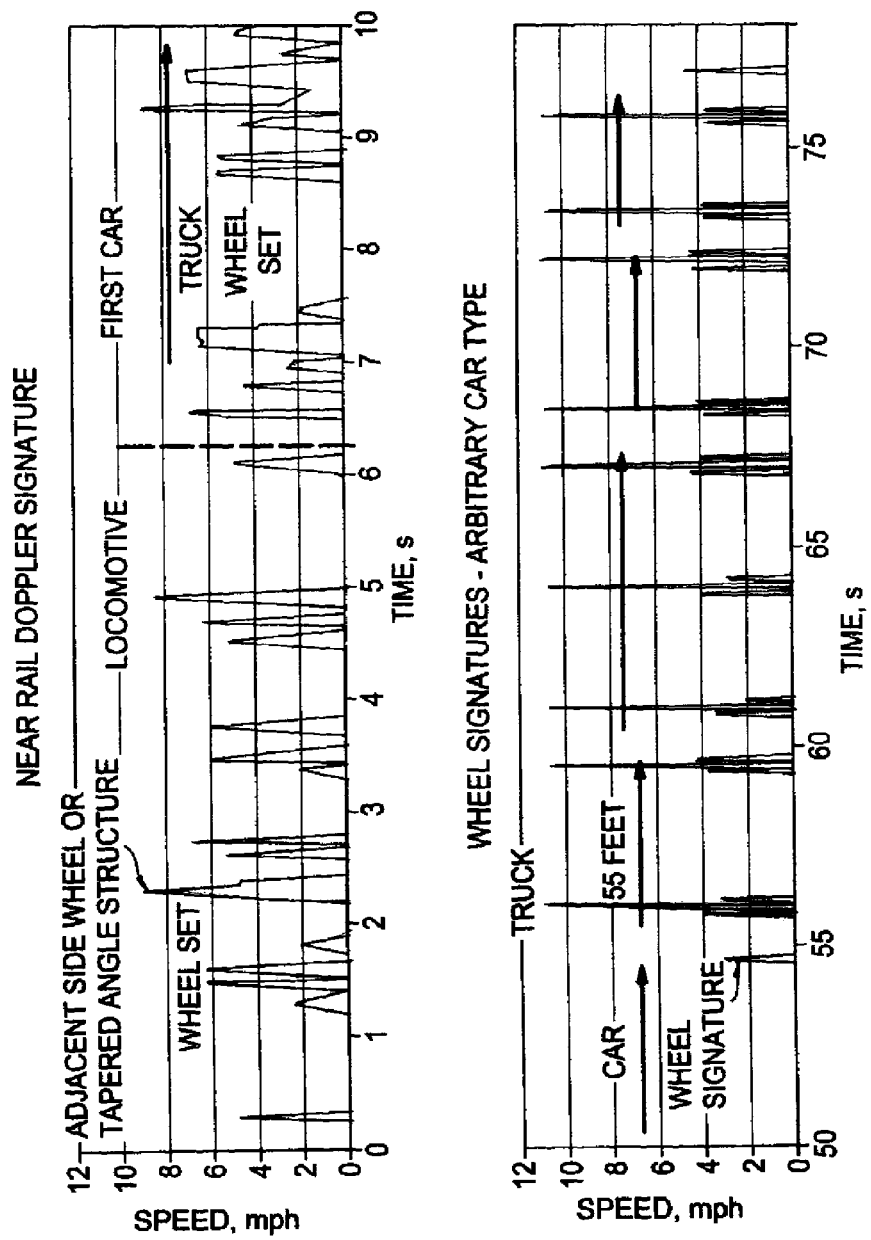

FIG. 27 shows data for trackside tests, which expand the concept of the invention to include off-vehicle testing. The testing was done on two trains, one eastbound with 1 inch optic @18 ft standoff, another westbound with 2 inch Optic @36 ft standoff.

Figure 28:
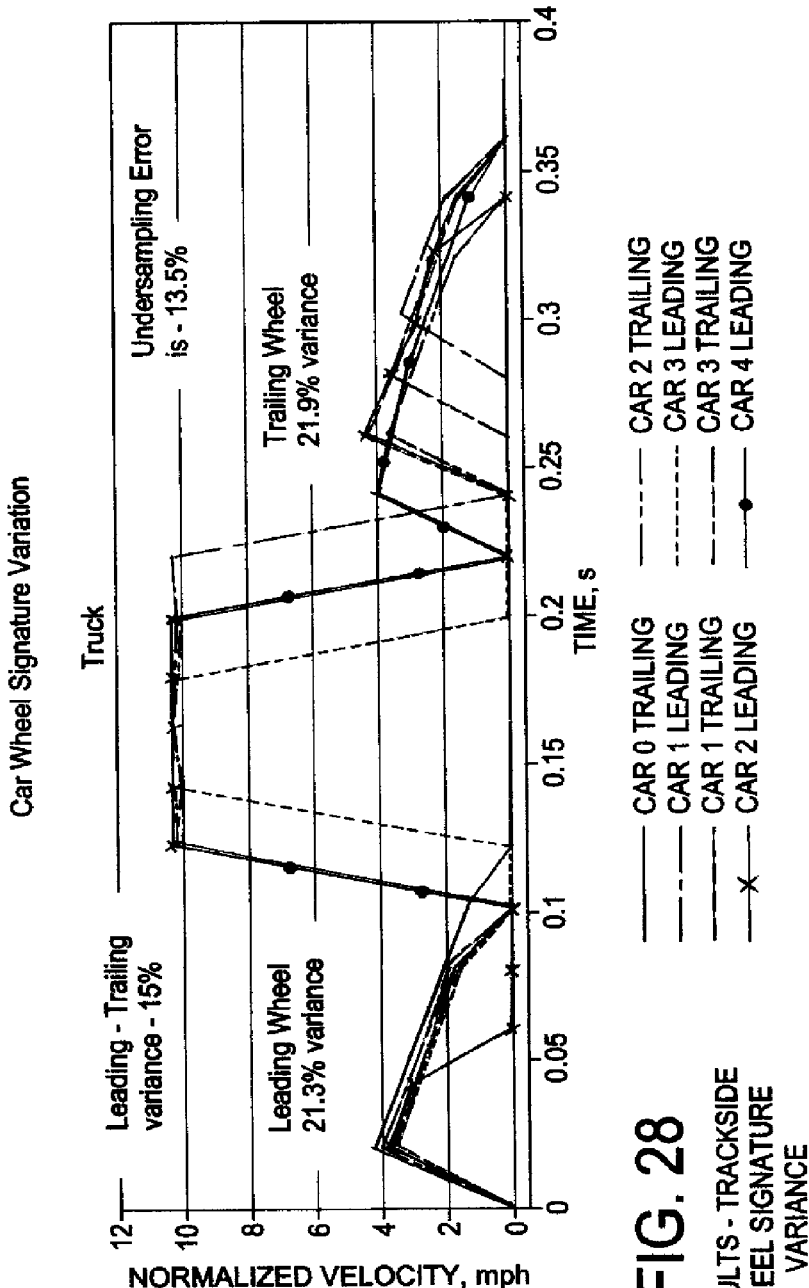
FIG. 28 is a slide showing results for trackside wheel signature variance.
Figure 28:
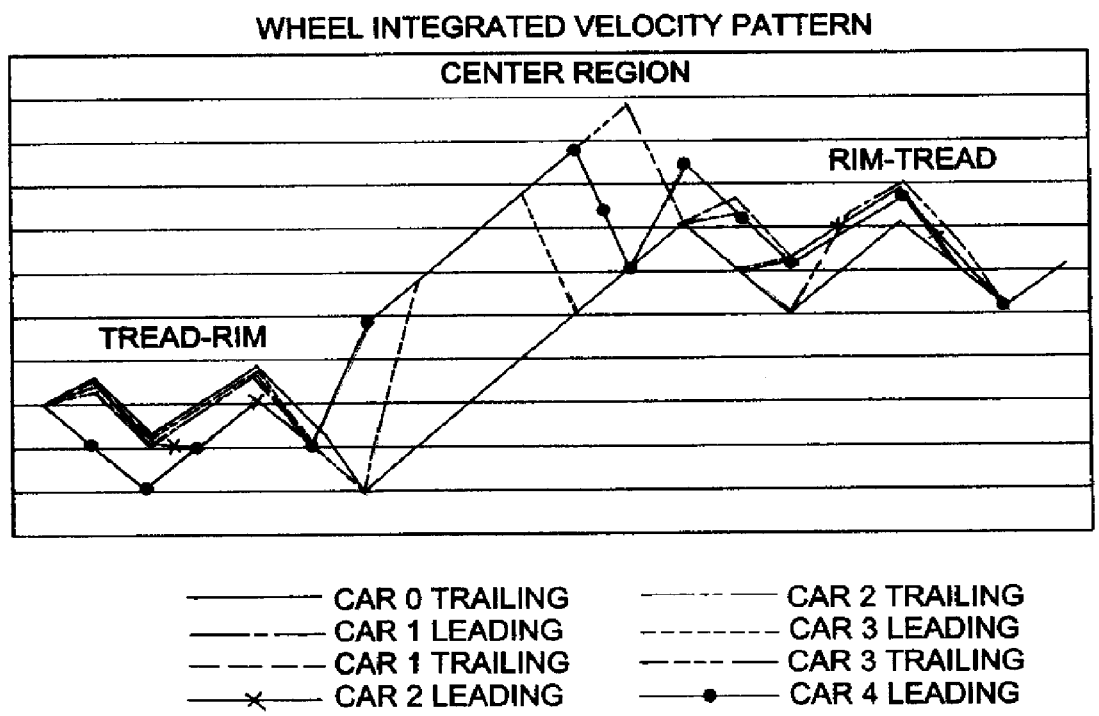

FIG. 28 shows results for trackside wheel signature variance, indicating acquisition limits for the tested configuration (~15% wheel-wheel variance, dominated by sampling time limitations, requires track across elevated wheel chord) but noting that these limitations are not fundamental. Trackside operation requires triggered acquisition to achieve friction detection levels of less than 1% slip, and compensation for local track curvature (which is in the range of 3%).

FIG. 29 shows results for trackside Doppler spectral variations, which are caused by wheel rotation parameters, and out of plane surfaces, vibration, and multiple targets in beams (i.e. spatial or temporal clutter).

FIG. 30 shows additional trackside monitoring results and considerations. System performance and functionality are observed to increase with design for objectives. Vibration sensing distinguishes between the wheel and targeted infrastructure. Hunting is an observed aspect of motion dynamics and artifacts.

Measurement of Road Bed Curvature and Width

An optical method for the measurement of the curvature and/or width of a vehicle path is disclosed. Similarly, lateral motion velocities of the vehicle may be used to determine width/displacement parameters with respect to the path. In particular, one focus is on the measurement of dynamic curvature in rail or automotive applications and the separation between rails on a railroad system, i.e. "gauge." The present invention is applicable to other vehicular systems and is well suited to determining vehicle lateral displacements. For instance, the same equation base and concepts may be used to measure the "hunting" motion of rail wheel "trucks" or displacements caused by wear ruts/depressions on highway surfaces.

The method includes a simultaneous measurement capability for platform velocity/acceleration dynamics, displacement and vibration and may be applied for condition based maintenance, surface-surface interactions or other reasons to a wide variety of vehicle systems. Particular application is proposed for measurement of highway and rail surface condition for rapid assessment of the integrity of transportation infrastructure at full operational speeds.

The invention is a method or technique for measuring the curvature and/or width of a vehicle path via the use of laser Doppler velocimetry. The method makes use of the fact that in a curve, the velocity on one side of a vehicle is different than on the other side of a vehicle. The difference in these velocities as measured by Doppler velocimetry or other means may be used to calculate the curvature of the path in real time. Similarly, lateral motion velocities of the vehicle may be used to determine width/displacement parameters with respect to the path. In particular, the focus here is on the measurement of the separation between rails on a railroad system, i.e. "gauge," but the measurement is applicable to other vehicular systems as well to determine lateral displacements.

Further, the velocity signatures may be used to simultaneously assess vehicle or surface dynamics such as displacement (integrated velocity), acceleration (derivative of velocity) and feature spectral characteristics (i.e. frequency of occurrence).

The present invention is enabled by any form of Laser Doppler system, but has been demonstrated through use of optical fiber laser Doppler velocimeters. The present invention is also an improvement to existing methods of measuring highway/rail surface curvature, in that it allows inspection of the curvature or "gauge" type parameters at full operational highway or rail speeds. That is in marked contrast to larger, expensive laser based ranging systems with limited spatial resolution on the highway and which require reduced operational speeds to interrogate the surface.

Specifically, if the simultaneous measurement of velocity via Doppler techniques is applied differentially across a vehicle body, the curvature of the vehicle's path may be easily calculated. Such sensors have considerable application in motive applications such as highway and railway maintenance operations. Secondary benefits of such an application include the simultaneous measurement of forward platform velocity/acceleration/distance/displacement parameters and the simultaneous measurement of vibration in the structure or platform. Numerous embodiments of the present invention are possible such that combinations of tangential and translational velocities enable the measurement or computation of displacement, acceleration and position. They are all beholden to the same basic concepts as outlined herein and as may be utilized or rearranged by those understanding the art.

Figures 31A, 31B:
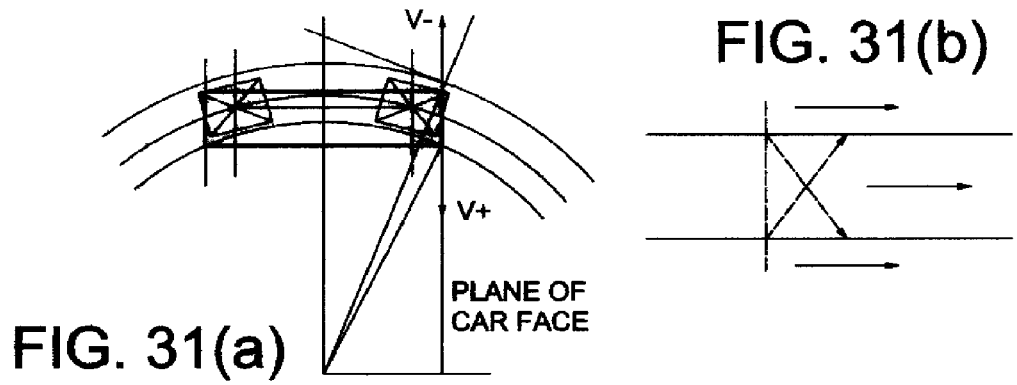
FIG. 31 illustrates the concepts employed in the characterization of curvature of travel surfaces, with FIG. 31(a) illustrating the track of the car with respect to the curve, with FIG. 31(b) showing the beam direction with respect to travel direction and FIG. 31(c) showing how the left and right velocities are measured, according to one embodiment of the present invention.
Figure 31C:
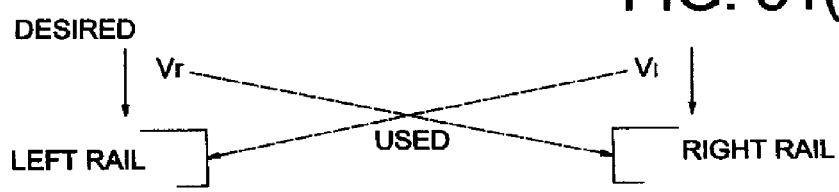

Curvature Equations use ground or rail beams with equal forward or reverse bias angles. FIG. 31 illustrates the basic concept of the disclosed invention as applied to rail curvature in particular. FIG. 31(a) illustrates how the velocities on each side of the track differ as a car is on the curved section. For the tangential track case:
Given:
$V_l$=Left Ground Velocity
$V_r$=Right Ground Velocity
g=Separation between beam rail/ground intercepts (normally equal to rail gauge 56½ inches, 4.708 ft.)
Radius of Curvature, R, "g" units $$R = g\frac{V_r}{V_l - V_r} \quad V_l > V_r, \text{Right Positive Curvature} \quad (2)$$

$$R = g\frac{V_l}{V_l - V_r} \quad V_l < V_r, \text{Left Negative Curvature} \quad (3)$$

Then curvature, k=1/R, and Degrees of Curvature for a 100 ft arc is then:

$$D_{oc} = 100*57.2958*k \text{ degrees}$$

For a curved track, with front of car mounting:
σ=Forward Bias angle to the rail/ground, radians
L=Length of Car Chassis (normally equal to –50 ft.)

$$R = \frac{L}{2\sigma}\frac{V_r + V_l}{V_r - V_l} \quad V_l > V_r, \text{Right Positive Curvature} \quad (4)$$

$$R = \frac{L}{2\sigma}\frac{V_r + V_l}{V_r - V_l} \quad V_l < V_r, \text{Left Negative Curvature} \quad (5)$$

It has been demonstrated that simple velocimeter LIDARs based on low cost optical fiber sources can provide non-contact measurement of velocity on arbitrary surfaces. The present invention establishes the ability to measure differential velocities such as represented by the disclosed sensor scenario and derive or infer primary or secondary information from the basic velocity data. Velocity difference measurements from fractions of an inch to over 20 meters away from objects have been demonstrated and documented. Velocities from 0.005 m/s to over 1000 m/s have been measured with these devices.

A methodology for pairing simple, coherent optical fiber networks with averaging Fourier Transform analysis of optical detector signals to implement cost effective, eye-safe, non-contacting motion (velocity) sensors is disclosed. The desired information is derived or inferred from the analysis of a Doppler frequency spectrum via an algorithm unique to the particular application. Specifically, the simultaneous measurement of velocity along two axes in vehicle applications via Doppler techniques allows the direct assessment of vehicle/path curvature. The difference between Doppler velocities measured along certain geometric arrangements may be used to directly compute path variance. The present invention has been shown to be equally valid in automotive or other vehicular applications. Such sensors have considerable application in motive applications such as highway and railway operations, but can be extended into autonomous vehicles and aerospace applications.

Secondary benefits of such an application include the simultaneous measurement of forward platform velocity/acceleration/distance parameters and the simultaneous measurement of surface parameters. Numerous arrangements of this concept are possible such that combinations of Doppler bandwidth and translational frequencies enable the measurement of numerous parameters in diverse operational embodiments. They are all beholden to the same basic concepts as outlined herein and as may be utilized or rearranged by those understanding the art.

Figure 32A:
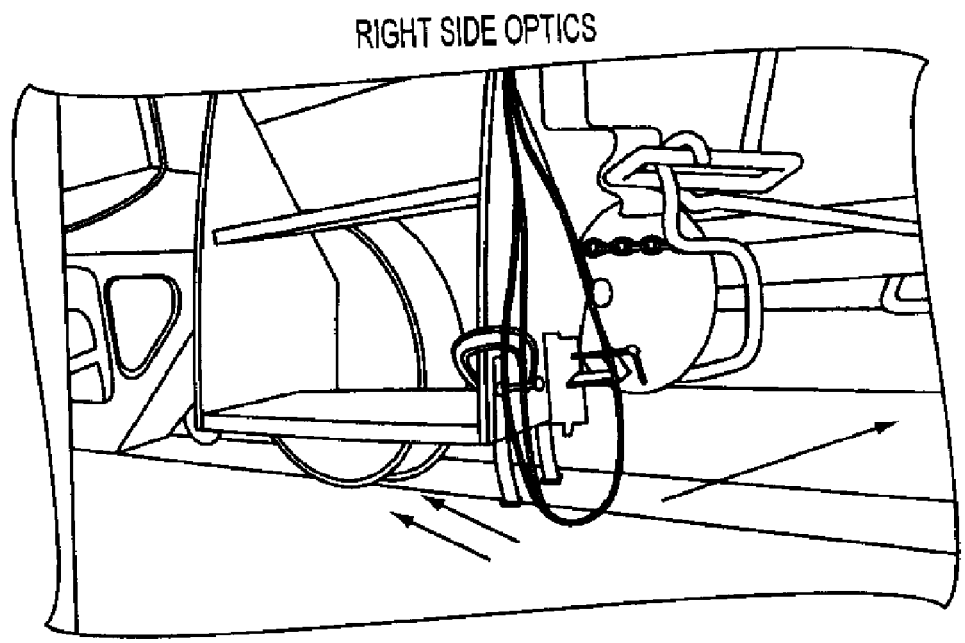
FIG. 32 provides illustrations of the mounting of optics on the rail cars, with FIG. 32(a) illustrating the right side optics and FIG. 32(b) illustrating the left side optics, according to at least one embodiment of the present invention.
Figure 32B:
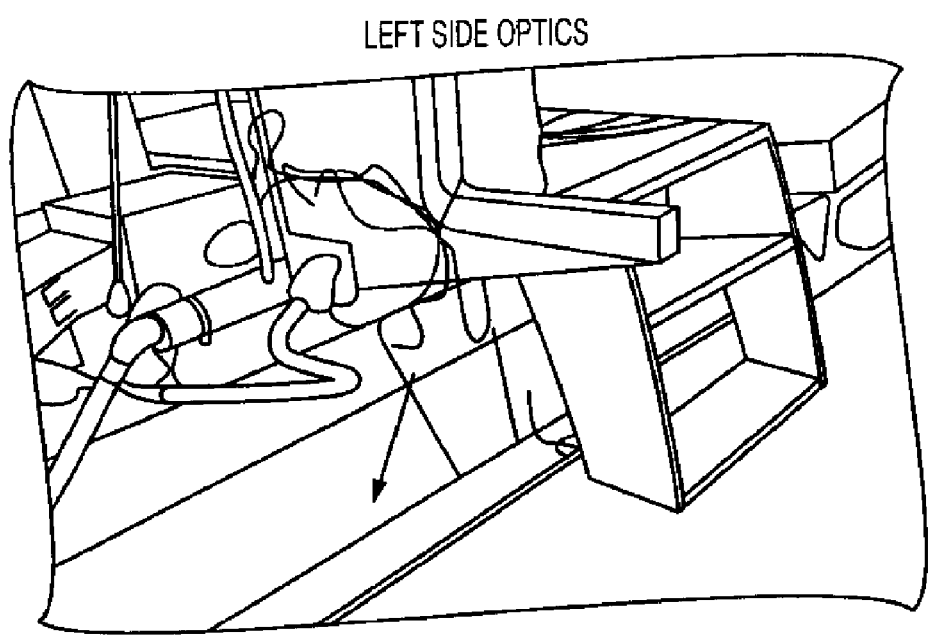

As discussed above, the present invention uses the velocity difference between the left and right tracks to obtain curvature. The mounting of the sensors on the right and left sides of the rail car is illustrated in FIGS. 32(a) and 32(b), respectively. The use of the Doppler bandwidth to obtain information about surface integrity may also be employed. The surfaces of the track are identified in FIG. 33, showing the top rail surface, the gauge face, the lower gauge surface and the ballast region. The orientation of the sensor beams may be as slip beams, curvature beams, 3.5 degrees off rail lower gauge, face normal, rail surface figure beams, rail top and gauge flat and ballast integrity beams.

The present invention demonstrates the use of simple velocimeter LIDARs based on low cost optical fiber sources and networks for the non-contact measurement of velocity on arbitrary surfaces. An example of such an optical fiber Doppler sensor is discussed above. Therein, a laser source provides a pulse through a fiber to provide a source, from which a shift can be determined. The shifted light is likewise collected by the lens and is coupled to the detector, where the signal is amplified and processed, to obtain an output spectrum.

The optical fiber Doppler sensors can be fiber Doppler sensors, based on optical fibers and elements used in telecommunications and can utilize a wide variety of functions and applications. The sensors have advantages such as having compact and lightweight fiber elements, having lower costs than other sensors and use eye-safe EDFA wavelengths of approximately 1.55 μm. The sensors also require minimal maintenance due to an integrated, flexible optical path.

Figure 35A:
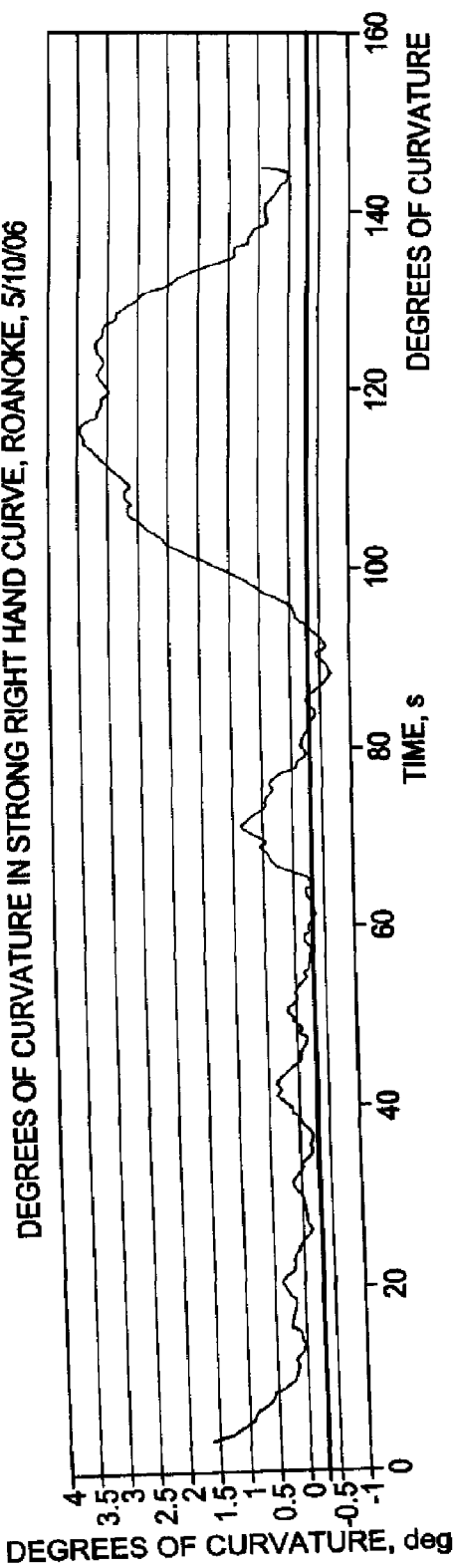
FIG. 35 provides experimental results, with FIG. 35(a) illustrating a graph of degree of curvature over time and FIG. 35(b) providing a graph of the degree of curvature.
Figure 35B:
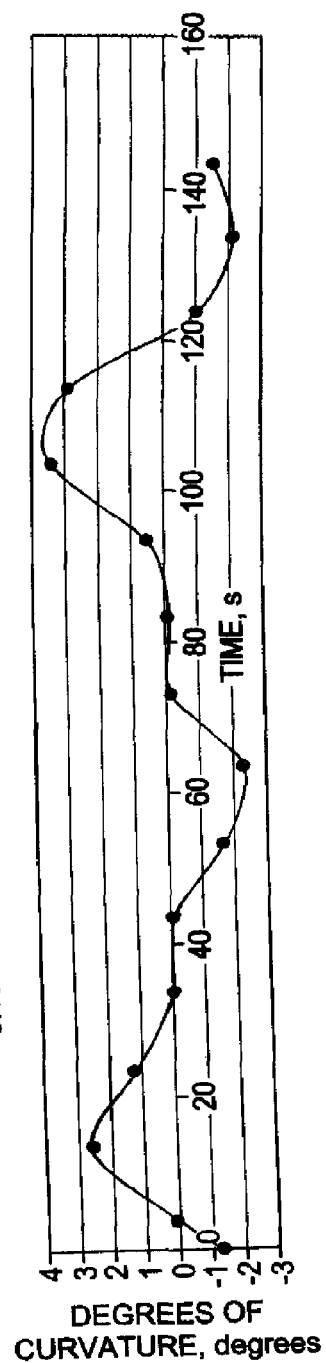

Experimental results are provided in FIGS. 34 and 35. FIG. 34(a) shows the degree of curvature over time that can be compared with the degree of curvature independently obtained by methods using GPS or Global Positioning System shown in FIG. 34(b). FIG. 35(a) shows the degree of curvature over time for a tight right curve that can be compared with the degree of curvature independently obtained by methods using GPS or Global Positioning System shown in FIG. 35(b). Overall, the present invention provides an accurate degree of curvature that compares very favorably with independent methods.

Figure 36A:
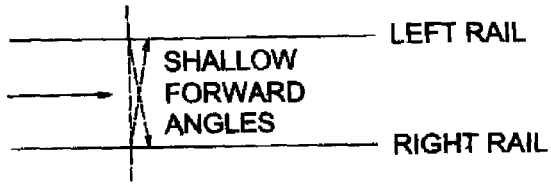
FIG. 36 illustrates configurations of the present invention used to measure rail gauge variance, with FIG. 36(a) providing a top-down view and FIG. 36(b) providing a view along the rails.
Figure 36B:
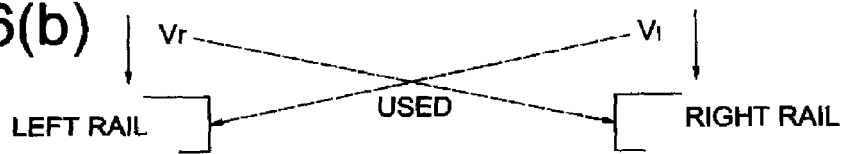

According to another embodiment of the present invention, the methods may be applied to measure rail gauge variance. As shown in FIG. 36(a), the beam paths have much more shallow forward angles with respect to the rails and the forward motion of the rail car. The velocity from beams on the lower gauge face, as shown in FIG. 36(b) are integrated and variances can be recorded as changes in rail gauge. This embodiment can also be employed to check car dynamics; e.g. "Hunting" may also be detected. In addition, the use of the slight forward bias angle allows for signed velocity to be identified.

Figure 37A:
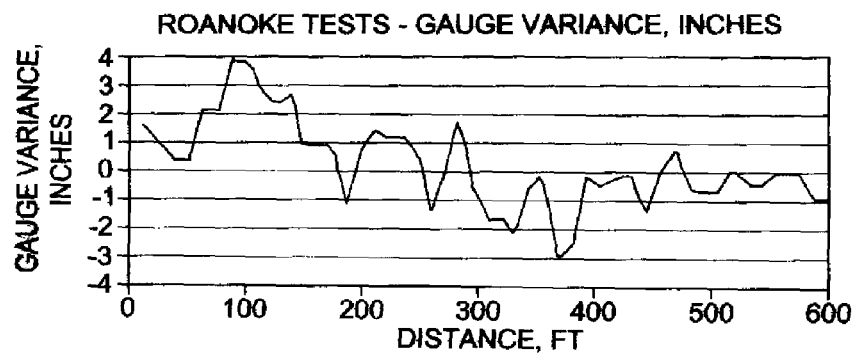
FIG. 37 provides experimental results, with FIG. 37(a) illustrating a graph of gauge variance over distance and FIG. 37(b) a graph of gauge variance over distance, according to embodiments of the present invention.
Figure 37B:
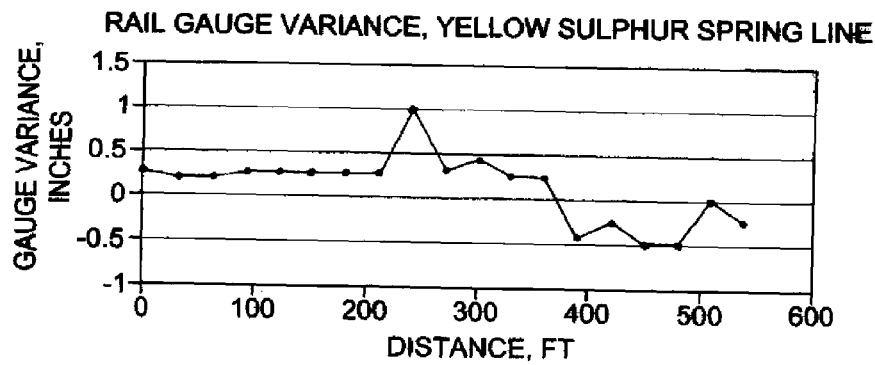

Gauge equations use rail beams with equal forward or reverse bias angles. In the tangential track case, given: $V_l$=Left Ground Velocity, $\Delta V_l$=change in velocity and $V_r$=Right Ground Velocity, $\Delta V_r$=change in velocity. Also, g=separation between beam rail intercepts, which is normally equal to rail gauge 56½ inches, 4.708 ft, $\Delta g$=change in gauge, positive for increasing gauge and $\Delta t$=Time difference between measurements, in seconds:

If $\Delta V_l > 0$ AND $\Delta V_r > 0$
OR
$\Delta V_l < 0$ AND $\Delta V_r < 0$ -continued Then $\Delta g = \Delta t(\Delta V_l + \Delta V_l)$ Else $\Delta g = \dfrac{\Delta t(\Delta V_l + \Delta V_l)}{2}$ For the curved track case, depending on mounting location, the track curvature must be measured using appropriate equations and curvature must be compensated prior to assessing gauge variance. Results of measurements of rail gauge variances are presented in FIGS. 37(a) and 37(b) for two different tests. It is noted that the typical Doppler resolution is sufficient to support ⅛ to ¼ inch gauge variance over a track length of 30 feet.

Figure 38:
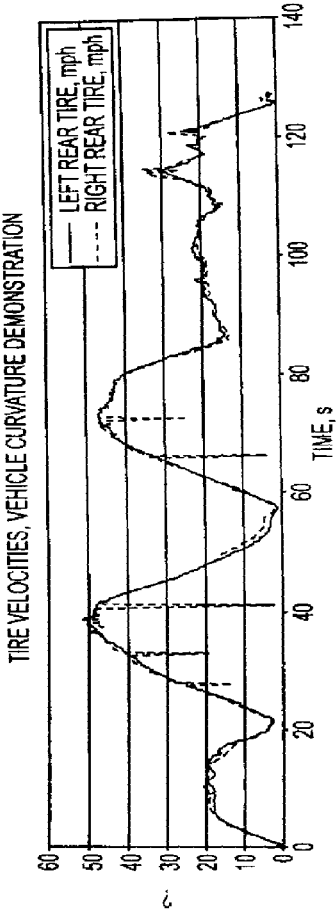
FIG. 38 provides a graph showing experimental results of vehicle curvature, according to one embodiment of the present invention.
Figure 39:
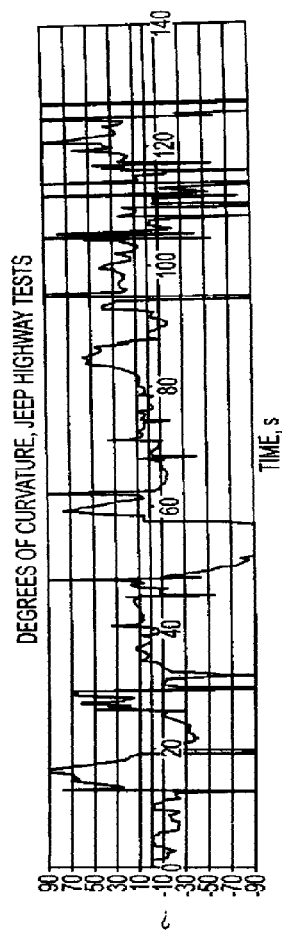
FIG. 39 provides a graph showing experimental results of degrees of vehicle curvature, according to another embodiment of the present invention.
Figure 40:
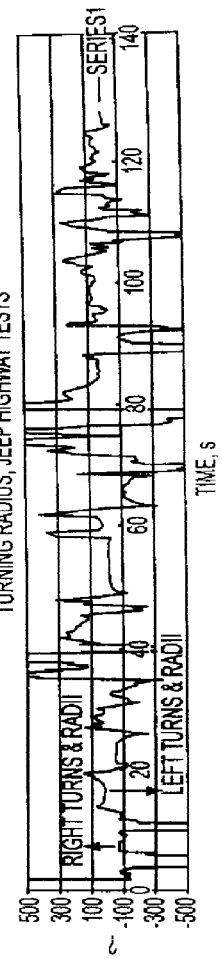
FIG. 40 provides a graph showing experimental results of vehicle turning radii, according to another embodiment of the present invention.

Using the above described setup, several parameters can be measured and/or derived. Tire velocities may be recorded for slip-friction measurements, as provided in FIG. 38. Simple difference equations, as discussed above, resolve vehicle path curvature, where experimental results of that curvature are provided in FIG. 39. Ground truth measured results conformed to measured Doppler Data derived values, corroborating their accuracy. FIG. 40 also provides turning radius data that is also derivable from the measured Doppler shifted results.

The foregoing examples demonstrate the ability of the disclosed Doppler techniques to adapt to a wide variety of mechanical elements for performance assessments of parameters such as path curvature and gauge that may be used via numerical modeling to derive geographic information under real-time operations that are difficult to do with other existing techniques. The ability to simultaneously provide performance assessments of vehicle velocity and the supporting bed (e.g. rails or highway), can allow for a wide scope of sensor functions from maintenance to feedback control of drive mechanisms that optimize maintenance, ride stability, control or enhance fuel consumption. Considerable scope is available for unique instruments for performance analysis or monitoring. Similar examples may be shown effective for related environmental, industrial, security, commercial or scientific applications in general vehicle applications. Vehicles can be aerospace, ground or water platforms. Processes such as industrial extrusion may benefit from such monitoring techniques. In particular, the foregoing data substantiate the function of the system to measure curvature and gauge in highway and railroad applications associated with high cost maintenance functions.

As discussed above, requirements exist across the rail industry for the simple measurement of rail condition, including curvature, either by direct measurement methods (e.g., mechanical gauges) or by inferred methods. The same requirement exists in highway maintenance and assessment. Tire companies are particularly interested in methodologies that allow the assessment of highway grip and/or traction which directly impacts achievable vehicle curvature in maneuvering. The present invention also details the direct measurement of slip, but for highway tires, cornering is a complex function of the tire materials, suspension and related mechanical parameters. Cornering is essentially continuous measurement of the vehicle path curvature. Measurement of the curvature and the surface condition can allow the computation of friction and tire-surface interactions. These concepts were the primarily focus of the development of instrumentation for the measurement of highway and railroad parameters at operational speeds. Other applications exist over a wide spectrum of industrial, commercial, environmental and military applications. They are equally applicable to the assessment of geographic topology, industrial trajectory control in manufacturing operations or other related non-contact operational modalities.

Measurement of Road Surface Structure and Integrity

The inventive method makes use of the fact that the Doppler shift on a laser beam applied to a moving surface has the Doppler bandwidth broadened in proportion to the height of the surface features and the width of those features. The ratio of the instantaneous Doppler deviation to the center Doppler frequency is, to a first order, equal to the ratio of the surface feature height to approximately half of the surface feature size on a per feature basis.

If the beam is rapidly moved over a surface with multiple features present within an acquisition cycle, peak height and feature widths are also proportional to the average or RMS quantities. The integration of that concept over a large number of samples allows the relationship to remain true as the ratio of the Doppler bandwidth to the center frequency changes. That relationship is common to most natural materials, allowing the rapid assessment of surface parameters such as the surface condition of highway road and railway rail. These latter two are an immediate focus of the invention, particularly as it relates to the ability to derive maintenance information such as location and maintenance condition.

The present invention also provides the ability to use such surface parameters to calculate dependent parameters such as displacement, friction, fraction and adhesion for vehicle safety or performance evaluation. Further, the velocity signatures may be used to simultaneously assess vehicle or surface dynamics such as displacement (integrated velocity), acceleration (derivative of velocity) and feature spectral characteristics (i.e., frequency of occurrence).

If the simultaneous measurement of deviation velocity and mean velocity via Doppler techniques is applied to the surface nature of a moving surface (or a moving sensor), a sensor for the measurement of surface parameters may be derived. Surface Feature aspect ratio, h/d, is revealed to be equal to the ratio of Doppler Bandwidth to a Doppler mean. Such sensors have considerable application in motive applications such as highway and railway maintenance operations, but could be used to measure surface figure for disciplines as diverse as medical assessment of skin disease conditions. Secondary benefits of such an application include the simultaneous measurement of forward platform velocity/acceleration/distance/displacement parameters and the simultaneous measurement of vibration in the structure or platform.

Figure 41A:
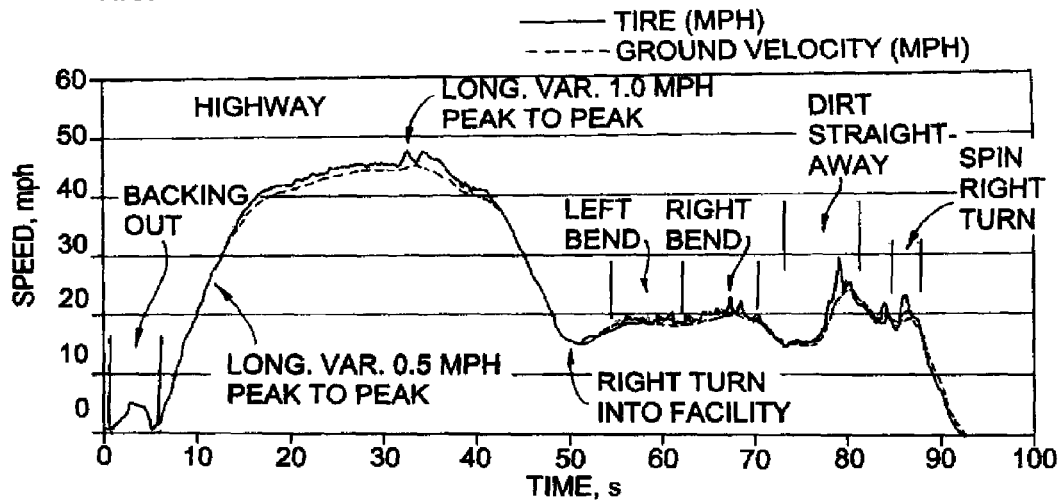
FIG. 41 illustrates a process of characterizing travel surfaces, with FIG. 41(*a*) illustrating speed versus time and FIG. 41(*b*) showing the different Doppler shift for different travel surfaces, according to one embodiment of the present invention.
Figure 41B:
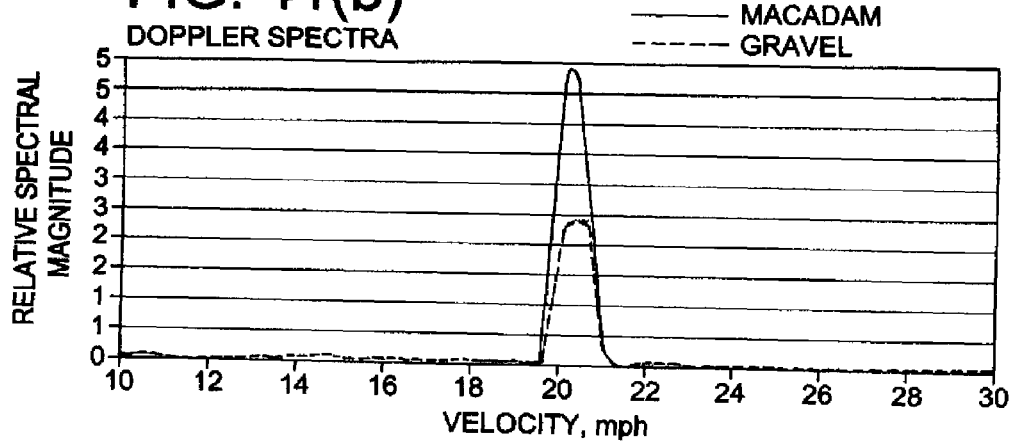

FIG. 41 provides an example of spectral difference between macadam and gravel travel surfaces. The road surface characterization is illustrated in the spectrum provided in FIG. 41(a) where a velocity versus time graph shows the differences between tire and ground velocity speeds. Based on such measurements, the Doppler shift spectra for both macadam and gravel is illustrated in FIG. 41(b), providing proof that the Doppler shift can be used to characterize travel surfaces.

Numerous arrangements of the present invention are possible such that combinations of tangential and translational velocities enable the measurement or computation of resistance, slip, friction, etc. for diverse operational surfaces. They are all beholden to the same basic concepts as outlined herein and as may be utilized or rearranged by those understanding the art. The present invention may also be augmented with the technology disclosed in U.S. Pat. No. 6,621,561 for added embodiments and increased functionality, and that disclosure is incorporated by reference herein.

Figure 42:
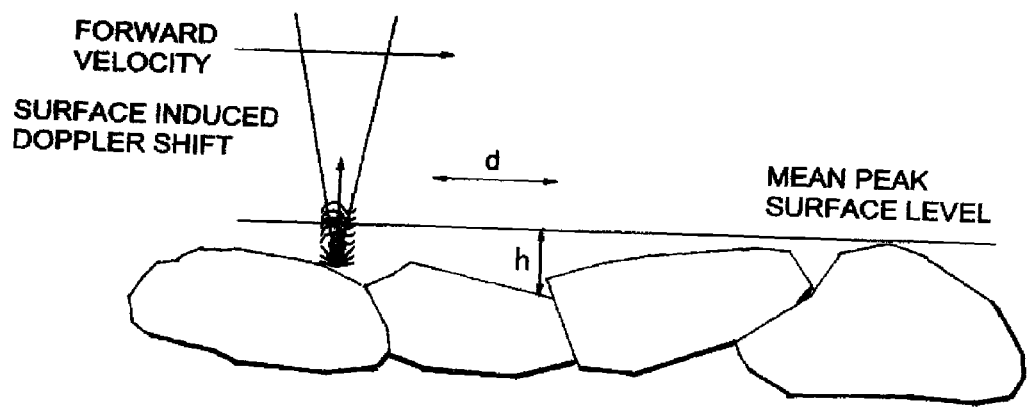
FIG. 42 provides a schematic of how surface induced Doppler shifting can be measured.

The Bandwidth of a Doppler signal scattered from a Target Surface is proportional to the forward velocity of the beam platform and the inherent geometric factors of the surface materials. The Ratio of Doppler bandwidth to center frequency is characteristic of the surface geometry and material, even when wetted. The Ratio of Doppler bandwidth to center frequency is proportional to the ratio of surface roughness (peak to valley height, h) and ½ the mean surface feature size (d). The h/d ratio may be used to assess surface integrity and characteristics (e.g., roughness, weathering, degradation, etc.) and may use RMS or Peak geometric parameters. Between materials, the h/d ratio may be ambiguous, but within a given material presentation, the h/d ratio is a unique indicator of its surface condition, integrity, roughness, etc. Fourier Transform Wavelet or related mathematical analyses of the h/d time series is capable of identifying the spectral nature of repetitive features on the surfaces interrogated, and integration of specific parameters allows the determination of feature displacement or geometric extend. In FIG. 42, the features of the present invention are illustrated.

FIG. 42 illustrates the following:

h=Mean or RMS Geometric Surface Depth/Roughness
d=½ Mean or RMS Geometric Extent (Mean a RMS)
Doppler=Doppler Mean+Doppler Surface
Doppler Surface=h/(d/Doppler Mean)–Doppler Bandwidth
Doppler Bandwidth/Doppler Mean=h/d.

Figure 43C:
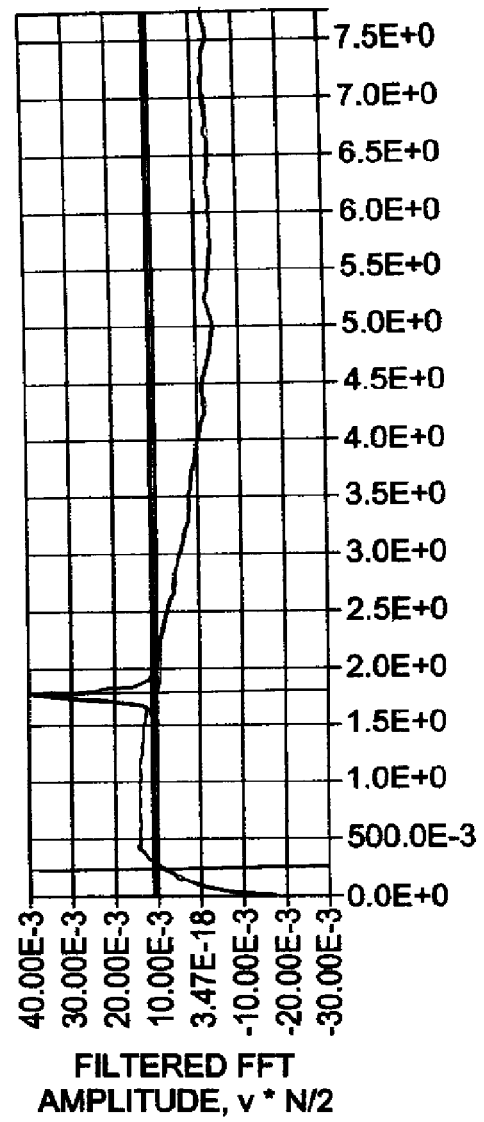
FIG. 43 illustrates the process of signal averaging to provide quantifiable results, with FIGS. 43(*a*), 43(*b*) and 43(*c*) showing no averaging, 100 averages and 10,000 averages, respectively.

Micro-power Doppler LIDAR sensors use the fact that velocity generates a change in the frequency of the light scattered from a moving object. The frequency change is 580 KHz per mile per hour, is detected by "coherent" RF techniques and distance & acceleration is determined from derivatives or integrals. The signal is generally buried in noise and is recovered by averaging techniques. The effect of such averaging techniques is illustrated in FIG. 43, where FIG. 43(a) shows no averaging, FIG. 43(b) shows the result of 100 averages and FIG. 43(c) shows the results of 10,000 averages. The size of the external optics depends mostly on the range to the scattering surface, and does not depend on the nature of the scattering surface.

With respect to Doppler surface measurement concepts, the bandwidth of a Doppler signal scattered from a target surface is proportional to the forward velocity of the beam platform and the inherent geometric factors of the surface materials. The ratio of Doppler bandwidth to center frequency is characteristic of the surface geometry and material, even when wetted. It is also often characteristic of various modal vibrations. The ratio of Doppler bandwidth to center frequency is proportional to the ratio of surface roughness (peak to valley height, h) and half the mean surface feature size (d), where the h/d Ratio may be used to assess surface integrity and characteristics (e.g., roughness, weathering, degradation, etc) and may use RMS or Peak geometric parameters.

With respect to the highway applications, the h/d ratio is demonstrated to accurately reflect the surface nature, condition and integrity of a highway across a wide range of material properties and conditions. It should be noted that the h/d ratio can be ambiguous between material systems, e.g., new concrete has a higher h/d ratio than new asphalt due to the aspect ratio of the respective aggregates but within a given material system, the h/d ratio is an accurate predictor of surface figure, degradation or condition. In other words, the h/d ratio may start high and wear low or vice versa depending on the material properties.

The present invention also demonstrates the ability to measure differential velocities such as represented by the disclosed sensor scenario and derive or infer primary or secondary information from the basic velocity data. Velocity difference measurements from fractions of an inch to over 20 meters away from objects have been demonstrated and velocities from 0.005 m/s to over 1000 m/s have been measured. The table below gives a comparison between physically measured material surface parameters, and those measured with the disclosed technique for highway surfaces.

TABLE 1

|  | Material Measurements | | Doppler Measurements | |
| --- | --- | --- | --- | --- |
|  | Typical (min) | max | Typical (min) | (max) |
| Stone/gravel | | | | |
| Packed Dirt | 0.34 | 0.88 | | |
| Large, Loose | 0.44 | 1.23 | 0.45 | 0.84 |
| Small, loose | 0.11 | 2.07 | | |
| Pothole Edge, small | | 0.20 | | |
| Pothole Edge, Large | 0.16 | | | |
| Asphalt | | | | |
| New, fine coarse | 0.33 | 0.50 | 0.03 | 0.34 |
| 1 Yr old | 0.40 | 0.47 | 0.04 | 0.287 |
| Weathered | 0.28 | 0.40 | 0.04 | 1.2 |
| Rough | 0.28 | 0.31 | 0.45 | 0.72 |
| Striated | 0.64 | 2.60 | | 0.84 |
| Galled | 0.11 | 0.50 | | 0.84 |
| Patched | 0.04 | 1.02 | 0.04 | 1.2 |
| Abraded Abcess | 0.11 | 0.19 | | |
| Rub Strip | 0.33 | 0.70 | | 1+ |
| Concrete | | | | |
| Smooth | 0.25 | 0.57 | | |
| Brushed | 0.15 | 0.67 | | |
| Slope Finish | 0.01 | | | |
| Grooved surface | 0.37 | 2.49 | 0.46 | |
| Weathered | 0.05 | 0.13 | | |
| Cracked | 0.56 | | | |
| Galled | 0.60 | 0.58 | | |
| Wear Depressions | 0.01 | 0.08 | | |
| Edge Finish | 2.50 | | | |

Time series measurements using the present invention allow for the rapid location of out of bounds material or vibrational conditions for a spectrum of industrial processes, including condition based maintenance. An h/d time series from the gauge face of a railroad rail is presented in FIG. 44, identifying a portion of a rail gauge face surface abraded by wheel flange contact.

Figure 46:
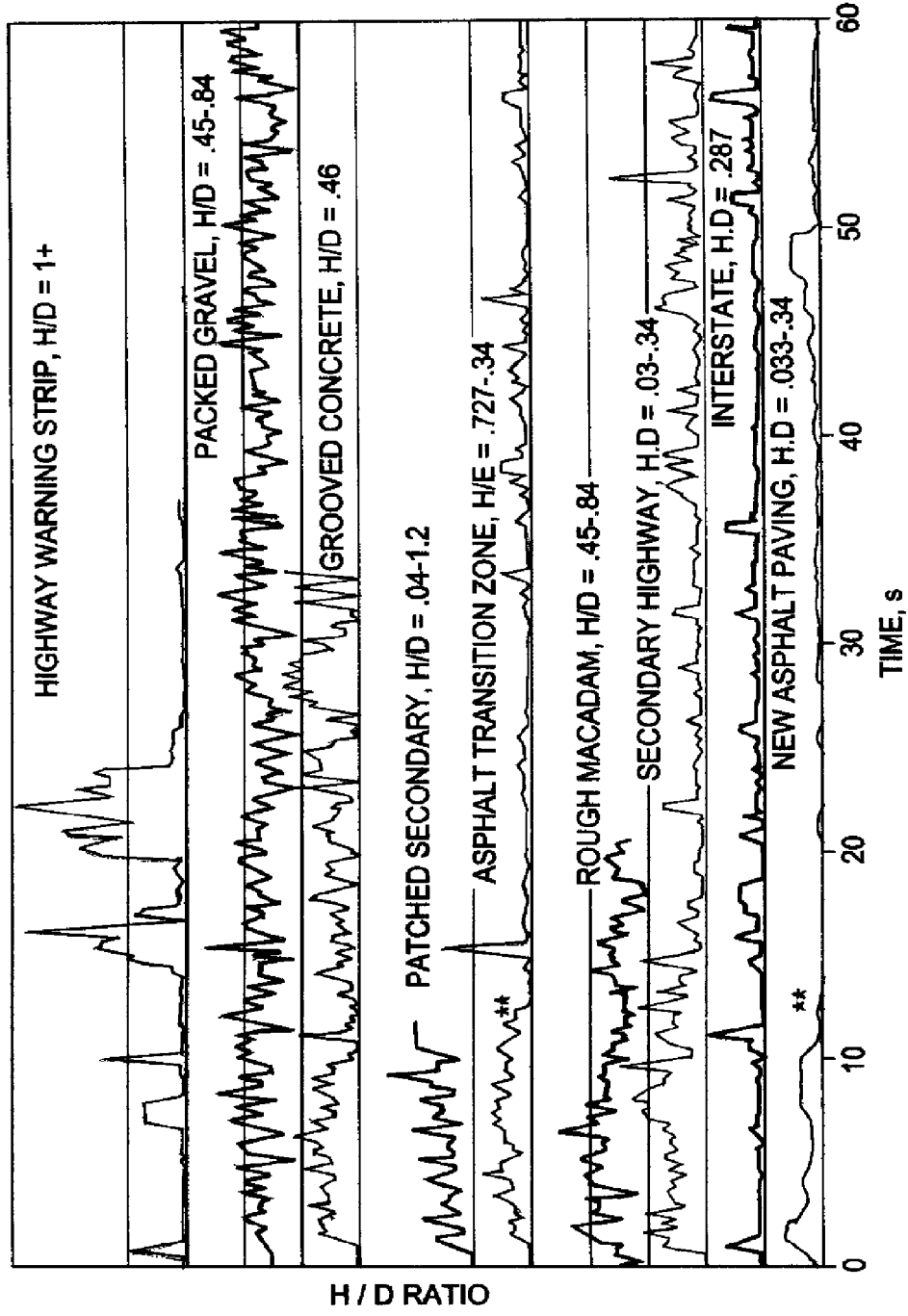
FIG. 46 illustrates multiple spectral surface signatures for multiple types of travel surfaces.

In addition to TABLE 1, the spectra from a number of travel surfaces are also provided in FIG. 45. Based on those spectra, the h/d ratios provided in FIG. 46 can be determined and used to differentiate and characterize those travel surfaces.

Again, as a sample of a particular application of the present invention, requirements exist across the rail industry for the simple measurement of rail condition, either by direct measurement methods (e.g., mechanical gauges) or by inferred methods. The same requirement exists in highway maintenance and assessment. Tire companies are particularly interested in methodologies that allow the assessment of highway grip and/or traction. The direct measurement of slip can be determined, but for highway tires, friction is a complex function of the tire parameters, tire materials and the surface materials. Measurement of the slip and the surface condition allows the computation of friction and tire-surface interaction.

Other applications exist over a wide spectrum of industrial, commercial, environmental, military, sports and military applications. The present invention may be applied to surface crack detection in materials or may be used to characterize terrestrial topography (including ocean wave spectra-sea state conditions).

With respect to Doppler measurements of micro-level road surface integrity and characteristics for highway applications, the goal is ultimately to assess road surface integrity, road surface condition and automotive traction and friction parameters as derived from modeling. The characteristics of technique include beam focal characteristics to yield on-surface footprints significantly smaller than typical laser based, and ranging surface topology measuring instrumentation. The invention is not generally used without scanning mechanisms and scan velocity compensation to survey swaths of large geometric extent, rather precision interrogation of discrete longitudinal paths at micro & macro levels. The system also has a high sensitivity with very low power, using eye-safe 1.5 um optical fiber systems which are lower cost than other optical systems, and are also robust systems with high deployment speeds>60 mph. Also, water/ice/snow on a surface to be characterized tend to increase the dynamic range and slightly lower h/d Ratios but do not appear to otherwise disrupt measurement.

Figure 44:
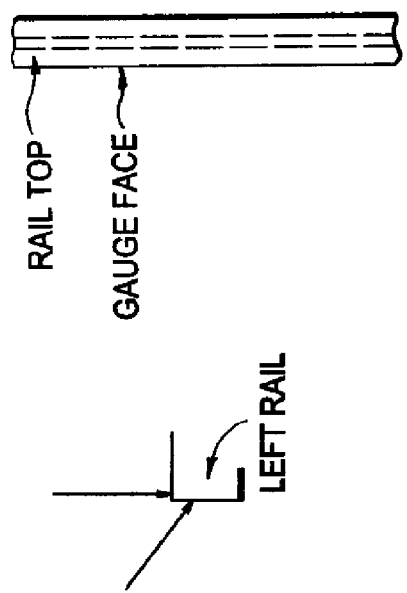
FIG. 44 illustrates portions of the rail that are examined, according to one embodiment of the present invention.
Figure 47:
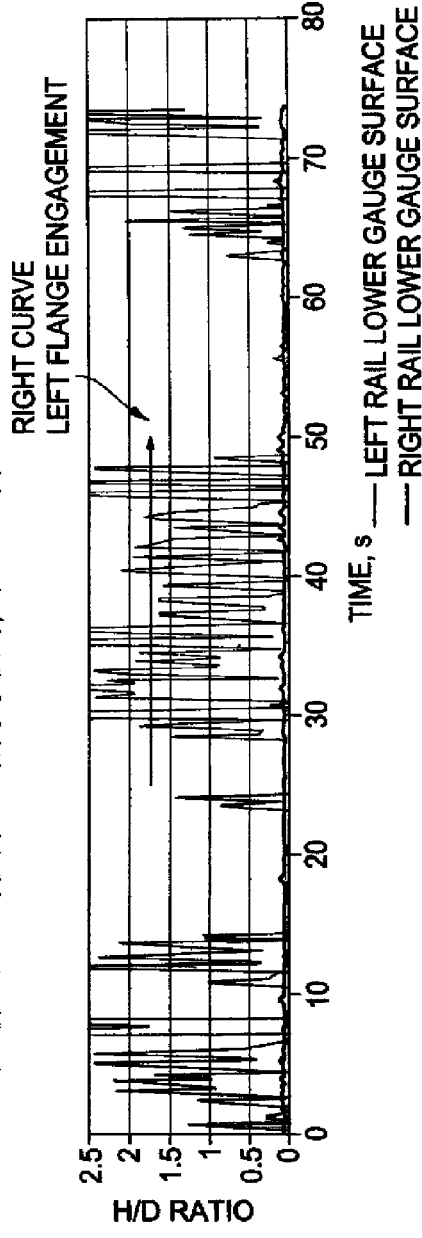
FIG. 47 provides surface roughness for a lower face, gauge surface of a rail, according to one embodiment of the present invention.
Figure 48:
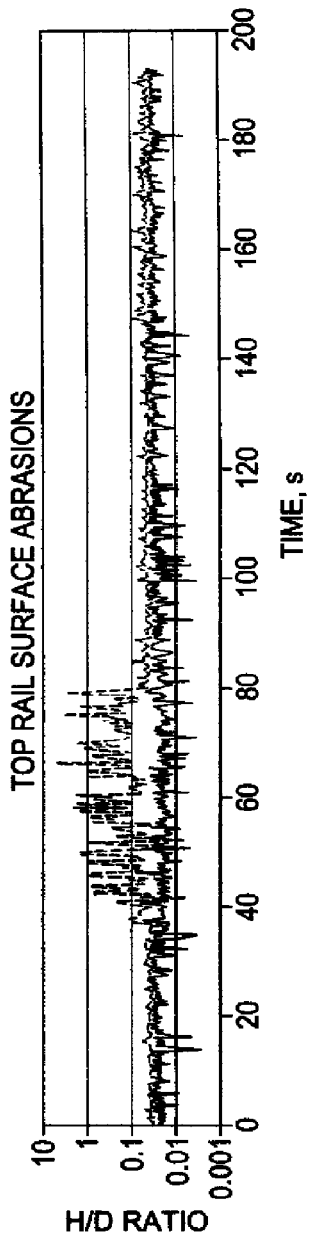
FIG. 48 provides surface roughness for a top surface of a rail, according to one embodiment of the present invention.

With respect to railroad applications, other aspects also need to be considered. In characterizing rail surfaces, both the top of the rail and the gauge face need to be characterized, as illustrated in FIG. 44. FIG. 47 shows the surface roughness on the lower face, gauge surface, providing a h/d ratio and FIG. 48 shows abrasion on the left rail top, right flange engagement zone. More specific results are also provided below in TABLE 2.

TABLE 2

| Rail | Surface | h/d ratio | comment |
| --- | --- | --- | --- |
| | Locomotive Wheel | .016-.059 | Tangential Track |
| | | .059-1.0 | Rapidly Slowing Locomotive |
| | | 0.75-2.33 | Initial Startup, dragging left flange |
| Left | Top | 0.043374 | Tangential track |
| Left | Gauge Flex | 0.028504 | Tangential track |
| Left | Top | 0.427403 | In left curve Right Flange and Left Tread Loaded |
| Left | Gauge Face | 0.02008 | In left hand curve |
| Left | Top | 0.052329 | Slow Speed Data |
| Left | Gauge Face | 0.03607 | |
| Left | Lower, inside Gauge Surf | 0.761794 | Flange Engagement |
| Right | Lower, inside Gauge Surf | 0.052395 | Surface that is not engaged by the wheel flange. |
| Left | Left Rail Surface Fig | 0.380526 | Left Curves |
| Right | Right Rail Surface Fig | 0.217179 | |
| Left | Left Rail Surface Fig | 0.352228 | Right Curves |
| Right | Right Rail Surface Fig | 0.180588 | |
| Left | Left Rail Surface Fig | 0.178917 | Tangential Track |
| Right | Right Rail Surface Fig | 0.138513 | Tangential Track |
| Left | Lower, inside Gauge Surf | 0.048341 | Tangential section with a road crossing |
| Ballast | Ballast | 0.027398 | Ballast beam angle may suppress the h/d ratio |
| Right | Lower, inside Gauge Surf | 0.055349 | |

Figure 49:
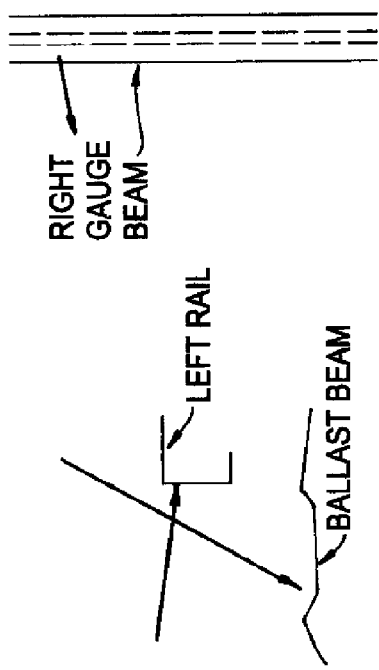
FIG. 49 illustrates the relationship between the ballast beam and the rails, according to another embodiment of the present invention.
Figure 50:
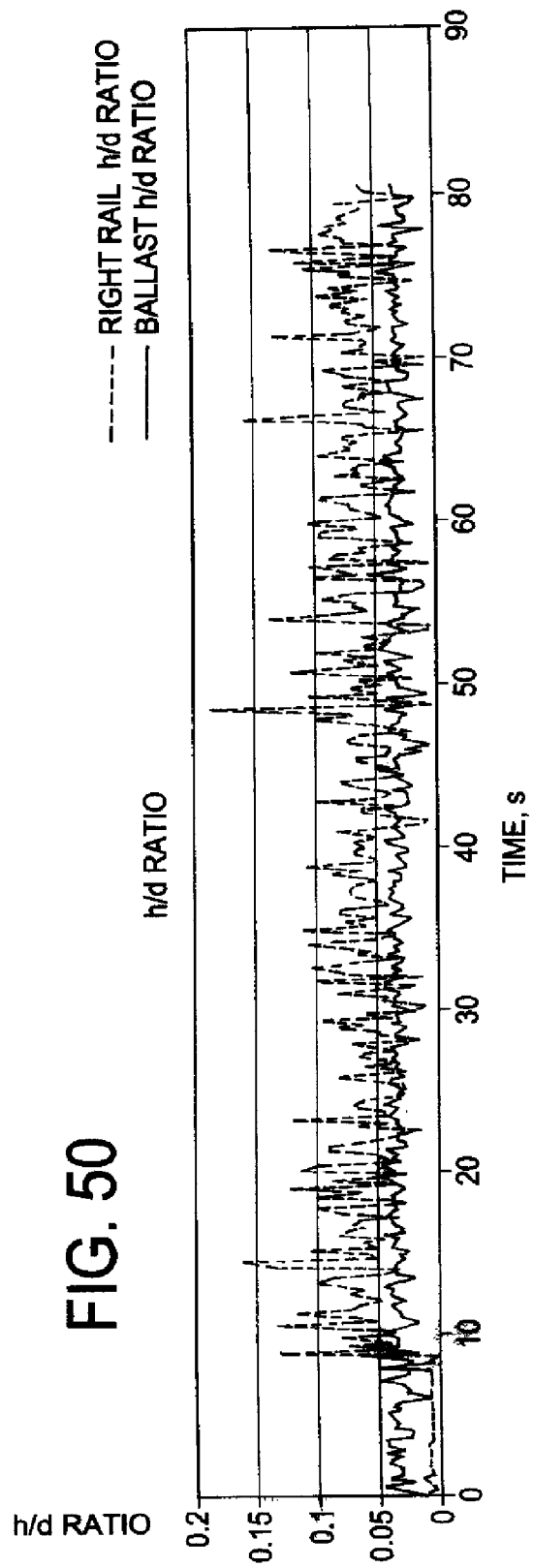
FIG. 50 illustrates roughness of the right rail and the ballast, according to another embodiment of the present invention.

Additional embodiments are also illustrated in FIGS. 49 and 50. FIG. 49 illustrates the position of the ballast beam with respect to the rails. As illustrated in FIG. 50, roughness measured shows the roughness of the right rail with the ballast and shows the erosion of the ballast bed.

The h/d ratio may be used to profile other surfaces such as organic or inorganic materials, ocean/topographical surfaces, roofing, skin, etc., for characterization of a range of surface parameters including, but not limited to, roughness, friction, traction, flaw-blemish, etc. The h/d ratio for a surface may be accurately assessed by laser Doppler techniques including LIDAR, e.g., optical fiber LIDAR. The surfaces may be scanned by moving the Doppler system or by scanning the beam alone and using the induced Doppler and the surfaces may be wetted, ice or snow covered. Optical fiber LIDARs provide cost effective, eye-safe instrumentation for assessing highway surface parameters at high speed.

In the present invention, it is to be understood that while the current invention is explained in terms of light based sensors, particularly coherent light or laser based sensors, other forms or combinations of forms of coherent radiant energy may be employed to accomplish the measurement methodologies and techniques; i.e., RF/electromagnetic emissions, acoustic, etc. As an example, Radar beams may be used in the methods provided that the energy transduction function has sufficient spatial resolution to accomplish the requisite sensor task. For instance, a light beam may be paired with a standard Radar apparatus in measuring wheel tangential velocity and vehicle speed respectively for slip, lock or frictional type methods. Hence combinations of such radiant energy methods are inherent in the disclosed techniques, methods and sensors.

In the present invention, it is also to be understood that while guided wave devices (e.g. optical fibers) have been used to implement the methods, free-space or non-guided beams may be used as well. In this sense the methodologies and sensors claimed may be implemented with traditional LIDAR techniques that use discrete lasers and optics separated by air paths (e.g. free-space systems).

In alternate embodiments, the techniques, methods and inventions disclosed are applicable to medical, biomedical and physiological fields as well as the primary noted disciplines associated with motive applications. In this respect, analysis of walking gait or geriatric stability can be accomplished using differential velocity measurements analogous to the measurement of friction and/or torsional slip for motive drives. Additionally the temporal characteristics of velocity signatures from a physical body can be analyzed to extract derived parameters such as heart rate, breath rate, flexural speed and disease status.

An example of the latter is the analysis of breathing chest wall velocity for Doppler bandwidth. The vibration of the chest wall during exhalation or inhalation gives rise to Doppler bandwidth variations that may be used to assess pulmonary disease state. Similar arguments follow for cardiac Doppler signatures registered by non-contact Doppler velocimetry outside of the body. Physiological parameters such as essential tremor have unique Doppler bandwidth and velocity temporal characteristics that we have examined to assess health or disease condition. Two Doppler beams placed on the back of a patient during walking exercise can be used to derive "sway" stability for the monitoring of physical therapy or geriatric degeneration. Numerous other sensor tasks can be developed by those sufficiently skilled in the state of the art with regard to derived parameter sensors in physiological applications for human or other life sciences.

A particular medical embodiment of the Doppler torsional slip concept was tested for the monitoring of patient activity in bed confinements. In these conditions, patients must move prescribed amounts in order to avoid bed sores and other medical problems. The difficulty is for medical personnel to assess the "amount" of motion that has or has not been achieved. If an eye-safe, Doppler beam is placed in the center of the bed, either on the patient or the under bed surface, and a second beam is placed off-center on the patient or the under bed surface, the degree, speed and aggressiveness of rotation and translation of the bed and patient may be assessed. The velocity information may be augmented by integrating and differentiating the velocity signal to yield bed/patient displacement and acceleration for both rotation and displacement of the body. These parameters are direct measures of the patient's contact with the bed and physical activity. Although a "slip" characteristic is not necessarily assessed, the time (temporal) characteristics of the parameters indicate the level of patient exertion. These parameters can be of substantial value in determining not only bed activity, but also in assessing patient distress conditions.

The techniques, methods and inventions disclosed are also applicable to sports apparatus and sports physiological fields as well as the primary noted disciplines associated with motive applications. With regard to sports apparatus, the trajectory of a thrown, swung or hit element, e.g. golf ball, football, baseball, Frisbee, bat, golf club, etc., is affected by its spin and/or torsional characteristics and its translational characteristics. Analysis of a golf swing, either for the rotation of the club or the ball coming off the tee with the methods disclosed allows for assessment of the capabilities of the player and the equipment. In sports physiology, the performance of the athlete is affected by the ratio of his rotational inertia to his translational inertia. Measurement of both elements allows the derivation of performance parameters suited to assessing or optimizing performance. The forward speed of a football lineman off the line relative to the rotational speed of the upper body can be used uniquely to assess, diagnose and optimize specific aspects of the athlete's performance of potential in a competition. Slip in sports has an analog of "grip", i.e. 1−degree of slip=degree of grip/adhesion/traction. The methods disclosed for the measurement of torsional slip apply to configuring a sensor for the measurement of traction in athletic footwear, again for either the equipment (shoe, ski, roller skate, etc.) or the user (athlete).

The foregoing examples demonstrate the ability of the disclosed Doppler techniques to adapt to a wide variety of mechanical elements for performance assessments of parameters such as surface roughness, condition and integrity that may be used via numerical modeling to derive traction, adhesion, slip, or friction that are difficult to do with existing techniques. The ability to simultaneously provide performance assessments of surface parameters at the micro or macro level, in particular an h/d Ratio can allow for a wide scope of sensor functions from maintenance to feedback control of drive mechanisms to optimize ride stability, control or enhance fuel consumption.

Considerable scope is available for unique instruments for performance analysis or monitoring. Similar examples may be shown effective for medical, environmental, industrial, security, commercial, sports or scientific applications. In particular, the foregoing data substantiate the function of the system to assess surface condition and integrity in highway and railroad applications associated with high cost maintenance functions. While the supporting data was developed using Doppler optical fiber LIDAR instrumentation, any coherent laser capable of implementing coherent Doppler functions may be used.

The present invention uses Laser Doppler velocimetry specifically to produce new products for highway/rail safety and maintenance. The present invention can be used in any form of Laser Doppler systems, but has been demonstrated through the use of optical fiber laser Doppler velocimeters. The present invention is also an improvement to existing methods of measuring highway/rail surface integrity, in that it allows inspection of the surface condition from the macro level down to the micro level at full operational highway or rail speeds. This is in marked contrast to larger, expensive, laser based ranging systems with limited spatial resolution on the highway that require reduced operational speeds to interrogate the surface.

The torsional slip methodology has inherent in its science the ability to extend the range of measured parameters beyond slip/drag/rotational velocity to second tier or derived measurements. Hence the methodology of the present invention also includes the ability to derive additional parameters from the measurement scenario related to time-space data requirements, functional performance or other derived parameters. In a specific example, the ability to use velocity data from multiple spatial points on rail or automotive wheels and the vehicle body in a wayside sensing application enables the calculation wheel diameter from the velocity information. Such an ability enables functional applications such automated wheel "wear" detection in trackside monitor systems on rolling stock that is in motion at track operational speeds. Wheel wear and condition is a major issue for the rail industry that enables "just in time" maintenance functions for rolling stock, obviating time consuming visual inspections and maximizing safety. Properly located, the beam(s) that measures the velocity parameters can inspect the surface of the wheel, further extending the concept of derived parameter sensing.

While the invention has been described in terms of preferred embodiments, those skilled in the art will recognize that the invention can be practiced with modification within the spirit and scope of the appended claims.

What is claimed is:

1. A method for measuring properties of a travel surface, upon which a travel vehicle travels, comprising:
providing an incident light from a light source to the travel surface at an angle that is not normal to the travel surface;
collecting light reflected from the travel surface;
determining a surface induced Doppler shift including secondary characteristics from the incident and collected light; and
determining at least one surface property of the travel surface based on the determined surface induced Doppler shift.

2. A method for determining characteristics of a travel surface while traveling on the travel surface, the method comprising the steps of:
providing an incident light from a light source to travel surface;
collecting light reflected from the travel surface;
determining a surface induced Doppler shift from the incident and collected light; and
determining surface feature aspect ratio based on the determined surface induced Doppler shift.

3. The method of claim 2, wherein the travel surface is a highway surface and the step of collecting light comprises collecting light reflected from the highway surface.

4. The method of claim 2, wherein the travel surface is a railroad surface and the step of collecting light comprises collecting light reflected from the railroad surface.

5. The method of claim 2, further comprising determining slip, resistance or friction for the travel surface based on the determined surface feature aspect ratio.

6. An apparatus for determining characteristics of a travel surface while traveling on the travel surface, comprising:
means for providing an incident light from a light source to travel surface;
means for collecting light reflected from the travel surface;
means for determining a surface induced Doppler shift from the incident and collected light; and
means for determining surface feature aspect ratio based on the determined surface induced Doppler shift.

7. The apparatus of claim 6, wherein the travel surface is a highway surface and the means for collecting light comprises means for collecting light reflected from the highway surface.

8. The apparatus of claim 6, wherein the travel surface is a railroad surface and the means for collecting light comprises means for collecting light reflected from the railroad surface.

9. The apparatus of claim 6, further comprising means for determining slip, resistance or friction for the travel surface based on the determined surface feature aspect ratio.

10. A method for determining characteristics of a travel surface while traveling on the travel surface, the method comprising the steps of:
providing a first optical sensor on one side of a vehicle traveling on the travel surface;
providing a second optical sensor on an opposite side of the vehicle traveling on the travel surface, where the one side and the opposite side are on opposite sides of the vehicle and perpendicular to a direction of travel;
collecting light reflected from the travel surface by the first and second optical sensors;
determining induced Doppler shifts from the light collected by the first and second optical sensors; and
determining at least one characteristic of the travel surface based on the determined induced Doppler shifts.

11. The method of claim 10, wherein the travel surface is a highway surface and the step of determining at least one characteristic of the travel surface comprises determining a degree of curvature of the highway surface.

12. The method of claim 10, wherein the travel surface is a railroad surface and the step of determining at least one characteristic of the travel surface comprises determining a degree of curvature of the railroad surface.

13. The method of claim 10, wherein the travel surface is a railroad surface and the step of determining at least one characteristic of the travel surface comprises determining a gauge variance of the railroad surface.

14. A apparatus for determining characteristics of a travel surface while traveling on the travel surface, comprising:
first means for optically sensing reflected light on one side of a vehicle traveling on the travel surface;
second means for optically sensing reflected light on an opposite side of the vehicle traveling on the travel surface, where the one side and the opposite side are on opposite sides of the vehicle and perpendicular to a direction of travel;
means for determining induced Doppler shifts from the light collected by the first and second means for optically sensing reflected light; and
means for determining at least one characteristic of the travel surface based on the determined induced Doppler shifts.

15. The apparatus of claim 14, wherein the travel surface is a highway surface and the means for determining at least one characteristic of the travel surface comprises means for determining a degree of curvature of the highway surface.

16. The apparatus of claim 14, wherein the travel surface is a railroad surface and the means for determining at least one characteristic of the travel surface comprises means for determining a degree of curvature of the railroad surface.

17. The apparatus of claim 14, wherein the travel surface is a railroad surface and the means for determining at least one characteristic of the travel surface comprises means for determining a gauge variance of the railroad surface.

18. A method for measuring properties of a travel surface, upon which a travel vehicle travels, comprising:

providing an incident light from a light source to the travel surface;

collecting light reflected from the travel surface;

determining a surface induced Doppler shift from the incident and collected light;

determined surface feature aspect ratio of the travel surface; and determining at least one surface property of the travel surface based on the determined surface induced Doppler shift and the determined surface feature aspect ratio of the travel surface.

19. A method for measuring properties of a travel surface, upon which a travel vehicle travels, comprising:

providing an incident light from a light source to the travel surface;

collecting light reflected from the travel surface;

determining a surface induced Doppler shift from the incident and collected light;

determining a degree of curvature of the travel surface; and determining at least one surface property of the travel surface based on the determined surface induced Doppler shift and the determined degree of curvature of the travel surface.

20. A method for measuring properties of a travel surface, upon which a travel vehicle travels, comprising:

providing an incident light from a light source to the travel surface;

collecting light reflected from the travel surface;

determining a surface induced Doppler shift from the incident and collected light;

determining a slip of a contact between the travel vehicle and travel surface; and determining at least one surface property of the travel surface based on the determined surface induced Doppler shift and the determined slip of a contact between the travel vehicle and travel surface.

* * * * *